United States Patent [19]
Kaku et al.

[11] Patent Number: 5,734,681
[45] Date of Patent: Mar. 31, 1998

[54] PROCESS AND SYSTEM FOR TRANSFERRING VECTOR SIGNAL WITH PRECODING FOR SIGNAL POWER REDUCTION

[75] Inventors: Takashi Kaku; Kyoko Hirao; Hideo Miyazawa, all of Kawasaki, Japan

[73] Assignee: Fujitsu Limited, Kawasaki, Japan

[21] Appl. No.: 415,926

[22] Filed: Apr. 3, 1995

[30] Foreign Application Priority Data

Apr. 1, 1994 [JP] Japan ................. 6-064816

[51] Int. Cl.$^6$ .................. H04L 5/12; H04L 23/02
[52] U.S. Cl. ............................................. 375/265
[58] Field of Search ............... 375/265; 370/207; 364/752

[56] References Cited

U.S. PATENT DOCUMENTS

| | | | |
|---|---|---|---|
| 5,173,694 | 12/1992 | Lynch, Jr. et al. | 341/59 |
| 5,321,559 | 6/1994 | Nguyen et al. | 360/46 |
| 5,341,249 | 8/1994 | Abbott et al. | 360/46 |
| 5,345,342 | 9/1994 | Abbott et al. | 360/48 |
| 5,381,359 | 1/1995 | Abbott et al. | 364/724.19 |
| 5,422,760 | 6/1995 | Abbott et al. | 360/46 |
| 5,491,698 | 2/1996 | Patel et al. | 371/6 |

*Primary Examiner*—Stephen Chin
*Assistant Examiner*—Mohammad Ghayour
*Attorney, Agent, or Firm*—Armstrong, Westerman, Hattori, McLeland & Naughton

[57] ABSTRACT

A transfer process in which, an original vector signal is precoded to an intermediately-precoded vector signal, and the extended modulo operation is performed when the intermediately-precoded vector signal is located outside a predetermined extended-modulo limit area, and the precoded vector signal is transferred through a system having a predetermined filtering characteristic. From the transferred vector signal, the original vector signal is detected, based on a relationship between the vector components of the original vector signal and the transferred vector signal.

23 Claims, 69 Drawing Sheets

DECISION PLANE
ON RECEIVER SIDE

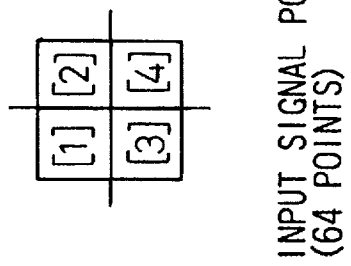
Fig.36 — SIGNAL POINTS IN OUTPUT OF MODULO PRECODER (256 POINTS)
Fig.35 — INPUT SIGNAL POINTS (64 POINTS)

ORIGINAL
SIGNAL PLANE

PRECODER TAP
PLANE

Fig.52

| A2 | ○ | ○ | B2 | A1 | ○ | ○ | B1 |
|---|---|---|---|---|---|---|---|
| ○ | ◎ | ○ | ● | ○ | ◎ | ○ | ● |
| ○ | ○ | ○ | ○ | ○ | ○ | ○ | ○ |
| C2 | ● | ○ | D2 | C1 | ● | ○ | D1 |
| A3 | ○ | ○ | B3 | A4 | ○ | ○ | B4 |
| ○ | ◎ | ○ | ● | ○ | ◎ | ○ | ● |
| ○ | ○ | ○ | ○ | ○ | ○ | ○ | ○ |
| C3 | ● | ○ | D3 | C4 | ● | ○ | D4 |

Fig.53

| A4 | ○ | ○ | B4 | A3 | ○ | ○ | B3 |
|---|---|---|---|---|---|---|---|
| ○ | ◎ | ○ | ● | ○ | ◎ | ○ | ● |
| ○ | ○ | ○ | ○ | ○ | ○ | ○ | ○ |
| C4 | ● | ○ | D4 | C3 | ● | ○ | D3 |
| A1 | ○ | ○ | B1 | A2 | ○ | ○ | B2 |
| ○ | ◎ | ○ | ● | ○ | ◎ | ○ | ● |
| ○ | ○ | ○ | ○ | ○ | ○ | ○ | ○ |
| C1 | ● | ○ | D1 | C2 | ● | ○ | D2 |

Fig. 57

⊚ SMALL PROBABILITY AREA

Fig. 67

| EMBODIMENT | EVALUATION |
|---|---|
| ORIGINAL — PRECODER — PR FILTER<br>1024   256   4096<br>CONVENTIONAL PRECODER | × PEAK FACTOR OF PRECODER<br>× PEAK FACTOR OF PR FILTER<br>○ SPECTRUM<br>○ RELOCATION<br>○ S/N CHARACTERISTIC |
| ORIGINAL — PRECODER — PR FILTER<br>1024   192   3072<br>EIGHTH EMBODIMENT | ○ PEAK FACTOR OF PRECODER<br>○ PEAK FACTOR OF PR FILTER<br>○ SPECTRUM<br>× RELOCATION<br>× S/N CHARACTERISTIC |
| ORIGINAL — PRECODER — PR FILTER<br>1024   192   3072<br>NINTH EMBODIMENT | ○ PEAK FACTOR OF PRECODER<br>○ PEAK FACTOR OF PR FILTER<br>○ SPECTRUM<br>○ RELOCATION<br>× S/N CHARACTERISTIC |
| ORIGINAL — PRECODER — PR FILTER<br>1024   192   3072<br>TENTH EMBODIMENT | ○ PEAK FACTOR OF PRECODER<br>○ PEAK FACTOR OF PR FILTER<br>○ SPECTRUM<br>○ RELOCATION<br>○ S/N CHARACTERISTIC |

2ND QUADRANT

3RD QUADRANT

4TH QUADRANT

2ND QUADRANT

3RD QUADRANT

4TH QUADRANT

Fig.84

| | TECHNIQUE | V.34 | EMBODIMENT |
|---|---|---|---|
| 1 | BASIS OF TRANSMISSION | ○ NYQUIST TRANSMISSION | ○ NON-NYQUIST TRANSMISSION |
| 2 | BAUDS RATE | ○ 3200 BAUDS | ○ 3300 BAUDS |
| 3 | TRANSMISSION RATE | ○ 28.8Kbps + 200bps (S-CH) | ○ 28.8Kbps + 100bps (S-CH) |
| 4 | FREQUENCY BAND | × CARRIER f1829Hz, 10% ROF (69~3589Hz)<br>○ CARRIER f1920Hz, 10% ROF (160~3680Hz) | ○ CARRIER f1850Hz (200~3500Hz) |

Fig. 85

| | | | *1 |
|---|---|---|---|
| 5 | TCM | ○ 4D-16 STATE<br>○ 4D-32 STATE<br>○ 4D-64 STATE | ○ 2D-16 STATE |
| 6 | ABSOLUTE DELAY DUE TO VITERBI DECODER | ○ 18.8ms (30 STAGES CUT-OFF)<br>DELAY IS GREAT DUE TO MD-TCM | ◎ 9.09ms (30 STAGES CUT-OFF) |
| 7 | NUMBER OF SIGNAL POINTS | ◎ MAX. 960<br>◎ STANDARD 768 | ○ MAX. 3072<br>○ STANDARD 1536 |
| 8 | BLER 1×10⁻² | ◎ S/N=30.2dB | ○ S/N=30.5dB<br>(0.3dB HIGHER THAN V34) |
| 9 | CHARACTERISTIC AGAINST LINE DISTURBANCE | △ INTER-SYMBOL INTERFERENCE<br>◎ WHITE NOISE<br>△ TIMING JITTER | ◎ INTER-SYMBOL INTERFERENCE<br>○ WHITE NOISE<br>◎ TIMING JITTER |
| 10 | AMOUNT OF CALCULATION IN EQUALIZER | △ FSE EQUALIZATION | ◎ BAUD RATE EQUALIZATION |
| 11 | TOTAL EVALUATION | △ | ◎ |

PROCESS AND SYSTEM FOR TRANSFERRING VECTOR SIGNAL WITH PRECODING FOR SIGNAL POWER REDUCTION

BACKGROUND OF THE INVENTION

(1) Field of the Invention

The present invention relates to a process and a system for transferring vector signals through a signal transmission system or a data recording system. The signal transmission system may be a transmission line, a data writing and reading system in digital recording device, and the like. Typically, the present invention can be applied to modem communication systems in the voice frequency band, high-speed modem communication system for use in private branch networks, transmission systems for CATV, wireless transmission communication systems, optical fiber transmission apparatuses, and the like. In addition, the present invention also covers the technique of transmitting, and writing in and reading from a recording medium, a vector baseband signal.

(2) Description of the Related Art

For example, in the field of the modem transmission, i.e., transmissions of digital data through analog transmission lines, realization of higher bit rate is required. For that purpose, ITU-T recommendation, V.34 provides a 28.8 kbps modem which uses a frequency band wider than the conventional modem transmission technique, within a Nyquist transmission technique.

In addition, in the field of the digital data recording devices such as magnetic disc devices, optical disc devices, digital video tape recorders, and the like, it is required to record digital data in these devices with a greater density so that the capacity of these devices are increased.

When realizing a 28.8 kbps modem by use of a Nyquist transmission method as used in the above technique of ITU-T recommendation, V.34, a frequency band width of 3,200 Bauds or 3,429 Bauds is required. That is, a wide frequency band is necessary to realize a high-speed modem by using a conventional data transmission method.

The frequency band width of the analog transmission line currently guaranteed in Japan is 0.3 Hz to 3.4 kHz, having a frequency band width of 3,100 Hz. However, the frequency band width of the above data transmission method by use of the Nyquist transmission method, exceeds the above guaranteed frequency band width of the analog transmission line. Therefore, the data transmission rate of 28.8 kbps cannot be guaranteed.

In addition, inter-code interference, white noise, timing jitter and the like sensitively depend on the frequency band width of the transmission line. Therefore, it is desirable to maintain the frequency band width within a conventionally guaranteed range of the analog transmission line.

In order to improve a coding gain, recently, it is reported that the partial-response maximum-likelihood technique is applied to data writing and reading systems in the digital data recording devices. Nikkei Electronics, No. 599 (Jan. 17, 1994, in Japanese), pages 71 to 79, summarizes such applications of the partial-response maximum-likelihood process to the digital data recording devices.

However, in the partial-response maximum-likelihood method conventionally used in digital recording devices, signal points are configured on a one-dimensional line. Therefore, a great record area is required on record media, and there is a limit in increasing record density.

SUMMARY OF THE INVENTION

A first object of the present invention is to provide a process and a system for transferring data transfer in which a power of a transferred signal is reduced.

A second object of the present invention is to provide a process and a system for transferring data in which high speed transmission of digital data within a narrow frequency band is realized.

A third object of the present invention is to provide a method of recording digital data in a digital data recording medium with a high density.

According to the first aspect of the present invention, there is provided a digital information transfer process containing a modulation phase, a modulated signal transfer phase and a demodulator phase. The above modulation phase contains: a convolutional encoding step for inputting successive digital bits, encoding the successive digital bits to generate successive first convolutional codes corresponding to the successive digital bits and representing successive original signal points each having non-precoded coordinates in a vector space; a modulo precoding step for precoding each of the non-precoded coordinates of the original signal points with a modulo operation, to generate successive modulo-precoded signal points having modulo-precoded coordinates for the successive original signal points, and a modulating step for generating a modulated analog signal containing information on the successive modulo-precoded signal points. In the above modulated signal transfer phase, the above modulated analog signal is transferred from the above modulation phase to the above demodulation phase, and has a certain frequency characteristic which changes the successive modulo-precoded signal points contained in the above modulated analog signal to successive inter-symbol interfered signal points. The above demodulation phase contains; a demodulating step for receiving the above modulated analog signal containing the information on the successive inter-symbol-interfered signal points, and generating a demodulated analog signal indicating the successive inter-symbol-interfered signal points; a modulo hard decision step for receiving the above demodulated analog signal, determining the above successive inter-symbol-interfered signal points in the above demodulated analog signal by hard decision, and obtaining a series of successive second convolutional codes corresponding to the determined successive inter-symbol-interfered signal points of which the information are contained in the modulated analog signal which is recently received, based on a predetermined relationship between the inter-symbol-interfered signal points and the first convolutional codes, and a soft decision step for determining the most likely series of values for the successive first convolutional codes based on the above series of successive second convolutional codes, by soft decision, and a decoding step for obtaining successive second digital bits by decoding the most likely series of values for the successive first convolutional codes.

According to the second aspect of the present invention, there is provided a transfer process containing: an extended modulo precoding step for precoding each of the non-precoded vector components of an original vector signal to generate intermediately-precoded vector signal having the intermediately-precoded components corresponding to the vector signal, and performing an extended modulo operation on each of the above intermediately-precoded vector signal, to generate modulo-precoded vector signal corresponding to the original vector signal and having modulo-precoded components, where in the extended modulo operation, when the above each of the above intermediately-precoded vector signal is located outside a predetermined extended-modulo limit area in a vector space, the above each of the intermediately-precoded vector signal is transposed to another vector signal located in the above predetermined extended-modulo limit area; a signal transferring step for transferring the above modulo-precoded vector signal through a signal transfer system having a predetermined filtering characteristic which transforms the above modulo-precoded vector signal into a transferred vector signal; and a transferred vector signal determining step for receiving the above transferred vector signal, and detecting the above non-precoded vector components of the above original vector signal from vector components of the above transferred vector signal, based on a relationship between the above non-precoded vector components of the above original vector signal and the above vector components of the above transferred vector signal.

According to the third aspect of the present invention, there is provided a transfer process containing: a plural-vector-signal generating step for generating a plurality of first vector signals in a vector space corresponding to a second vector signal, where each of the above plurality of first vector signals has first vector components and the above second vector signal each have second vector components; an optimum vector signal selecting step for selecting an optimum one of the first vector signals; a precoding step for precoding the above optimum one of the first vector signals to generate a precoded vector signal; a signal transferring step for transferring the above precoded vector signal through a signal transferring system having a predetermined filtering characteristic which transforms the above precoded vector signal into a transferred vector signal; and a transferred vector signal determining step for receiving the above transferred vector signal, and detecting the above second vector components of the above second vector signal from vector components of the above transferred vector signal, based on a relationship between the above second vector components of the above second vector signal and the above vector components of the above transferred vector signal.

According to the fourth aspect of the present invention, in the construction of the third aspect of the present invention, further containing, before the above plural-vector-signal generating step, a control step for performing determination whether the above precoding step precodes the above optimum one of the first vector signals or the above second vector signal instead the optimum one of the first vector signals, to generate the above precoded vector signal, and controlling the operation of the precoding step in accordance with the above determination.

According to the fifth aspect of the present invention, there is provided a transfer process containing: a relocation determining step for obtaining first information relating to positions of a first group of original vector signals having first vector components in a vector space, and determining whether or not the relocation of a plurality of portions of a predetermined area in the above vector space is to be performed, based on the first information; a relocation step for relocating the above plurality of portions, to obtain a second group of relocated vector signals having second vector components, corresponding to the above first group of the above original vector signals, when it is determined, by the above relocation determining step, that the relocation of the above plurality of portions is to be performed; a relocation information generating step for generating second information indicating whether or not the relocation of the above plurality of portions is performed; a signal transferring step for transferring a third group of transmitting vector signals through a signal transferring system with a predetermined filtering characteristic which transforms the above third group of transmitting vector signals into a fourth group of transferred vector signals, where the above third group of transmitting vector signals are the above first group of original vector signals when it is determined, in the above relocation determining step, that the relocation of the above plurality of portions is not to be performed, and the above third group of transmitting vector signals are the above second group of the relocated signal points when it is determined, in the above relocation determining step, that the relocation of the above plurality of portions is to be performed; an additional information transferring step for transferring the above second information through a second signal transferring system; an additional information receiving step for receiving the above second information from the above second signal transfer system; and a conversion step for receiving the above fourth group of transferred vector signals, and converting the above fourth group of transferred vector signals to the above first group of original vector signals, based on the above second information.

According to the sixth aspect of the present invention, there is provided a digital information transfer process containing a modulation phase, a modulated signal transfer phase, and a demodulation phase. The above modulation phase contains: a convolutional encoding step for inputting successive digital bits, encoding the digital bits to generate successive first convolutional codes corresponding to the successive digital bits and representing original signal points each having non-precoded coordinates in a vector space; a precoding step for precoding each of the non-precoded coordinates of the original signal points to generate precoded signal points corresponding to the original signal points and having modulo-precoded coordinates, where the precoded signal points can distribute in a precoded-signal-point distributing area in the above vector space, and a modulating step for generating a modulated analog signal containing first information on the precoded signal points. The above modulated signal transfer phase transfers the above modulated analog signal from the above modulation phase to the above demodulation phase and has a certain frequency characteristic which changes the precoded signal points contained in the above modulated analog signal to inter-symbol interfered signal points. The above demodulation phase contains: a demodulating step for receiving the above modulated analog signal containing the first information on the inter-symbol-interfered signal points, and generating a demodulated analog signal indicating the inter-symbol-interfered signal points; a hard decision step for receiving the above demodulated analog signal, determining the above inter-symbol-interfered signal points in the above demodulated analog signal by hard decision, and obtaining a series of second convolutional codes corresponding to the determined inter-symbol-interfered signal points of which the information are contained in the modulated analog signal which is recently received, based on second information indicating a predetermined relationship between the inter-symbol-interfered signal points and the first convolutional codes, and a soft decision step for determining the most likely series of values for the first convolutional codes based on the above series of second convolutional codes, by soft decision, and a decoding step for obtaining successive second digital bits by decoding the most likely series of values for the first convolutional codes. In particular, the above inter-symbol-interfered signal points distribute in an inter-symbol-interfered-signal-point distribution area in the above vector space, and in the operations of the above hard decision step and the above soft decision step it is assumed that there are imaginary peripheral inter-symbol-interfered signal points around the above inter-symbol-interfered signal points.

In addition to the above constructions of the first to sixth aspects of the present invention, the above modulation phase may further comprise a first filtering step for modifying the above modulated analog signal in accordance with a second predetermined frequency characteristic, and the above demodulation phase may further comprise a second filtering step for modifying the above modulated analog signal in accordance with a third predetermined frequency characteristic, where the above second and third frequency characteristics are predetermined so that the above first, second, and third frequency characteristics realizes a frequency characteristic of a partial response signal.

According to the seventh aspect of the present invention, there is provided a process for establishing a state transition diagram for a Trellis encoder having a desired number of states, where the above state transition diagram is invariant by a phase rotation of 90 degrees. The above process contains: a first step of dividing the above desired number of states into four first groups; a second step of defining, for each of the above four first groups, a state-shift relationship indicating start states and corresponding end states in phase rotations of 0 degree, 90 degrees, 180 degrees, and 270 degrees; a third step of selecting each of the above desired number of states as a start state, and determining four states as the possible end states corresponding to state transitions from the each start state, based on the above state-shift relationship, to determine the state transitions; a fourth step for determining two second groups of subsets of Trellis codes; and a fifth step of assigning to each of the above state transitions determined in the above third step, so that the subsets in the same group are assigned to the respective state transitions starting from each of the above desired number of states.

BRIEF DESCRIPTION OF THE DRAWINGS

In the drawings:

FIG. 35 illustrates locations of the sixty-four original signal points;

FIG. 36 illustrates the distribution of 256 signal points in the output of the modulo precoder;

FIG. 52 is a diagram illustrating a configuration of sixty-four original signal points;

FIG. 53 is a diagram illustrating the configuration of the original signal points after the original signal points of FIG. 52 are relocated;

FIG. 57 is a diagram illustrating an example configuration of signal points on a decision plane on which a hard decision is performed on the receiver side to determine the received signal point;

FIG. 67 is a diagram illustrating the comparison of simulation results of the eighth, ninth, and tenth embodiments;

FIGS. 84 and 85 are diagrams illustrating the comparison results for various characteristics.

DESCRIPTION OF THE PREFERRED EMBODIMENTS

Hereinafter, explanations are provided mainly for transmission systems, in particularly, directed to modems transmission of the non-Nyquist method, the techniques explained below can be applied to the other fields of technology, such as transmission for CATV, wireless transmission, optical fiber transmission, digital data recording including recording in magnetic disc and optical disc, and digital video tape recording, and the like. Namely, transmissions explained hereinafter may be replaced with data writing and reading in the digital data recording apparatuses when they are applied to the digital recording techniques. Further, the techniques provided hereinafter can be applied to both the Nyquist and non-Nyquist transmission (writing and reading) systems, and the modulation (passband) and baseband transmission (writing and reading) systems. In particular, vector signals can be transmitted, written, or read through a plurality of transmission lines, respectively, or can be modulated (for example, by QAM modulation) and transmitted through an analog transmission line.

MODEM TRANSMISSION

In the embodiments of the present invention, the following requirements are imposed for modem communications.
 (1) The frequency band width is within 3,100 Hz guaranteed in the Japanese standard analog transmission lines of 3.4 kHz.

In Japan, analog transmission lines of 3.4 kHz are currently used, and the frequency band from 0.3 to 3.4 kHz are guaranteed by the network providers. Therefore, the frequency band width of 3,100 Hz is required.
 (2) The block error rate (BLER) is not more than $1\times10^{-2}$ at SNR (signal to noise ratio)=31.0 dB.

This requirement is equivalent to the requirement in ITU-T recommendation, V.34.

Figure 1:
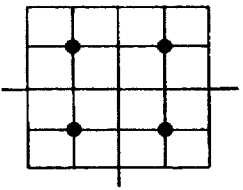
FIG. 1 is a diagram illustrating comparison results of Nyquist and non-Nyquist transmission techniques.

COMPARISON OF NYQUIST AND NON-NYQUIST TRANSMISSIONS (FIG. 1 and Table 1)

FIG. 1 is a diagram illustrating comparison results of Nyquist and non-Nyquist transmission techniques. In FIG. 1, eye patterns, impulse responses, and frequency spectra of the Nyquist and non-Nyquist transmission techniques are respectively compared. As indicated in FIG. 1, the frequency band width in the Nyquist transmission is 3,200 Hz at the 3 dB-down level. Therefore, the above requirement (1), that "frequency band width is within 3,100 Hz" is not satisfied by the Nyquist transmission. On the other hand, the frequency band width in the non-Nyquist transmission can be 1,600 Hz at the 3 dB-down level.

However, in the non-Nyquist transmission, the number of signal points is greater than the Nyquist transmission since the frequency band width in the non-Nyquist transmission is narrower than the Nyquist transmission. As indicated in FIG. 1, the four signal points in the Nyquist transmission are increased to 16 signal points in the non-Nyquist transmission. Namely, the coding gain in the non-Nyquist transmission tends to be smaller than that in the Nyquist transmission.

Table 1 indicates the numbers of bits per symbol, the numbers of signal points, the SNR at block error rate (BLER)=$1\times10^{-2}$, and the frequency bandwidths at the 3 dB-down level, for the Nyquist and non-Nyquist transmission techniques. The comparison results are provided for Baud rate of 2,400, 2618, 2,880, and 3,200 Bauds.

The numbers of bits per symbol can be decreased when the Baud rate is increased in both the Nyquist and non-Nyquist transmission techniques. The smaller number of bits per symbol is more advantageous for transmission.

The number of signal points in the Nyquist transmission is smaller than that in the non-Nyquist transmission. The smaller number of signal points is more advantageous for achieving a higher coding gain.

As indicated in Table 1, only in the cases of the Nyquist transmissions with 2,880 Bauds and 3,200 Bauds and the non-Nyquist transmission with 3,200 Bauds, the SNR at BLER=$1\times10^{-2}$, less than 40.0 dB can be achieved.

The frequency band widths in the non-Nyquist transmission are smaller than the 3,100 Hz. However, in the Nyquist transmission, in the case of 3,200 Bauds, the frequency band width is greater than 3,100 Hz. Further, considering the number of bits per symbol, none of the Nyquist transmission cases satisfies the above requirements (1) and (2).

The frequency band width is determined by the type of transmission such as Nyquist or non-Nyquist, and the Baud rate, and cannot be changed. However, the number of signal points and the SNR characteristic (SNR at BLER=$1\times10^{-2}$) can be improved by other technique. Therefore, considering the frequency band width, the non-Nyquist transmission technique is used in the embodiments of the present invention.

Figure 2:
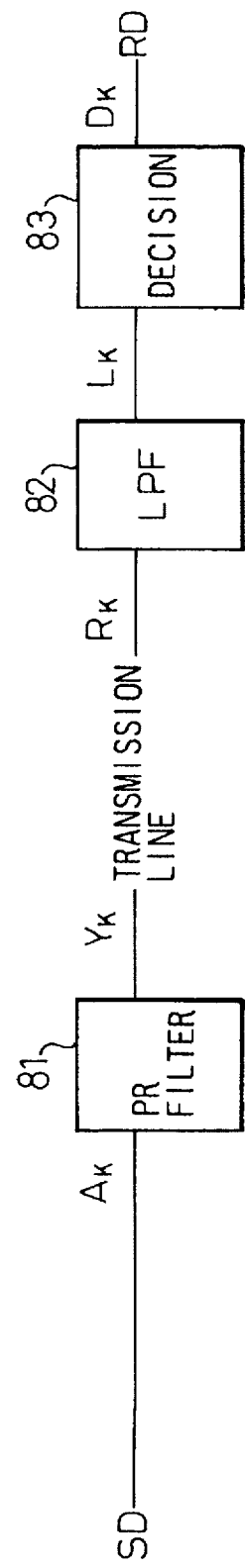
FIG. 2 is a diagram illustrating a data transmission system according to the conventional partial response method.
Figure 3:
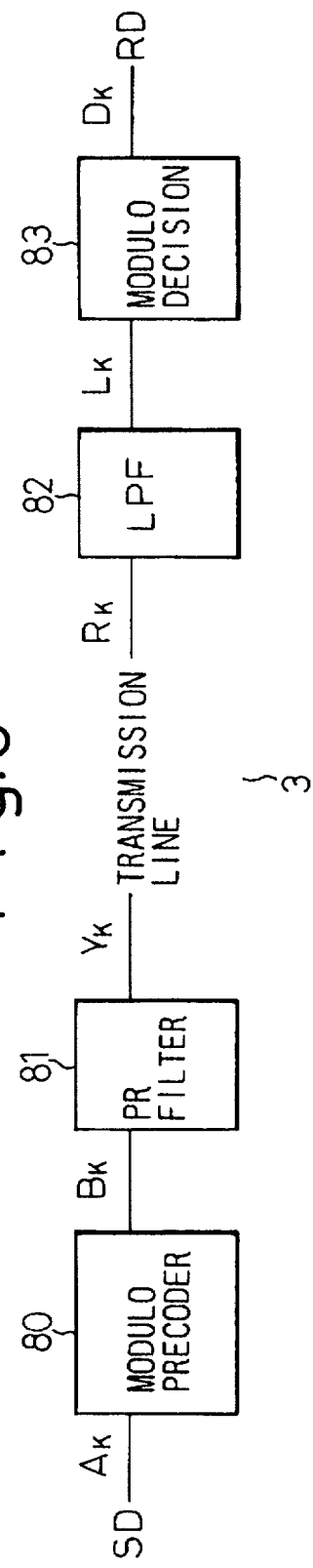
FIG. 3 is a diagram illustrating a data transmission system according to the conventional partial response method, where a precoder is provided on the transmission side.
Figure 4:
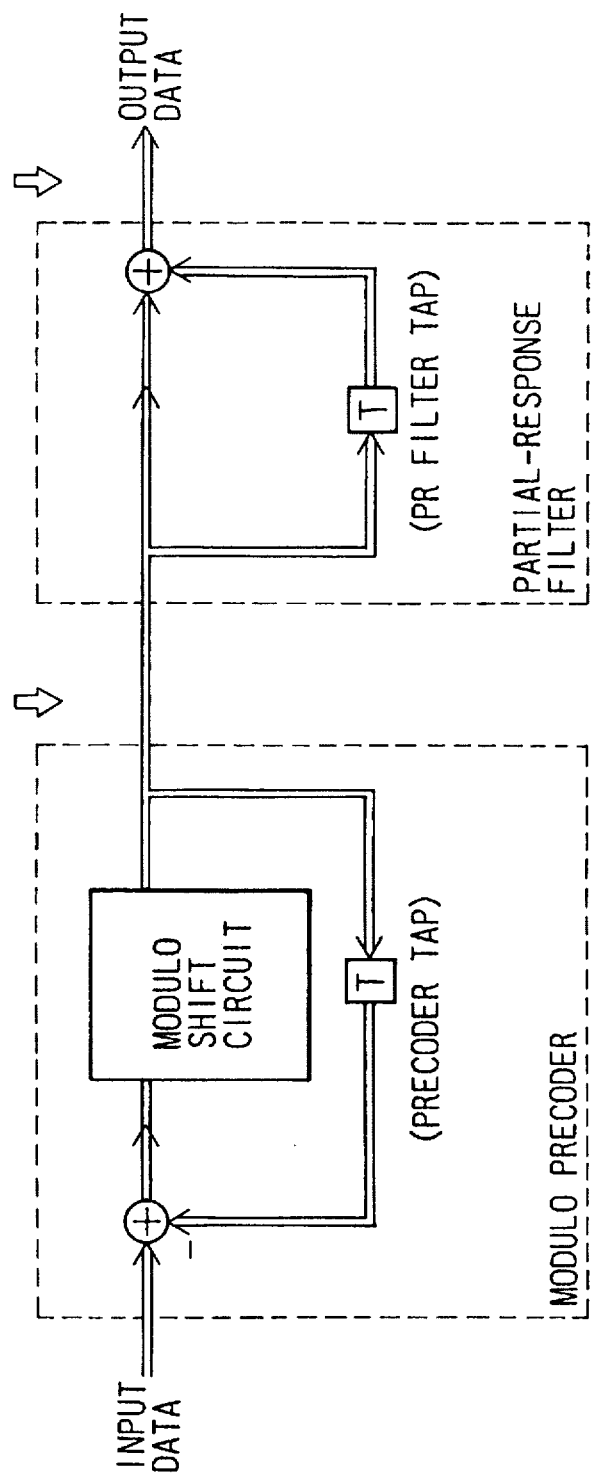
FIG. 4 is a diagram illustrating details of the modulo precoder and the partial response (PR) filter in the construction of FIG. 3.

CONVENTIONAL PARTIAL RESPONSE METHOD (FIGS. 2, 3, and 4)

Conventionally, a non-Nyquist transmission method called a partial response method is known. FIG. 2 is a diagram illustrating a data transmission system according to the conventional partial response method. In FIG. 2, reference numeral 81 denotes a partial response (PR) filter provided on the transmission side of the system, 82 denotes a low-pass filter (LPF) provided on the reception side of the system, and 83 denotes a decision circuit.

The partial response filter 81 adds an input data $A_k$ to the previous data $A_{k-1}$, and outputs on the transmission line as data $Y_k$.

The data $Y_k$ is transmitted through the transmission line to the reception side, and is received as data $R_k$. The received data $R_k$ passes through the low-pass filter 82, and is input into the decision circuit 83 as data $L_k$. In the case of back-to-back connection, $$L_k = R_k = Y_k = A_k + A_{k-1}.$$

The decision circuit 83 determines the input data $L_k$, and outputs determined (decision) result $D_k$, where $$D_k = A_k = R_k - A_{k-1}.$$

Therefore, when $A_{k-1}$ is determined, the reception point signal $R_k$ can be obtained based on transmission point signal $A_k$.

However, according to the above transmission system, when once the value $A_{k-1}$ is erroneously determined, all of the following determination results become errors. That is, an error propagates in the above transmission system. Therefore, a precoder is provided on the transmission side as explained below with reference to FIG. 3.

FIG. 3 is a diagram illustrating a data transmission system according to the conventional partial response method, where a modulo precoder is provided on the transmission side, and FIG. 4 is a diagram illustrating details of the modulo precoder and the partial response (PR) filter in the construction of FIG. 3. In the modulo precoder provided in the construction of FIG. 3, a previous output $Y_{k-1}$ of the modulo precoder is subtracted from an input data $A_k$ and a modulo operation is performed. In the construction of FIG. 3, when the input data of the low-pass filter provided on the receiver side is denoted by $R_k$, the output $L_k$ of the low-pass filter, is expressed as $$L_k = R_k = Y_k = B_k + B_{k-1}$$
$$= mod(A_k - B_{k-1}) + B_{k-1}.$$

Therefore, the output $D_k$ of the modulo decision circuit is expressed as $$D_k = mod(L_k) = mod(mod(A_k - B_{k-1}) + B_{k-1})$$
$$= mod(A_k - B_{k-1} + B_{k-1}) = mod(A_k)$$
$$= A_k.$$

Namely, due to the provision of the modulo precoder on the transmission side, the receiver side needs not use the previous input data $A_{k-1}$ for performing the decision. Thus, the above error propagation can be avoided.

Conventionally, the above partial response method has been used in digital recording devices. In the partial response method conventionally used in digital recording devices, signal points are configured on a one-dimensional line. Therefore, a great record area is required on record media, and there is a limit in increasing record density.

In the present invention, the technique of the quadrature partial response is used so that the vector data representing a signal point in a vector space can be processed. According to the quadrature partial response technique, the powers of signal points can be smaller than those in the partial response method in which signal points are arranged on a one-dimensional line. The technique of the quadrature partial response is disclosed, for example, by Kazuo Ogawa et al., "2 GHz Band QAM (Partial Response) Digital Radio Equipment", The Technical Report of the Society of Electronics and Communication Engineers in Japan, CS76-170, pp. 75 to 82, 1976).

BASIC CONSTRUCTION FOR EXECUTING FIRST ASPECT OF INVENTION (FIG. 5)

Figure 5:
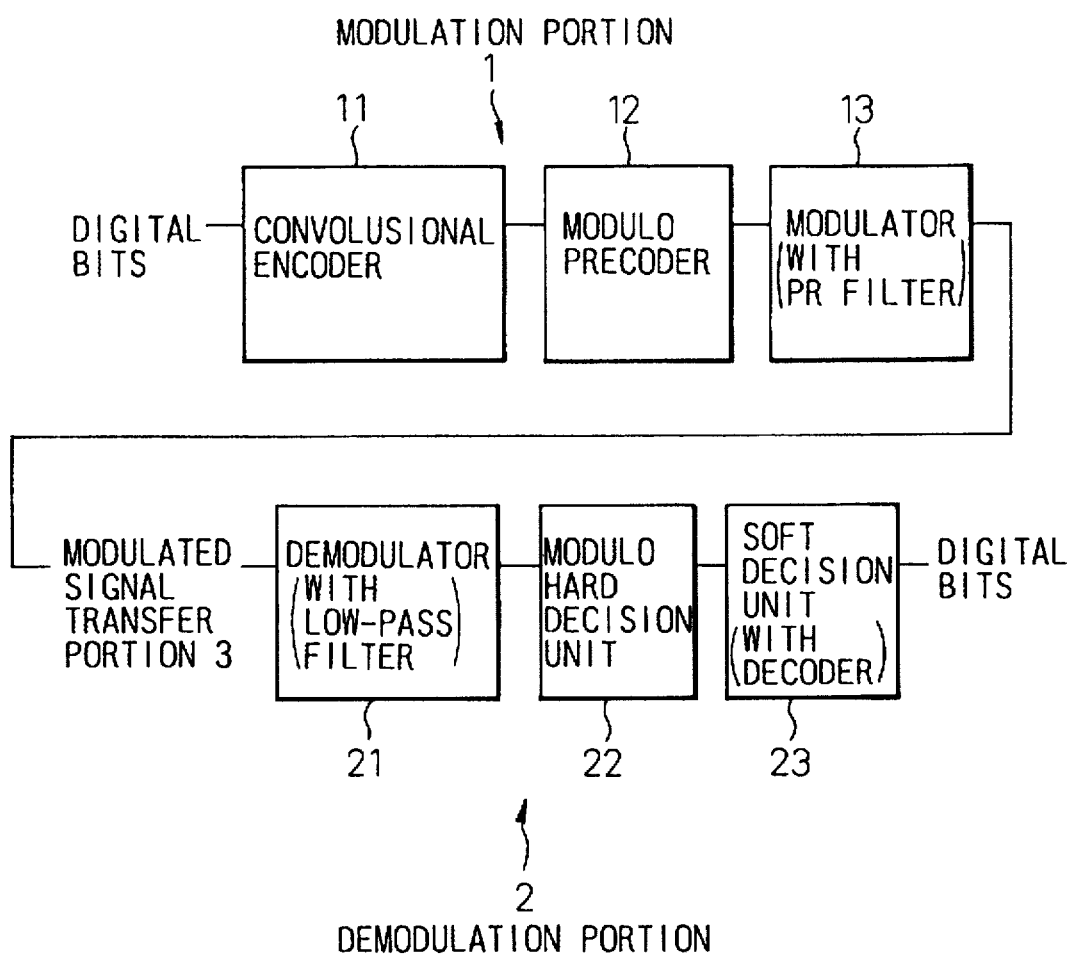
FIG. 5 is a diagram illustrating a basic construction for executing the process according to the first aspect of the present invention.

FIG. 5 is a diagram illustrating a basic construction for executing the process according to the first aspect of the present invention. In FIG. 5, reference numeral 1 denotes a modulation portion, 2 denotes a demodulation portion, and 3 denotes a modulated signal transfer portion. The modulation portion comprises a convolutional encoder 11, a modulo precoder 12, and a modulator 13, and the demodulation portion comprises a demodulator 21, a modulo hard decision unit 22, a soft decision unit 23. The convolutional encoder 11 inputs successive digital bits, encodes the successive digital bits to generate successive first convolutional codes corresponding to the successive digital bits and representing successive original signal points each having non-preceded coordinates in a vector space. The modulo precoder 12 precedes each of the non-preceded coordinates of the original signal points with a modulo operation, to generate successive modulo-preceded signal points having modulo-preceded coordinates for the successive original signal points. The modulator 13 generates a modulated analog signal containing information on the successive modulo-preceded signal pints. The modulated signal transfer portion 3 transfers the above modulated analog signal from the above modulation portion to the above demodulation portion, and has a certain frequency characteristic which changes the successive modulo-preceded signal points contained in the above modulated analog signal to successive inter-symbol interfered signal points. The demodulator 21 receives the above modulated analog signal containing the information on the successive inter-symbol-interfered signal points, and generating a demodulated analog signal indicating the successive inter-symbol-interfered signal points. The modulo hard decision unit 22 receives the above demodulated analog signal, determines the above successive inter-symbol-interfered signal points in the above demodulated analog signal by hard decision, and obtains a series of successive second convolutional codes corresponding to the determined successive inter-symbol-interfered signal points of which the information are contained in the modulated analog signal which is recently received, based on a predetermined relationship between the inter-symbol-interfered signal points and the first convolutional codes. The soft decision unit 23 determines the most likely series of values for the successive first convolutional codes based on the above series of successive second convolutional codes, by soft decision. In addition, the demodulation portion 2 comprises a decoder which obtains successive second digital bits by decoding the most likely series of values for the successive first convolutional codes, In the construction of FIG. 5, the above modulation portion may further comprise a first filter which modifies the above modulated analog signal in accordance with a second predetermined frequency characteristic, and the above demodulation portion may further comprise a second filter which modifies the above modulated analog signal in accordance with a third predetermined frequency characteristic, where the above second and third frequency characteristics may be predetermined so that the above first, second, and third frequency characteristics realizes a frequency characteristic of a partial response signal.

In the construction of FIG. 5, the above convolutional encoder may contain a 16-state Trellis encoder.

In the construction of FIG. 5, the above modulated signal transfer system may contain an analog transmission line.

In the construction of FIG. 5, the above modulated signal transfer system may contain a signal recording medium, an analog modulated signal recording mechanism which records digital information represented by the analog modulated signal in the recording medium, and an analog modulated signal reading mechanism which reads the digital information recorded in the recording medium.

In the construction of FIG. 5, the above successive modulo-precoded coordinates may be generated by performing a predetermined one of modulo-n addition of the above each of the non-precoded coordinates to a first other modulo-precoded coordinate which is previously output from the modulo precoder, and modulo-n subtraction of the above second other modulo-precoded coordinate which is previously output from the modulo precoder, from the above each of the non-precoded coordinates, where n is an integer.

BASIC CONSTRUCTION FOR EXECUTING SECOND ASPECT OF INVENTION (FIG. 6)

Figure 6:
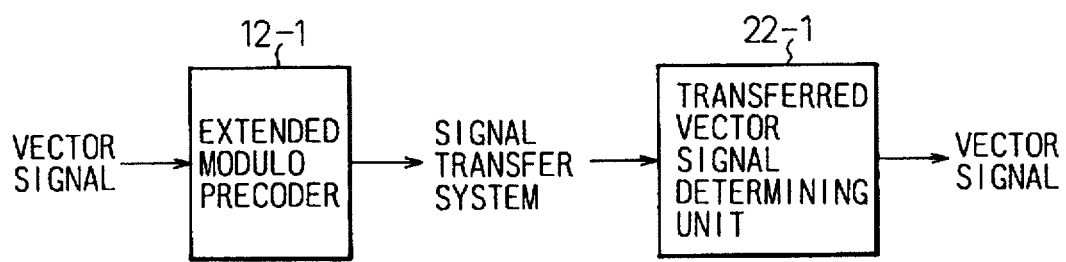
FIG. 6 is a diagram illustrating a basic construction for executing the process according to the second aspect of the present invention.

FIG. 6 is a diagram illustrating a basic construction for executing the process according to the second aspect of the present invention. In FIG. 6, reference numeral 12-1 denotes an extended modulo precoder, and 22-1 denotes a transferred vector signal determining unit. The extended modulo precoder 12-1 precodes each of the non-precoded vector components of an original vector signal to generate intermediately-precoded vector signal having the intermediately-precoded components corresponding to the vector signal, and performing an extended modulo operation on each of the above intermediately-precoded vector signal, to generate modulo-precoded vector signal corresponding to the original vector signal and having modulo-precoded components, where in the extended modulo operation, when the above each of the above intermediately-precoded vector signal is located outside a predetermined extended-modulo limit area in a vector space, the above each of the intermediately-precoded vector signal is transposed to another vector signal located in the above predetermined extended-modulo limit area.

The signal transfer system transfers the above modulo-precoded vector signal therethrough with a predetermined filtering characteristic which transforms the above modulo-precoded vector signal into a transferred vector signal.

The transferred vector signal determining unit 22-1 receives the above transferred vector signal, and detects the above non-precoded vector components of the above original vector signal from vector components of the above transferred vector signal, based on a relationship between the above non-preceded vector components of the above original vector signal and the above vector components of the above transferred vector signal.

(1) In the construction of FIG. 6, the above signal transferring system may comprise a filtering unit for filtering the above modulo-precoded vector signal before transferring the modulo-precoded vector signal based on the above predetermined filtering characteristic to transform the above modulo-precoded vector signal into a filtered vector signal having substantially the same vector components of the above transferred vector signal.

(2) In the construction of FIG. 6, in the extended modulo operation, the above predetermined extended-modulo limit area may be predetermined so that the above predetermined extended-modulo limit area contains and is greater than a square area having a side length of twice a predetermined extended-modulo shift value and having the center thereof at an origin of the vector space.

(3) In the above construction (2), the above predetermined extended-modulo limit area may be a rectangular area containing the above square area, and in the extended modulo operation, the above each of the intermediately-precoded vector components of the above intermediately-precoded vector signal may be changed by the predetermined extended-modulo shift value so that a power of the signal represented by the intermediately-precoded vector signal having the above each of the intermediately-precoded vector components is decreased, when the above each of the intermediately-precoded vector components is greater than an upper limit the rectangular area in the same direction as the above each of the intermediately-precoded vector components, or smaller than a lower limit of the rectangular area in the direction, and therefore the above each of the intermediately-precoded vector signal is transposed to the above other vector signal.

(4) In the above construction (2), in the extended modulo operation, when the above each of the above intermediately-precoded vector signal is located outside the above predetermined extended-modulo limit area, and therefore the above each of the intermediately-precoded vector signal may be transposed to the above other vector signal, the power of the above other vector signal is obtained for first, second, and third cases, and the above other vector signal is determined as that is obtained for one of the above first, second, and third cases which provides the minimum power among the powers obtained for one of the above first, second, and third cases, where in the first case one of the intermediately-precoded vector components of each of the above intermediately-precoded vector signal is changed by the predetermined extended-modulo shift value, in the second case the other of the intermediately-precoded vector components of the above each of the above intermediately-precoded vector signal is changed by the predetermined extended-modulo shift value, and in the third case both of the intermediately-precoded vector components of the above each of the above intermediately-precoded vector signal is changed by the predetermined extended-modulo shift value.

(5) In the above construction (4), the above predetermined extended-modulo limit area may be a circle area containing the above square area.

(6) In the construction of FIG. 6, the above signal transferring system may contain a signal recording medium, a vector signal recording mechanism for recording information represented by the modulo-precoded vector signal in the recording medium, and a signal reading mechanism for reading the information recorded in the recording medium.

BASIC CONSTRUCTIONS FOR EXECUTING THIRD AND FOURTH ASPECTS OF INVENTION (FIG. 7)

Figure 7:
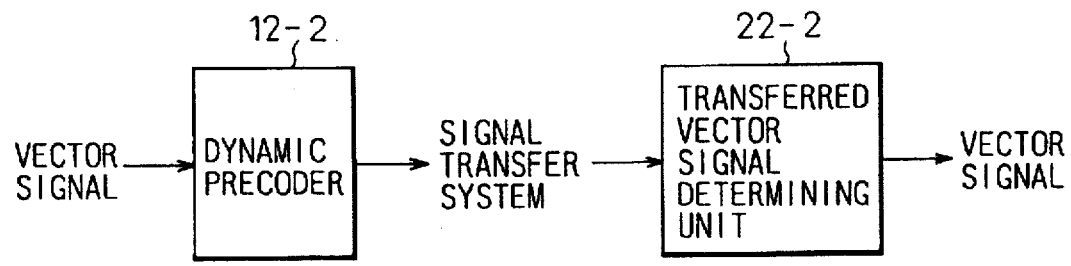
FIG. 7 is a diagram illustrating basic constructions for executing the processes according to the third aspect of the present invention.

FIG. 7 is a diagram illustrating basic constructions for executing the processes according to the third and fourth aspects of the present invention. In FIG. 7, reference numeral 12-2 denotes a dynamic precoder, and 22-2 denotes a transferred vector signal determining unit. According to the third aspect of the present invention, the dynamic precoder 12-2 comprises a plural-vector-signal generating unit for generating a plurality of first vector signals in a vector space corresponding to a second vector signal, where each of the above plurality of first vector signals has first vector components and the above second vector signal each have second vector components an optimum vector signal selecting unit for selecting an optimum one of the first vector signals; and a precoding unit for precoding the above optimum one of the first vector signals to generate a precoded vector signal.

The signal transfer system transfers the above modulo-precoded vector signal therethrough with a predetermined filtering characteristic which transforms the above modulo-precoded vector signal into a transferred vector signal.

The transferred vector signal determining unit 22-2 receives the above transferred vector signal, and detects the above non-precoded vector components of the above original vector signal from vector components of the above transferred vector signal, based on a relationship between the above non-precoded vector components of the above original vector signal and the above vector components of the above transferred vector signal.

(1) In the above construction for executing the third aspect of the present invention, the above signal transferring system may comprise a filtering unit for filtering the above preceded vector signal before transferring the above precoded vector signal based on the above predetermined filtering characteristic to transform the above precoded vector signal into a filtered vector signal having substantially the same vector components of the above transferred vector signal.

(2) In the above construction for executing the third aspect of the present invention, the above plurality of first vector signals corresponding to the above second vector signal may be the above second vector signal and at least one additional vector signal located around a predetermined area in which the above second vector signal is located.

(3) In the above construction of (2), wherein the above at least one additional vector signal may be located relatively far from the predetermined area when the above second vector signal is located relatively far from the origin of the vector space, and the above at least one additional vector signal is located relatively near the predetermined area when the above second vector signals is located relatively near the origin of the vector space.

(4) In the above construction of (2), wherein the above at least one additional vector signal may be located relatively far from the predetermined area when the above second vector signal is located relatively near the origin of the vector space, and the above second vector signal is located relatively near the predetermined area when the above second vector signal is located relatively far from the origin of the vector space.

(5) In the above construction for executing the third aspect of the present invention, the above plurality of first vector signals corresponding to the second vector signal may be arranged uniformly spaced in the phase direction in the vector space.

(6) In the above construction for executing the third aspect of the present invention, the above optimum vector signal selecting unit may select one of the first vector signals as the above optimum one when it is determined that the above one of the first vector signals is precoded to a precoded vector signal having smaller power than the powers of signals from the other of the above plurality of first vector signals.

(7) In the above construction for executing the third aspect of the present invention, the above signal transferring system may contain a signal recording medium, a vector signal recording mechanism for recording information represented by the above precoded vector signal in the recording medium, and a signal reading mechanism for reading the information recorded in the recording medium.

In the fourth aspect of the present invention, the dynamic modulo precoder 12-2 further comprises a control unit for performing determination whether the above precoding unit precodes the above optimum one of the first vector signals or the above second vector signal instead the optimum one of the first vector signals, to generate the above precoded vector signal, before performing the operation of the above plural-vector-signal generating unit, and controlling the operation of the precoding unit in accordance with the above determination.

(1) In the above construction for executing the fourth aspect of the present invention, the above control unit may comprise a tentative precoding unit for tentatively precoding the above second vector signal to obtain a tentatively-precoded vector signal, a power obtaining unit for tentatively obtaining the power of the tentatively-precoded vector signal, and a determining unit for determining that the above preceding unit precodes the above optimum one of the first vector signals to generate the above precoded vector signal when the power of the tentatively-precoded vector signal exceeds a predetermined value, and determining that the above precoding unit precodes second vector signal instead the optimum one of the first vector signals to generate the above precoded vector signal when the power of the tentatively-precoded vector signal does not exceed the above predetermined value.

(2) In the above construction for executing the fourth aspect of the present invention, the above control unit may comprise a tentative precoding unit for tentatively precoding the above second vector signal to obtain a tentatively-precoded vector signal, a precoder tap power obtaining unit for tentatively obtaining the power of the tentatively-precoded vector signal, a original power obtaining unit for obtaining the power of the second vector signal, and a determining unit for determining whether the above precoding unit precodes the above optimum one of the first vector signals or the above second vector signal instead the optimum one of the first vector signals, to generate the above precoded vector signal, based on the powers of the tentatively-precoded vector signal and the second vector signal.

BASIC CONSTRUCTION FOR EXECUTING FIFTH ASPECT OF INVENTION (FIG. 8)

Figure 8:
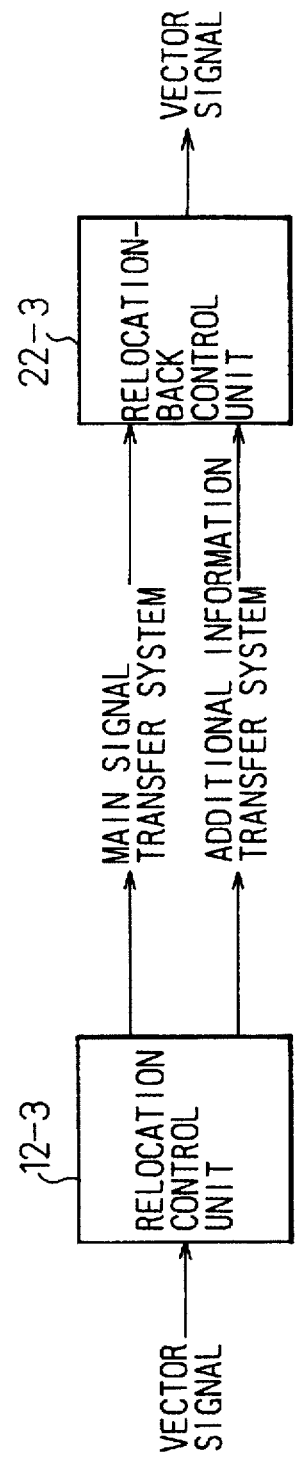
FIG. 8 is a diagram illustrating a basic construction for executing the process according to the fourth aspect of the present invention.

FIG. 8 is a diagram illustrating a basic construction for executing the process according to the fifth aspect of the present invention. In FIG. 8, reference numeral 12-3 denote a relocation unit, and 22-3 denotes a relocation-back unit.

Although not indicated in FIG. 8, the relocation control unit 12-3 comprises a relocation determining unit, a relocation unit, and a relocation information generating unit. The relocation determining unit obtains first information relating to positions of a first group of original vector signals having first vector components in a vector space, and determines whether or not the relocation of a plurality of portions of a predetermined area in the above vector space is to be performed, based on the first information. The relocation unit relocates the above plurality of portions, to obtain a second group of relocated vector signals having second vector components, corresponding to the above first group of the above original vector signals, when it is determined, by the above relocation determining unit, that the relocation of the above plurality of portions is to be performed. The relocation information generating unit generates second information indicating whether or not the relocation of the above plurality of portions is performed.

The signal transferring system transfers a third group of transmitting vector signals therethrough with a predetermined filtering characteristic which transforms the above third group of transmitting vector signals into a fourth group of transferred vector signals, where the above third group of transmitting vector signals are the above first group of original vector signals when it is determined, by the above relocation determining unit, that the relocation of the above plurality of portions is not to be performed, and the above third group of transmitting vector signals are the above second group of the relocated signal points when it is determined, by the above relocation determining unit, that the relocation of the above plurality of portions is to be performed.

The additional information transfer system transfers the above second information through a second signal transferring system.

The relocation-back control unit 22-3 comprises an additional information receiving unit and a conversion unit. The additional information receiving unit receives the above second information from the above second signal transfer system. The conversion unit receives the above fourth group of transferred vector signals, and converting the above fourth group of transferred vector signals to the above first group of original vector signals, based on the above second information.

In the above construction for executing the fifth aspect of the present invention, in the above relocation determining unit, the above first information relating to the positions of the first group of the above original vector signals, may be a result of comparison of a first sum of the powers of the first group of the above original vector signals, and a second sum of the powers of the above second group of relocated vector signals, and the above relocation determining unit determines that the relocation of the above plurality of portions may be to be performed when the above first sum is smaller than the second sum, and the above relocation determining unit determines that the relocation of the above plurality of portions is not to be performed when the above first sum is greater than the second sum.

In the above construction for executing the fifth aspect of the present invention, the above relocation area may be one of four portions of an area in which the original vector signals can be located, and the above four portions are respectively located in four quadrants in the above vector space, and in the above relocation the above plurality of portions may be exchanged in a symmetric position with regard to the origin of the vector space.

In the above construction for executing the fifth aspect of the present invention, the above signal transferring system may contain a signal recording medium, a vector signal recording mechanism for recording in a recording medium, the above first group of original vector signals and the above second information when it is determined, by the above relocation determining unit, that the relocation of the above plurality of portions is not to be performed, and outputting the above second group of the relocated signal points and the above second information when it is determined, by the above relocation determining unit, that the relocation of the above plurality of portions is to be performed, and a reading step for reading the same information recorded in the recording medium.

BASIC CONSTRUCTION FOR EXECUTING SIXTH ASPECT OF INVENTION

Although not indicated, according to the sixth aspect of the present invention, in the any of the above constructions for executing the first to fifth aspects of the present invention, the above inter-symbol-interfered signal points distribute in an inter-symbol-interfered-signal-point distribution area in the above vector space, and in the operations of the above modulo hard decision unit and the above soft decision unit, it is assumed that there are imaginary peripheral inter-symbol-interfered signal points around the above inter-symbol-interfered signal points.

FIRST EMBODIMENT (FIG. 9)

Figure 9:
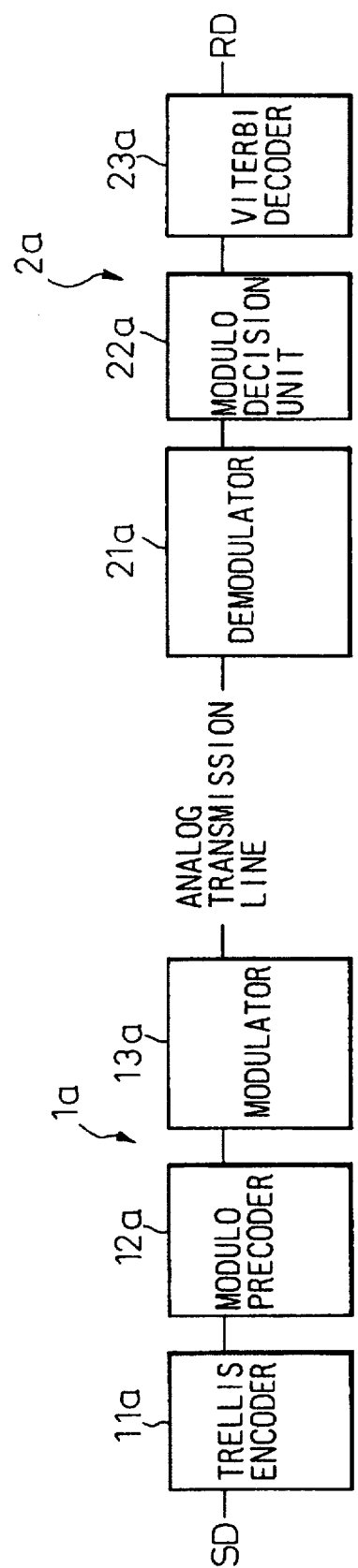
FIG. 9 is a diagram illustrating a construction of the first embodiment of the present invention.

FIG. 9 is a diagram illustrating a construction of the first embodiment of the present invention. The first embodiment corresponds to the first aspect of the present invention, and therefore the construction of FIG. 9 corresponds to the construction of FIG. 5. In FIG. 9, reference numeral 1a denotes a modulation apparatus, 2a denotes a demodulation apparatus, 11a denotes a Trellis encoder, 12a denotes a modulo precoder, 13a denotes a modulator, 21a denotes a demodulator, 22a denotes a modulo decision unit, and 23a denotes a Viterbi decoder. In the embodiment of FIG. 9, the modulated signal transfer portion 3 in FIG. 5 is an analog transmission line, the convolutional encoder 11 in FIG. 5 is realized by the Trellis encoder 11a, and the soft decision unit 23 in FIG. 5 is realized by the Viterbi decoder 23a.

Figure 10:
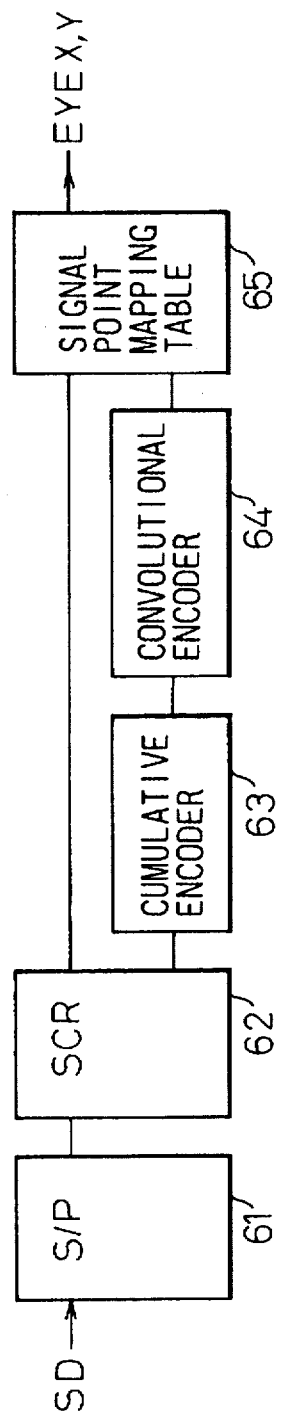
FIG. 10 is a diagram illustrating a construction provided on a transmitter side containing a Trellis encoder.
Figure 11:
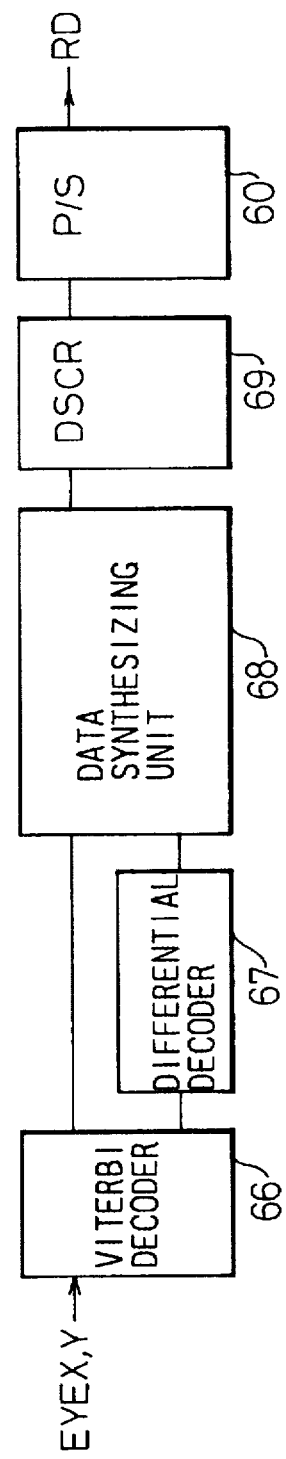
FIG. 11 is a diagram illustrating a construction provided on a receiver side for performing a soft decision.
Figure 12:
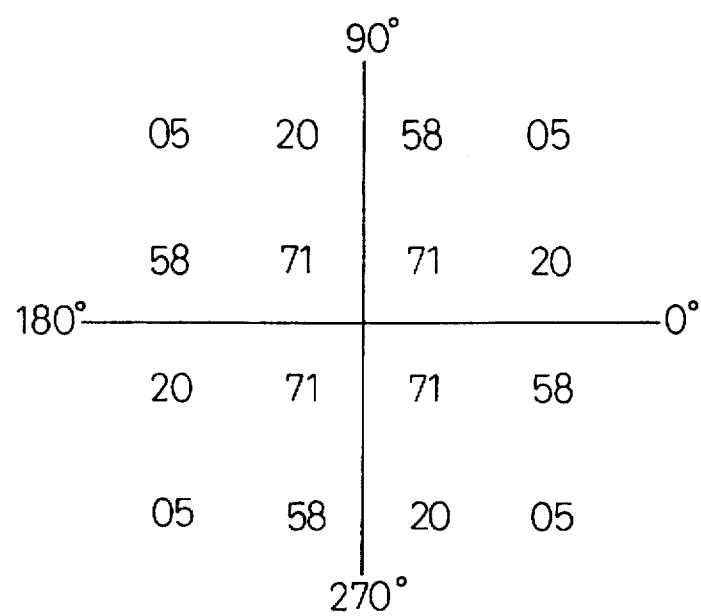
FIG. 12 is a diagram illustrating arrangement of signal points in the two-dimensional vector space by 16 representative signal points among all of the signal points represented by 10 bits.

TRELLIS ENCODER (FIGS. 10, 11 and 12, Tables 2-1 to 2-4)

As a Trellis encoder, the 8-state Trellis encoder is conventionally known (cf. ITU-T recommendations, V.33, V.32, and V.32 bis). By using the 8-state Trellis encoders defined in the ITU-T recommendations, V.33, V.32, and V.32 bis, transmitted signals can be received and decoded with no trouble even when phases of signal points are rotated by 90 degrees during the transmission.

However, the coding gain obtained by use of the conventional 8-state Trellis encoder, is only 3.0 dB. This value of the coding gain seems not to be sufficient. A possible alternative among the conventional techniques, is use of a multi-dimensional Trellis modulation, in which a redundancy bit is shared by more than one symbols. However, the processing of the multi-dimensional Trellis modulation is very complicated, and absolute delay time in the apparatus is increased by the use of the multi-dimensional Trellis modulation. Therefore, the use of the multi-dimensional Trellis modulation is not desirable.

Another way to improve the performance of the Trellis encoder is to increase the number of states in the Trellis encoder. However, conventionally, there is no Trellis encoder which realizes transmission of signals with no trouble in the case wherein phases of signal points are rotated by 90 degrees during the transmission. According to the second embodiment of the present invention, a 16-state Trellis encoder which realizes transmission of signals with no trouble in the case wherein phases of signal points are rotated by 90 degrees during the transmission, is constructed.

FIG. 10 is a diagram illustrating a construction provided on a transmitter side containing a Trellis encoder. In FIG. 10, reference numeral 61 denotes a serial-to-parallel conversion circuit, 62 denotes a scrambler, 63 denotes a cumulative encoder, 64 denotes a convolutional encoder, and 65 denotes a signal point mapping table. Serial input data is converted to 9-bit parallel data by the serial-to-parallel conversion circuit 61, and the 9-bit parallel data is then scrambled by the scrambler 62. The scrambled 9-bit parallel data is divided into an uncoded portion of 7 bits and a TCM (Trellis-coded modulation) portion of 2 bits. The TCM portion indicates a phase of a signal point. The cumulative encoder 63 obtains a sum of the above TCM portion of 2 bits and the previous output of the cumulative encoder 63, and outputs the sum in the form of 2-bit data. In the cumulative encoder 63, the sum of the phases is obtained. The input-output relationship of the cumulative encoder 63 is indicated on the left side of Tables 2-1 to 2-4. The convolutional encoder 64 is a Trellis encoder in this embodiment, and outputs a Trellis-encoded 3-bit output in response to 2-bit input from the cumulative encoder 63. The signal point mapping table 65 outputs data of a signal point based on the above 7-bit uncoded portion and the 3-bit output of the convolutional encoder 64.

FIG. 11 is a diagram illustrating a construction provided on a receiver side for performing a soft decision. In FIG. 11, reference numeral 66 denotes a Viterbi decoder, 67 denotes a differential decoder, 68 denotes a data synthesizing unit, 69 denotes a descrambler, and 60 denotes a parallel-to-serial converter. The Viterbi decoder 66 decodes received data, and outputs an uncoded portion of 7 bits and a coded portion of 3 bits. The differential decoder 67 obtains a difference between the currently input data of 2 bits and the previously input data of 2 bits, and outputs the difference in the form of 2-bit data. Corresponding to the cumulative encoder 63 on the transmitter side, the differential decoder 67 obtains a difference of phases. The input-output relationship of the cumulative encoder 63 is indicated on the right side of Tables 2-1 to 2-4. The data synthesizing unit 68 synthesizes the above 7-bit data from the Viterbi decoder 66 and the above 2-bit data from the differential decoder 67, to obtain a 9-bit data. The descrambler 69 descrambles the 9-bit data, and the parallel-to-serial converter 60 converts the 9-bit data into a serial output data. The provisions of the cumulative encoder 63 on the transmitter side and the differential decoder 67 on the receiver side eliminate an influence of the phase rotation of 90 degrees.

FIG. 12 is a diagram illustrating arrangement of signal points in the two-dimensional vector space by 16 representative signal points among all of the signal points represented by 10 bits. In FIG. 12, the uncoded portions of 7 bits are indicated by the numbers denoted by hexadecimal notations, and the locations of the respective signal points are determined by the 3-bit output of the Trellis encoder. Due to the arrangement of signal points as indicated in FIG. 12, transmission of signals can be performed with no trouble in the case wherein phases of signal points are rotated by 90 degrees during the transmission.

Table 2-1 indicate a relationship of the input and output of the cumulative encoder 63 on the transmitter side, and the input and output of the differential decoder 67 on the receiver side, in the case of the phase rotation during transmission is equal to 0°. When the phase of the input of the cumulative encoder 63 is 0°, the corresponding possible outputs of the cumulative encoder 63 are 0°, 90°, 180°, and 270°, corresponding to the cases wherein the previous outputs of the cumulative encoder 63 are 0°, 90°, 180°, and 270°, respectively. These possible outputs of the cumulative encoder 63 become possible inputs of the differential decoder 67, and in this case, the above previous outputs of the cumulative encoder 63 are stored in the differential decoder 67. Therefore, the differences are equal to the above input of the cumulative encoder 63 regardless of the previous outputs of the cumulative encoder 63. Namely, the input of the cumulative encoder 63 is always equal to the output of the differential decoder 67 in the case of the phase rotation during transmission is equal to 0°.

Table 2-2 indicate a relationship of the input and output of the cumulative encoder 63 on the transmitter side, and the input and output of the differential decoder 67 on the receiver side, in the case of the phase rotation during transmission is equal to 90°. Since the phase rotation of 90° is occurred during the transmission, the input of the differential decoder 67 differs by 90° from the output of the cumulative encoder 63. In addition, the previous input of the differential decoder 67 also differs by 90° from the previous output of the cumulative encoder 63. Therefore, the influence of the phase rotation is cancelled in the difference output of the differential decoder 67. Namely, the input of the cumulative encoder 63 is always equal to the output of the differential decoder 67 in the case of the phase rotation during transmission is equal to 90°.

Table 2-3 indicate a relationship of the input and output of the cumulative encoder 63 on the transmitter side, and the input and output of the differential decoder 67 on the receiver side, in the case of the phase rotation during transmission is equal to 180°, and Table 2-4 indicate a relationship of the input and output of the cumulative encoder 63 on the transmitter side, and the input and output of the differential decoder 67 on the receiver side, in the case of the phase rotation during transmission is equal to 270°. For the same reason as the above case of the phase rotation of 90°, the input of the cumulative encoder 63 is always equal to the output of the differential decoder 67 in the cases of the phase rotation during transmission is equal to 180° or 270°. Thus, due to the provisions of the cumulative encoder 63 on the transmitter side and the differential decoder 67 on the receiver side eliminate an influence of the phase rotation.

Figure 13:
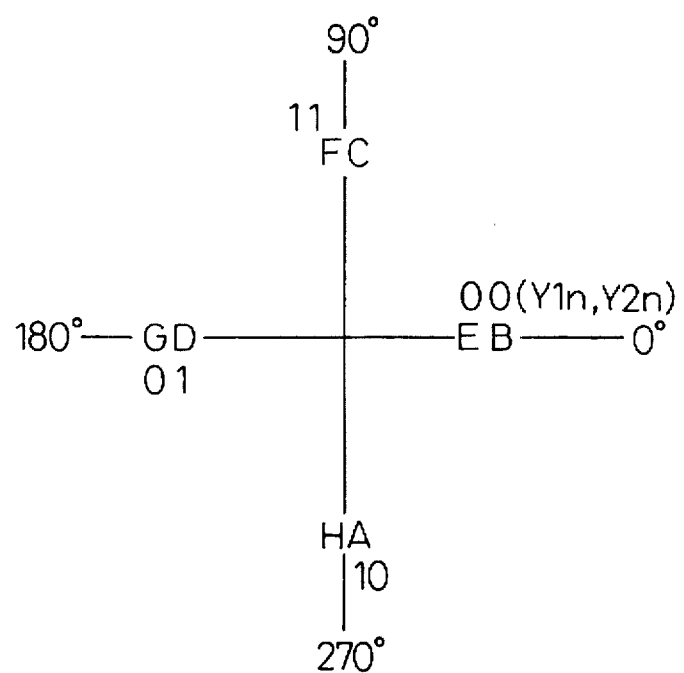
FIG. 13 is a diagram illustrating arrangement of TCM signal points.

ARRANGEMENT OF TCM SIGNAL POINTS
(FIG. 13, Table 3)

FIG. 13 is a diagram illustrating arrangement of TCM signal points. The TCM signal points are signal points corresponding to the aforementioned TCM portion of 2 bits, which are denoted by $Y_{1n}$ and $Y_{2n}$. Since these two bits are input into the Trellis encoder, and output unchanged, the 3-bit output of the Trellis encoder are denoted by $Y_{0n}$, $Y_{1n}$, and $Y_{2n}$, where $Y_{0n}$ is a bit added by the Trellis encoder. In FIG. 13, "A" to "H" respectively indicate a subset defined by the 3-bit output of the Trellis encoder. Table 3 indicates the definitions of the subsets. As indicated in FIG. 13, the subsets are located with an interval of 90°.

Figure 14:
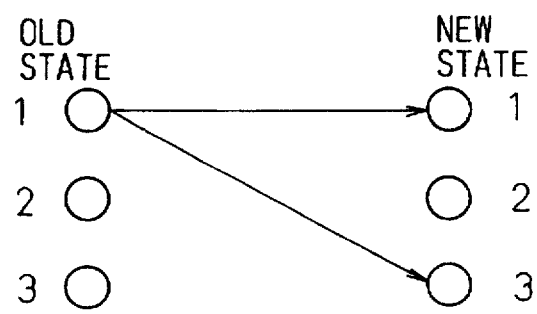
FIG. 14 is an explanatory diagram illustrating a simple example of a state transition diagram of a Trellis encoder.
Figure 15:
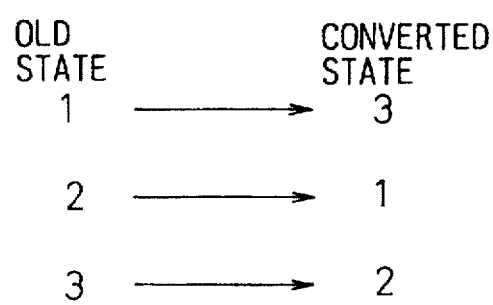
FIG. 15 is a diagram illustrating an example of conversion of states due to a phase rotation.
Figure 16:
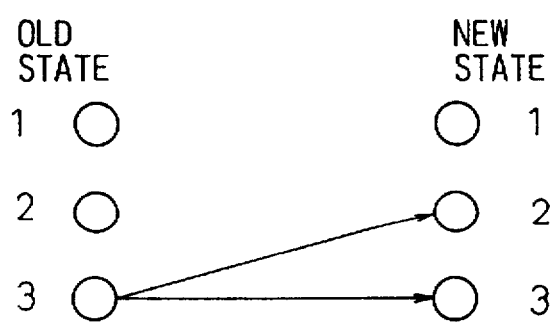
FIG. 16 is an explanatory diagram illustrating a state transition diagram after the states are converted in accordance with the conversion of FIG. 15.

GENERAL REQUIREMENTS FOR 16-STATE TRELLIS ENCODER (FIGS. 14 to 16)

For obtaining a 16-state Trellis encoder for use in the construction of FIGS. 9 and 10, a structure of a two-dimensional 16-state Trellis encoder which realizes transmission of signals with no trouble in the case wherein phases of signal points are rotated by 90 degrees during the transmission, is determined as an embodiment of the seventh aspect of the present invention.

The continuity of the operation on the receiver side when the phase of a signal point is rotated during the transmission in the case wherein a 16-state Trellis encoder is used on the transmitter side is considered below.

When a signal is transmitted through a transmission line, phases of received carriers are variable. Therefore, when a signal point A is transmitted from the transmitter side, the receiver side may receive one of the signal point A, a signal point rotated by 90° from the signal point A, a signal point rotated by 180° from the signal point A, and a signal point rotated by 270° from the signal point A. The phase change less than 90° is not considered here because the phase change less than 90° can be absorbed by a known carrier automatic phase control circuit (CAPC).

Due to the above phase rotation, a state transition diagram memorized in the Viterbi decoder corresponding to the Trellis encoder, may be shifted to another state transition diagram. Therefore, it is required that the state transition diagram of the Trellis encoder is not changed by the phase rotation.

FIG. 14 is an explanatory diagram illustrating a simple example of a state transition diagram of a Trellis encoder, FIG. 15 is a diagram illustrating an example of conversion of states due to a phase rotation, and FIG. 16 is an explanatory diagram illustrating a state transition diagram after the states are converted in accordance with the conversion of FIG. 15. In FIG. 14, the old state 1 can be transited to the new states 1 or 3 in response to a Trellis code. When the states 1, 2, and 3 are converted to the states 3, 1, and 2, respectively, as indicated in FIG. 15, the state transition diagram of FIG. 14 is changed to the new state transition diagram as indicated in FIG. 16.

In the case of 16-state Trellis encoder, there are sixteen possible different state transitions from each old state. On the other hand, since the possible phase rotations are four types of 0°, 90°, 180°, and 270°, it is required that four of the sixteen state transitions obtained in response to the four phase rotations should coincide with the original state transition. In other words, the four state transitions should be equivalent for the receiver side.

In addition, in order to improve the SNR characteristic of the received signals, the inter-code distances should be maximized between all pairs of transition paths. Further, it is desirable that all transition paths are uniform.

Corresponding to the 2-bit input of the Trellis encoder, there are four possible transition paths from each old state in response to each input of the Trellis encoder (corresponding to each input of the Viterbi decoder). In order to make the distances between paths in the Trellis diagram uniform and maximum, it may be optimum that the above four transition paths are determined so that the new states are located every four states. In this case, one of the four transition paths should be a transition to the same state.

Further, when one transition path is determined, three other transition paths are automatically determined corresponding to the phase rotations of 90°, 180°, and 270°. Since, as mentioned above, there are the four transition paths from each old state corresponding to the 2-bit input of the Trellis encoder, the determinations of the four transition paths from each old state should be determined so that when all of the possible transition paths are determined as above, a set of new states should coincide with the sixteen states.

Figure 17:
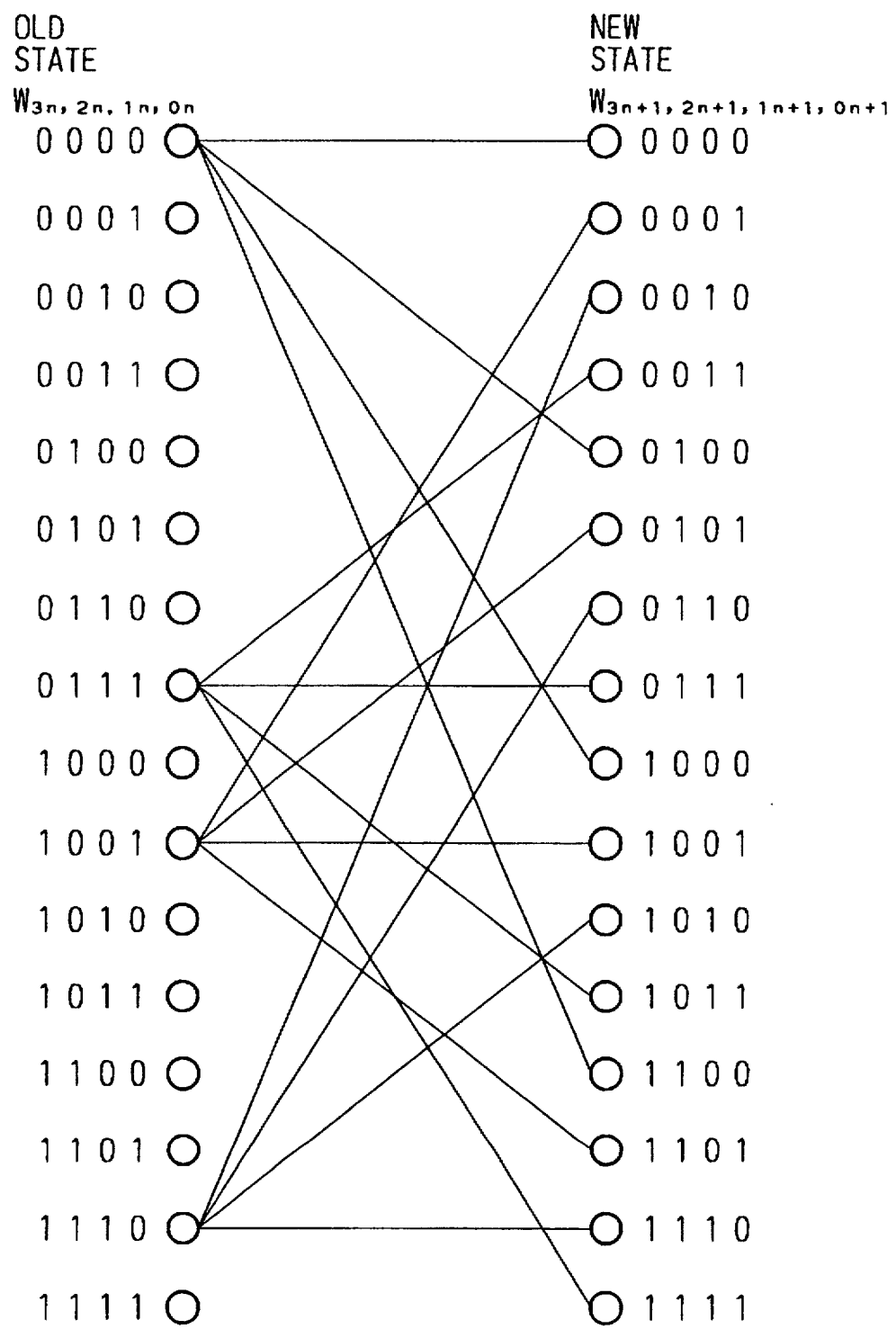
FIG. 17 is a diagram illustrating the transition paths determined in the first step.
Figure 18:
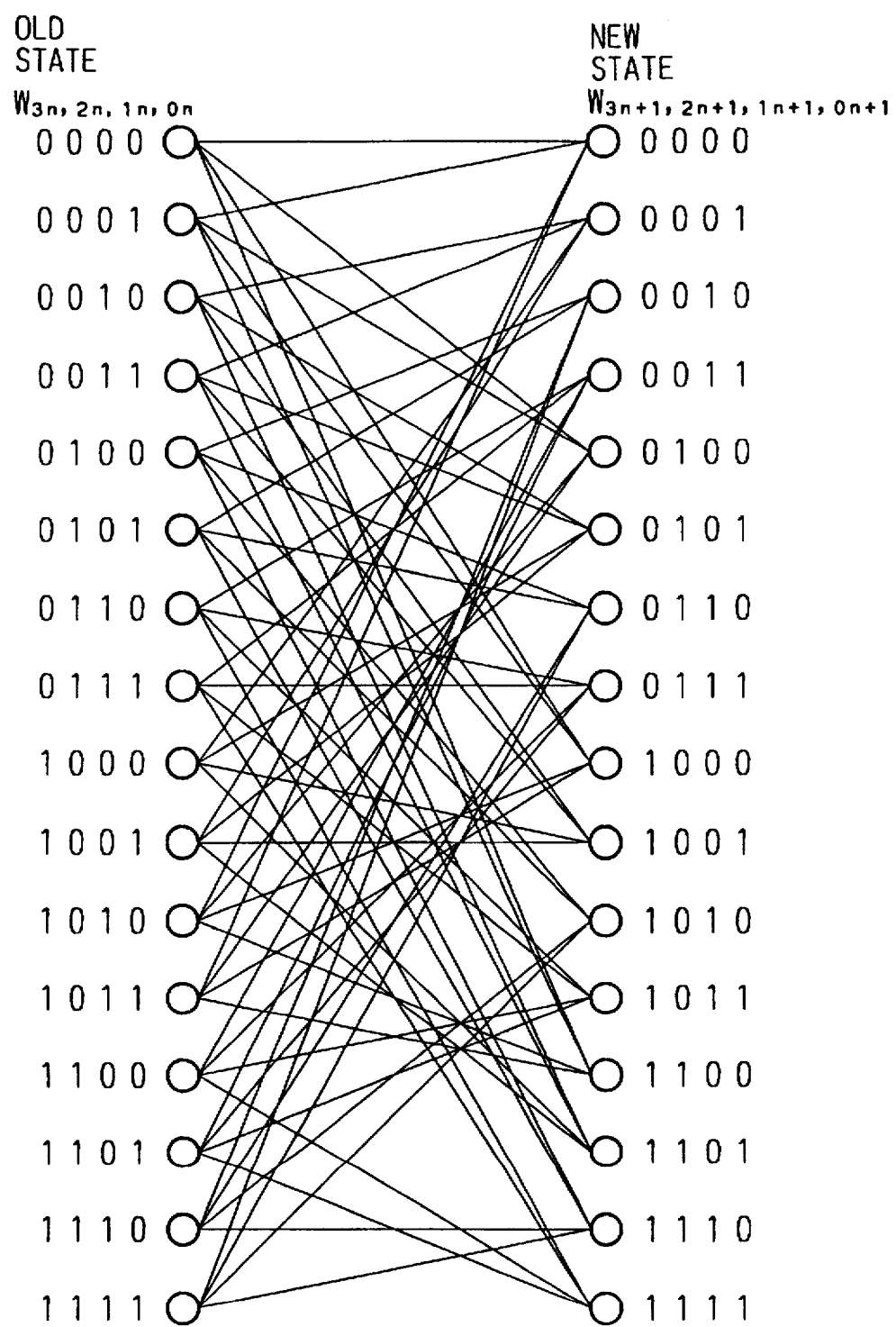
FIG. 18 is a diagram illustrating a state transition diagram determined according to the embodiment of the seventh aspect of the present invention.

DETERMINATION OF STATE TRANSITION PATHS (FIGS. 17 and 18, Table 4)

Taking the above requirements into consideration, a conjecturally-optimum state transition diagram is determined as explained below.

First, the sixteen states are divided into four groups of (0, 4, 8, C), (1, 5, 9, D), (2, 6, A, E), and (3, 7, B, F), where the respective states are denoted by numbers 1 to F by hexadecimal notation.

Then, the relationship between the old and new states in the conversion of the states in response to the phase rotations of 0°, 90°, 180°, and 270° is defined as indicated in Table 4. The relationship of Table 4 is determined based on the following conditions.

(1) The relationship for the phase rotations of 90°, 180°, and 270°, are determined in accordance with the changes of the sum of phases in the cumulative encoder 63, as indicated in FIG. 13.

(2) The horizontal transitions from the four old states converted from any state in response to the phase rotations of 0°, 90°, 180°, and 270°, to the same states as the respective old states, are seen to be equivalent from the receiver side.

(3) The above division into the four groups are not changed by the phase rotations of 90°, 180°, and 270°.

(4) The order of the states in each group is cyclically rotated for each additional rotation of 90°. For example, the group (0, 4, 8, C) is converted to (C, 0, 4, 8), (8, C, 0, 4), and (4, 8, C, 0) in response to the phase rotations of 90°, 180°, and 270°.

Based on the above relationship of Table 4, the transition paths are determined as follows.

First, three old states E, 9, and 7 are determined as old states converted from the old state 0 in response to the phase rotations of 90°, 180°, and 270°, respectively. Then, four new destinations (new states) from the respective old states 0, E, 9, and 7, are determined.

The four new destinations from the old state 0 are the new states 0, 4, 8, and C, which are determined as every four states from the same state 0. Then, the four new destinations (new states) from the other three old states E, 9, and 7 are determined based on the relationship of Table 4, as follows.

| Phase Rotation | Old State | New States |
| --- | --- | --- |
| 0° | 0 | 0, 4, 8, C |
| 90° | E | E, 2, 6, A |
| 180° | 9 | 9, D, 1, 5 |
| 270° | 7 | 7, B, F, 3 |

FIG. 17 is a diagram illustrating the transition paths determined as above. In FIG. 17, the numbers of the states are indicated by binary notations.

Next, the next old state 1 is connected to the new state 0, and the old state 1 is connected to the new states 4, 8, and C, which are determined as every four states from the new state 0. Further, three old stakes F, 8, and 6 are determined as old states converted from the old state 1 in response to the phase rotations of 90°, 180°, and 270°, respectively. Then, four new destinations (new states) from the respective old states F, 8, and 6, are determined, and are connected to the old state 1.

By repeating the above operations for each of the remaining old states, finally, the state transition diagram as indicated in FIG. 18 is obtained.

DETERMINATION OF SUBSETS (FIGS. 19 to 22)

Since the state transitions occurs in response to the input of 2-bit data (the TCM portion) or the output of a Trellis code of three bits in the Trellis encoder, or in response to reception of the Trellis code of three bits in the Viterbi decoder, the subsets indicated in FIG. 12 and Table 3 should be assigned to each of the state transitions in the state transition diagram. When considering the distances between Trellis paths in the operations in the viterbi decoder, the subsets indicated in FIG. 12 and Table 3 are divided into two groups of (A, B, C, D) and (E, F, G, H). However, in order to maximize the distances between the signal points, the subsets indicated in FIG. 12 and Table 3 are divided in a different manner into two groups of (E, G, C, A) and (B, D, F, H). In accordance with the 8-state Trellis encoder by ITU-T recommendations, V.33, V.32, and V.32 bis, one of the order of the subsets in the first group is determined as (E, C, A, G).

First, the subsets in the group (E, C, A, G) are assigned to the respective state transitions from the old state 0 (corresponding to the phase rotation of 0°) to the new states 0, 4, 8, and C, respectively. These assignments are indicated as follows.

| Old State | Subset—New State |
|---|---|
| 0 | E—0, C—4, A—8, G—C |

Next, the subsets to be assigned to the respective state transitions from the old state E (corresponding to the phase rotation of 90°) to the new states E, 2, 6, and A, are determined. In this case, the above group (E, C, A, G) is converted to (F, D, B, H), and the assignments are indicated as follows.

| Old State | Subset—New State |
|---|---|
| E | F—E, D—2, B—6, H—A |

When the order of subsets in the above converted group (F, D, B, H) is changed according to the order the new states (2, 6, A, E), the above assignments are indicated as follows.

| Old State | Subset—New State |
|---|---|
| E | D—2, B—6, H—A, F—E |

Therefore, the subsets of the group (D, 9, H, F) are assigned, in this order of (D, B, H, F), to the respective transitions from the old state E, which is the state determined by the conversion from the old state 0 in response to the phase rotation of 90°.

Similarly, the subsets to be assigned to the respective state transitions from the old state 9 (corresponding to the phase rotation of 180°) to the new states 9, D, 1, and 5, are determined. In this case, the above group (E, C, A, G) is converted to (G, A, C, E), and the assignments are determined as follows.

| Old State | Subset—New State |
|---|---|
| 9 | G—9, A—D, C—1, E—5 |

When the order of subsets in the above converted group (G, A, C, E) is changed according to the order of the new states (1, 5, 9, D), the above assignments are indicated as follows.

| Old State | Subset—New State |
|---|---|
| 9 | C—1, E—5, G—9, A—D |

Therefore, the subsets of the group (C, E, G, A) are assigned, in this order of (C, E, G, A), to the respective transitions from the old state 9, which is the state determined by the conversion from the old state 0 in response to the phase rotation of 180°.

In the same way, the assignments which are obtained corresponding to the phase rotation of 270° are determined as follows.

| Old State | Subset—New State |
|---|---|
| 7 | H—7, B—B, D—F, F—3 |

When the order of subsets in the above converted group (H, B, D, F) is changed according to the order of the new states (3, 7, B, F), the above assignments are indicated as follows.

| Old State | Subset—New State |
|---|---|
| 7 | F—3, H—7, B—B, D—F |

Figure 19:
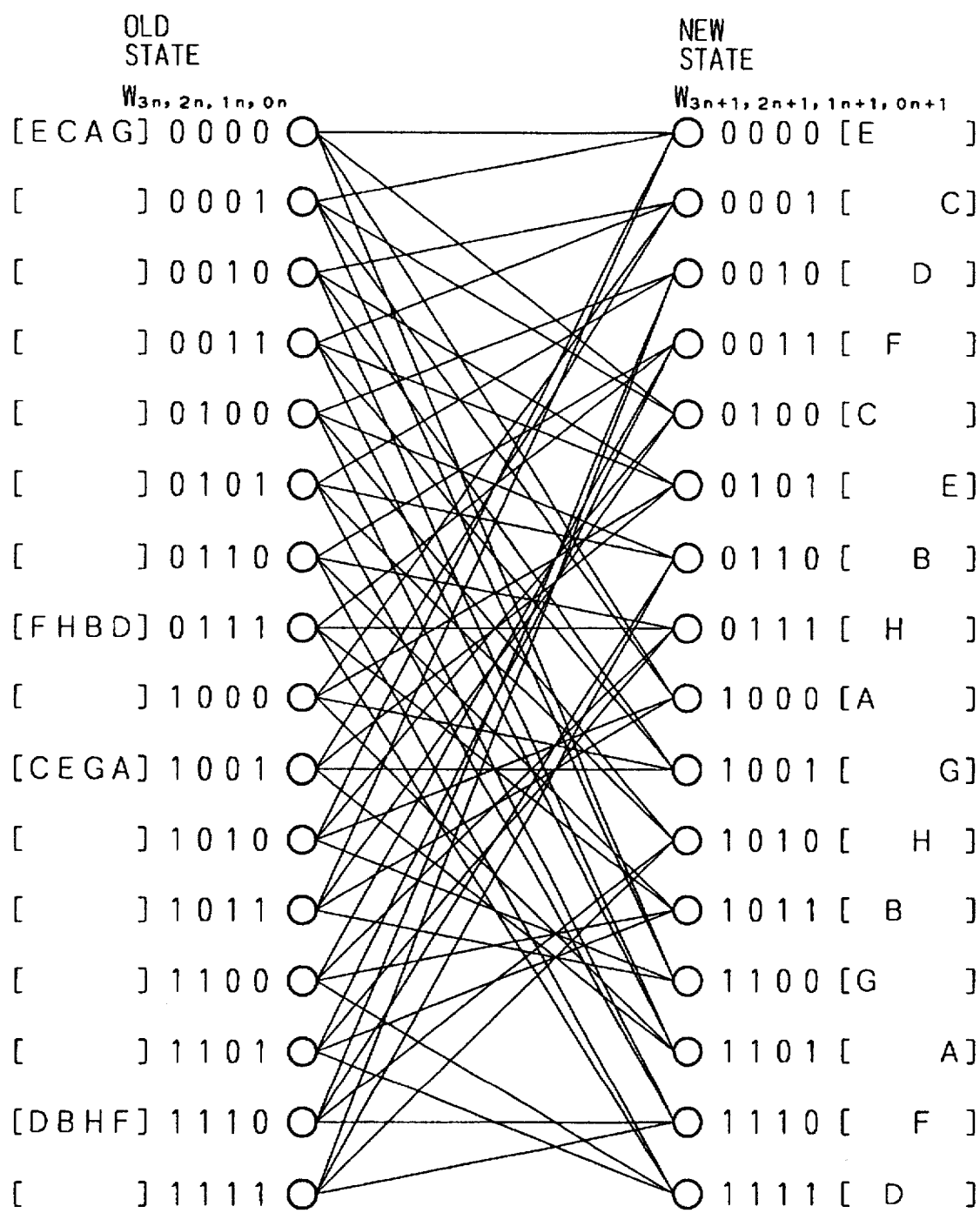
FIG. 19 is a diagram illustrating a state transition diagram wherein the subsets are assigned to the state transitions from the old states 0, E, 9, and 7.

Therefore, the subsets of the group (F, H, B, D) are assigned to the respective transitions from the old state 7, which is the state from the old state 0 in response to the phase rotation of 270°. The above assignments of the subsets are indicated in FIG. 19. In FIG. 19, the assigned subsets are indicated at the start and end states of the state transitions.

Next, the subsets to be assigned to the respective state transitions from the old state 1, are determined.

When considering the subsets assigned to the new states connected to the old state 1 in FIG. 19, the subsets in the group (E, C, A, G) should be assigned to the respective state transitions from the old state 1 (corresponding to the phase rotation of 0°) to the new states 0, 4, 8, and C. However, the assignment of the subsets in the order of (E, C, A, G) is already used for the state transitions from the old state 0. Therefore, the subsets in the order of (A, G, E, C) are assigned to the state transitions from the old state 1. This order corresponds to the assignment to the state transitions from the old state 1 in the ITU-T recommendations, V.33, V.32, and V.32 bis for the 8-state Trellis encoder.

When the subsets in the group (A, G, E, C) are assigned to the respective state transitions from the old state 1 to the new states 0, 4, 8, and C, respectively, for the respective phase rotations. These assignments are indicated as follows.

| Phase Rotation | Old State | New States |
|---|---|---|
| 0° | 1 | A—0, G—4, E—8, C—C |
| 90° | F | B—E, H—2, F—0 D—A |
| 90° | 8 | C—9, A—5, G—1, E—D |
| 270° | 6 | D—7, F—B, H—F, B—3 |

When the orders of subsets in the above converted groups are changed according to the order of the new states, respectively, the above assignments are indicated as follows.

| Phase Rotation | Old State | New States |
|---|---|---|
| 0° | 1 | A—0, G—4, E—8, C—C |
| 90° | F | H—2, F—9, D—A, B—E |
| 90° | 8 | G—1, A—5, C—9, E—D |
| 270° | 6 | B—3, D—7, F—B, H—F |

Figure 20:
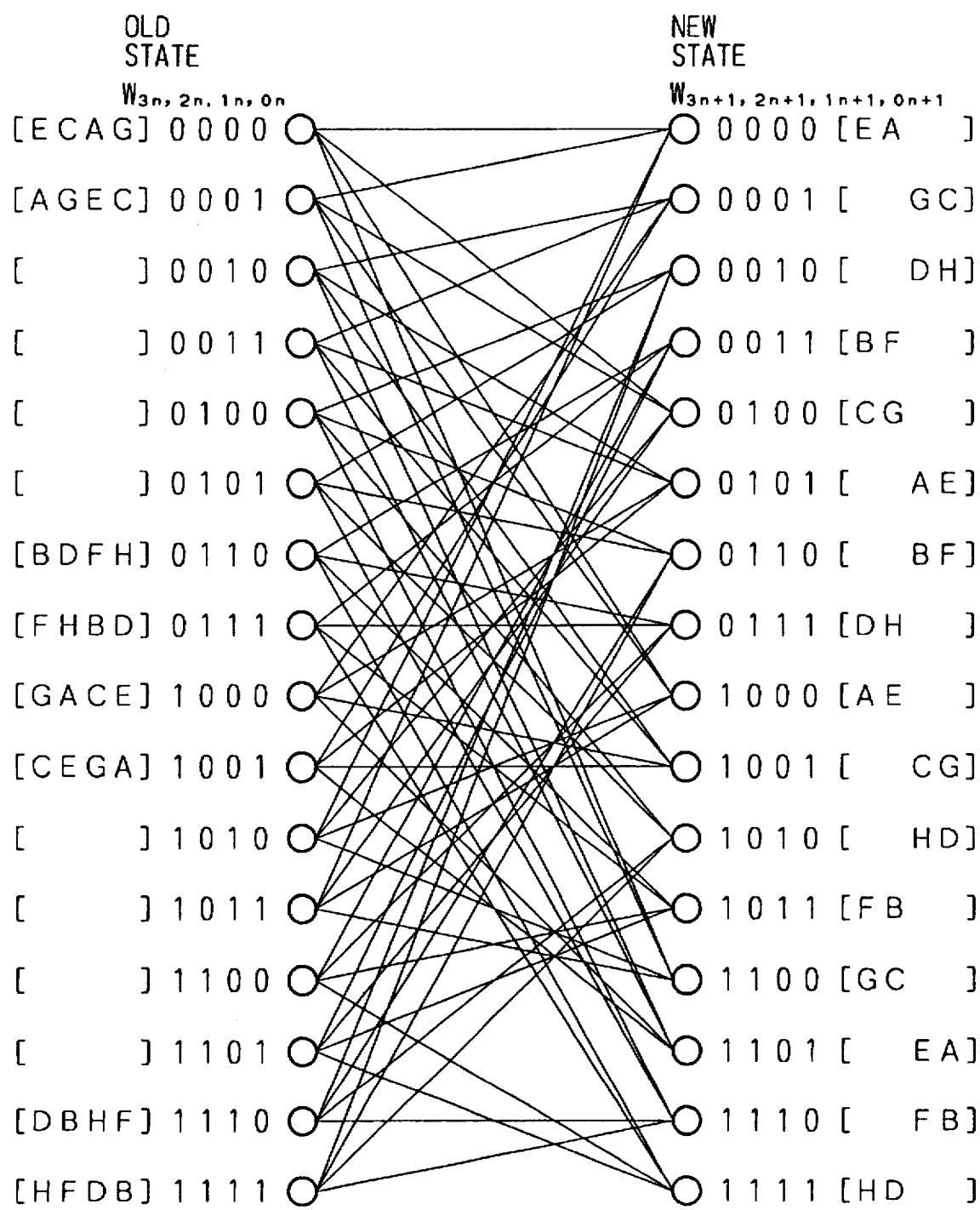
FIG. 20 is a diagram illustrating a state transition diagram wherein the subsets are assigned to the state transitions from the old states 1, F, 8, and 6, in addition to the assignment indicated in FIG. 19.

Therefore, the subsets of the group (H, F, D, B) are assigned to the respective transitions from the old state F, the subsets of the group (G, A, C, E) are assigned to the respective transitions from the old state 8, and the subsets of the group (B, D, F, H) are assigned to the respective transitions from the old state 6. The above assignments of the subsets are indicated in FIG. 20.

The subsets to be assigned to the respective state transitions from the old state 2, are those in the group (E, G, A, C) or (A, C, E, G). In this embodiment, the subsets in the group (E, G, A, C) are assigned to the state transitions. In this case, the following assignments are determined.

| Phase Rotation | Old State | New States |
|---|---|---|
| 0° | 2 | E--1, G--5, A--9, C--D |
| 90° | D | F--F, H--3, B--7, D--B |
| 90° | B | G--8, E--C, C--0, A--4 |
| 270° | 4 | H--6, F--A, D--E, B--2 |

When the orders of subsets in the above converted groups are changed according to the order of the new states, respectively, the above assignments are indicated as follows.

| Phase Rotation | Old State | New States |
|---|---|---|
| 0° | 2 | E--1, G--5, A--9, C--D |
| 90° | D | H--3, B--7, D--B, F--F |
| 90° | B | C--0, A--4, G--8, E--C |
| 270° | 4 | B--2, H--6, F--A, D--E |

Figure 21:
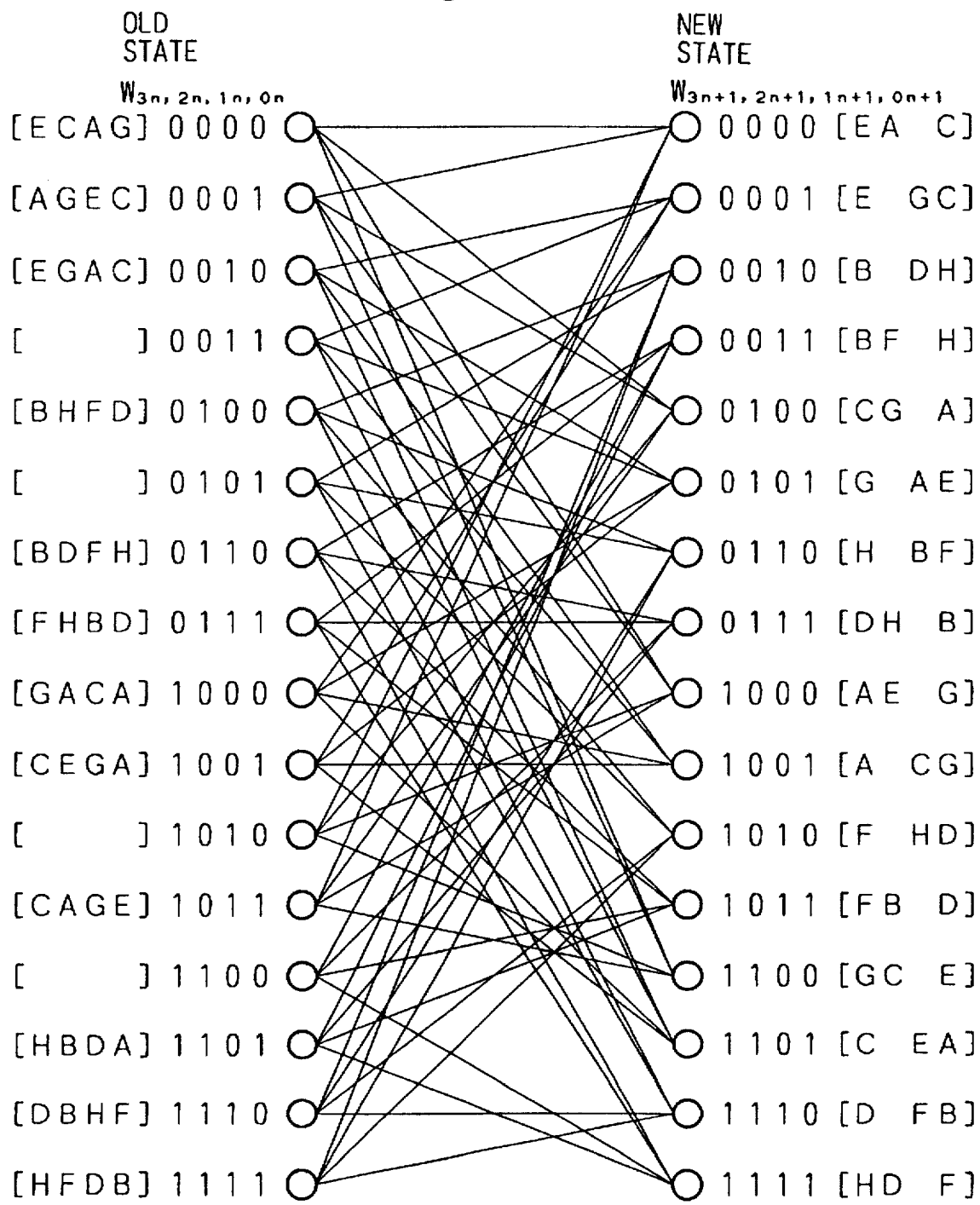
FIG. 21 is a diagram illustrating a state transition diagram wherein the subsets are assigned to the state transitions from the old states 2, D, B, and 4, in addition to the assignment indicated in FIG. 20.

Therefore, the subsets of the group (H, B, D, F) are assigned to the respective transitions from the old state D, the subsets of the group (C, A, G, E) are assigned to the respective transitions from the old state B, and the subsets of the group (B, H, F, D) are assigned to the respective transitions from the old state 4. The above assignments of the subsets are indicated in FIG. 21.

The subsets to be assigned to the respective state transitions from the old state 3, are those in the group of (A, C, E, G). In this case, the following assignments are determined.

| Phase Rotation | Old State | New States |
|---|---|---|
| 0° | 3 | A--1, C--5, E--9, G--D |
| 90° | C | B--F, D--3, F--7, H--B |
| 90° | A | C--8, A--C, G--0, E--4 |
| 270° | 5 | D--6, B--A, H--E, F--2 |

When the orders of subsets in the above converted groups are changed according to the order of the new states, respectively, the above assignments are indicated as follows.

| Phase Rotation | Old State | New States |
|---|---|---|
| 0° | 3 | A--1, C--5, E--9, G--D |
| 90° | C | D--3, F--7, H--B, B--F |
| 90° | A | G--0, E--4, C--8, A--C |
| 270° | 5 | F--2, D--6, B--A, H--E |

Figure 22:
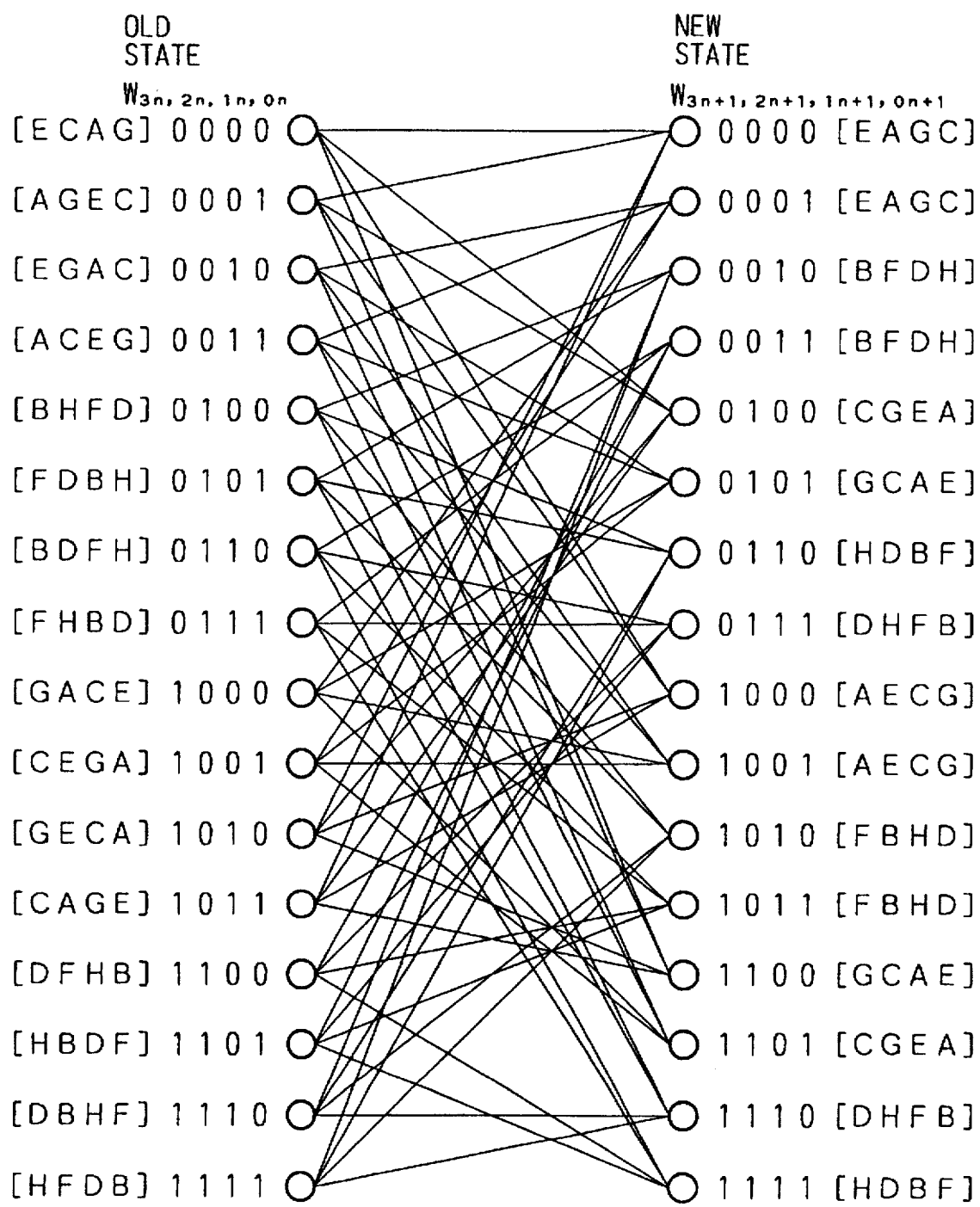
FIG. 22 is a diagram illustrating a state transition diagram wherein the subsets are assigned to the state transitions from the old states 3, 4, A, and 5, in addition to the assignment indicated in FIG. 21.

Therefore, the subsets of the group (D, F, H, B) are assigned to the respective transitions from the old state C, the subsets of the group (G, E, C, A) are assigned to the respective transitions from the old state A, and the subsets of the group (F, D, B, H) are assigned to the respective transitions from the old state 5. The above assignments of the subsets are indicated in FIG. 22. Thus, the state transition diagram for a 16-state Trellis encoder which realizes transmission of signals with no trouble in the case wherein phases of signal points are rotated by 90 degrees during the transmission, with the assignment of subsets, is completed.

Figure 23:
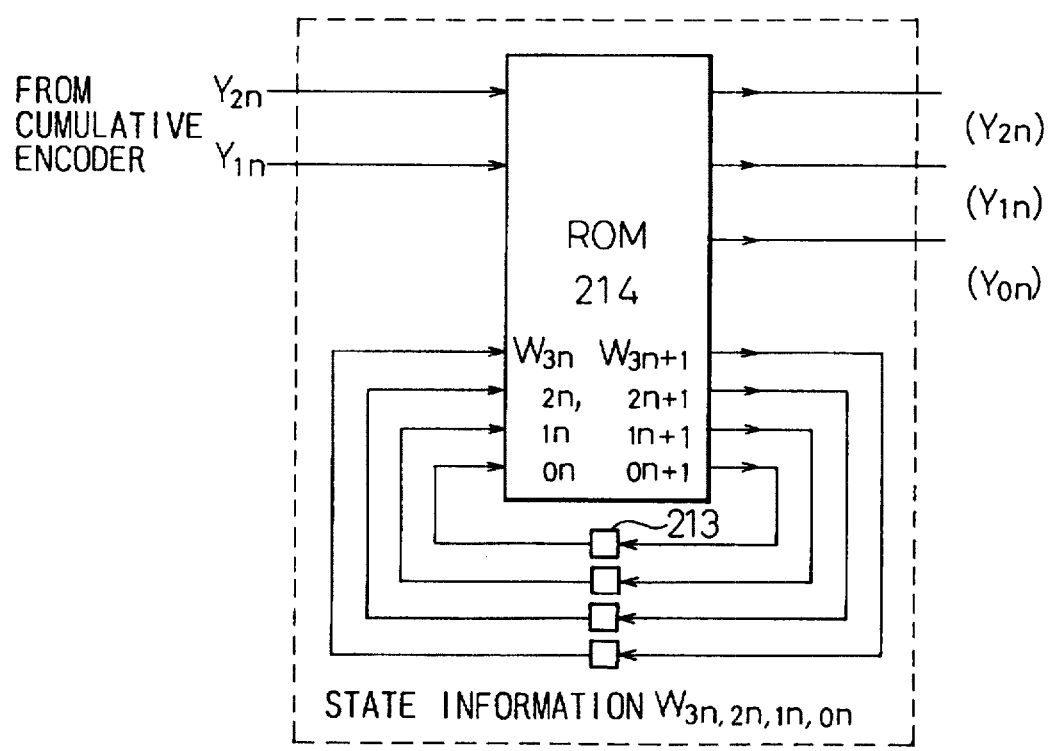
FIG. 23 is a diagram illustrating a hardware construction of the 16-state Trellis encoder in the embodiment of the present invention.

HARDWARE CONSTRUCTION OF TRELLIS ENCODER (FIG. 23, Tables 5-1 and 5-2)

FIG. 23 is a diagram illustrating a hardware construction of the 16-state Trellis encoder in the embodiment of the present invention. In FIG. 23, reference numeral 213 denotes four-bit register, and 214 denotes a read-only memory (ROM). The state information of four bits $W_{3n}$, $W_{2n}$, $W_{1n}$, and $W_{0n}$ held in the four-bit register 213 indicates one of the sixteen states of the Trellis encoder. The output of two bits $Y_{2n}$ and $Y_{1n}$ from the cumulative encoder 63 of FIG. 10 and the output of four bits $W_{3n}$, $W_{2n}$, $W_{1n}$, and $W_{0n}$ from the four-bit register 213 are input into the read-only memory (ROM) 214, and the read-only memory (ROM) 214 outputs the Trellis code of three bits $Y_{2n}$, $Y_{1n}$, and $Y_{0n}$ and the new state information of four bits $W_{3n+1}$, $W_{2n+1}$, $W_{1n+1}$, and $W_{0n+1}$, where the new state information of four bits $W_{3n+1}$, $W_{2n+1}$, $W_{1n+1}$, and $W_{0n+1}$, are applied to the four-bit register 213.

The inputs and the corresponding outputs of the read-only memory (ROM) 214 are indicated in Tables 5-1 and 5-2. In Tables 5-1 and 5-2, the subsets corresponding to the respective state transitions are also indicated.

OTHER CONSTRUCTIONS IN FIRST EMBODIMENT (FIGS. 9, 10, 24, 25, and 26)

Figure 24:
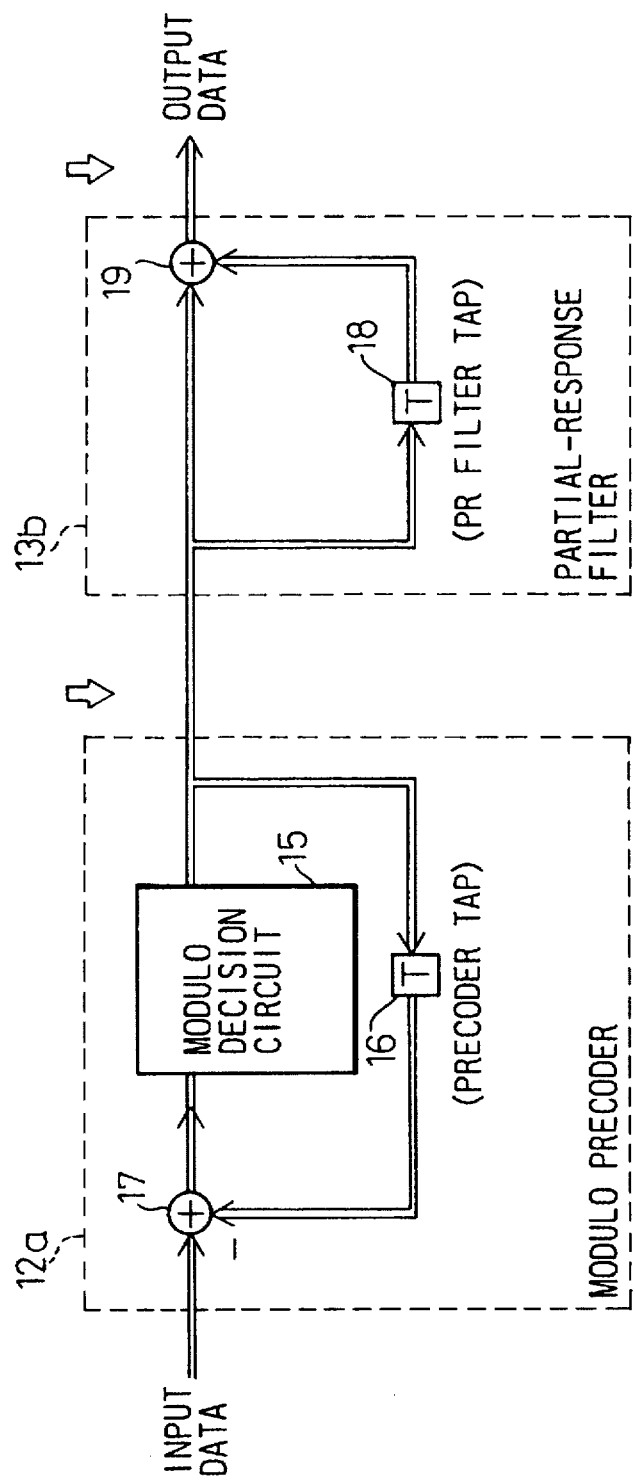
FIG. 24 is a diagram illustrating the details of the modulo precoder 12a in FIG. 12a and a partial response filter 13b which is included in the modulator 13a in FIG. 9.

In the construction of the first embodiment, as indicated in FIG. 9, the output of the Trellis encoder 11a in FIG. 9, i.e., the output of the signal point mapping table 65 of FIG. 10, is supplied to the construction indicated in FIG. 24. FIG. 24 is a diagram illustrating the details of the modulo precoder 12a in FIG. 12a and a partial response filter 13b which is included in the modulator 13a in FIG. 9.

Hereinafter, the use of double lines which are input into and output from the respective elements in the constructions of Figures indicates that the signals passing through the double line are two-dimensional vector signals having two vector components corresponding to coordinates on the two-dimensional vector space on which the signal points are located.

In FIG. 24, reference numeral 12a denotes the modulo precoder indicated in FIG. 9, and 13b denotes a partial response filter. In the modulo precoder 12a, reference numeral 15 denotes a modulo decision circuit, 16 denotes a precoder tap, and 17 denotes an adder. In the partial response filter 13b, reference numeral 17 denotes an adder, and 18 denotes a partial response filter tap.

Each component of the input data (output of the Trellis encoder 11a in FIG. 9) is supplied to the adder 17, and a difference between the component and a corresponding component of the previous output of the modulo decision circuit 15 is obtained by the adder 17. The components of the output of the modulo decision circuit 15 are supplied to the precoder tap 16, and are then held therein for obtaining the next difference by the adder 17. The output of the modulo decision circuit 15 is also supplied to the partial response filter 13b.

Figure 25:
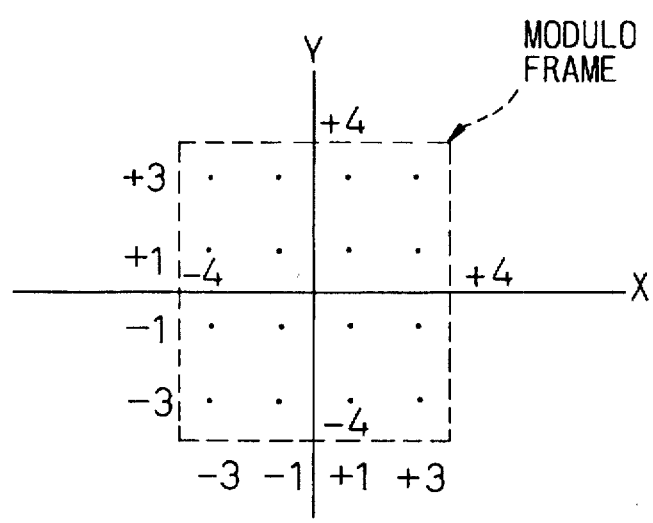
FIG. 25 is a diagram illustrating a simplified example of a modulo frame having a square form and extending to ±4 in both the x and y directions.

FIG. 25 is a diagram illustrating a simplified example of a modulo frame having a square form and extending to ±4 in both the x and y directions, where the sixteen signal points can be located at the points having the x and/or y coordinates of ±1 and ±3. The modulo decision circuit 15 examines each component of the output of the adder 17, and performs a modulo operation when it is determined that the component exceeds the boundaries of the modulo frame, i.e., ±4. The modulo operation is to subtract +4 from the component when the component exceeds the upper limit +4, and to add +4 to the component when the component falls below the lower limit −4. That is, in the modulo operation, the addend or subtrahend is equal to the absolute value of the upper or lower limit of the modulo frame.

Figure 26:
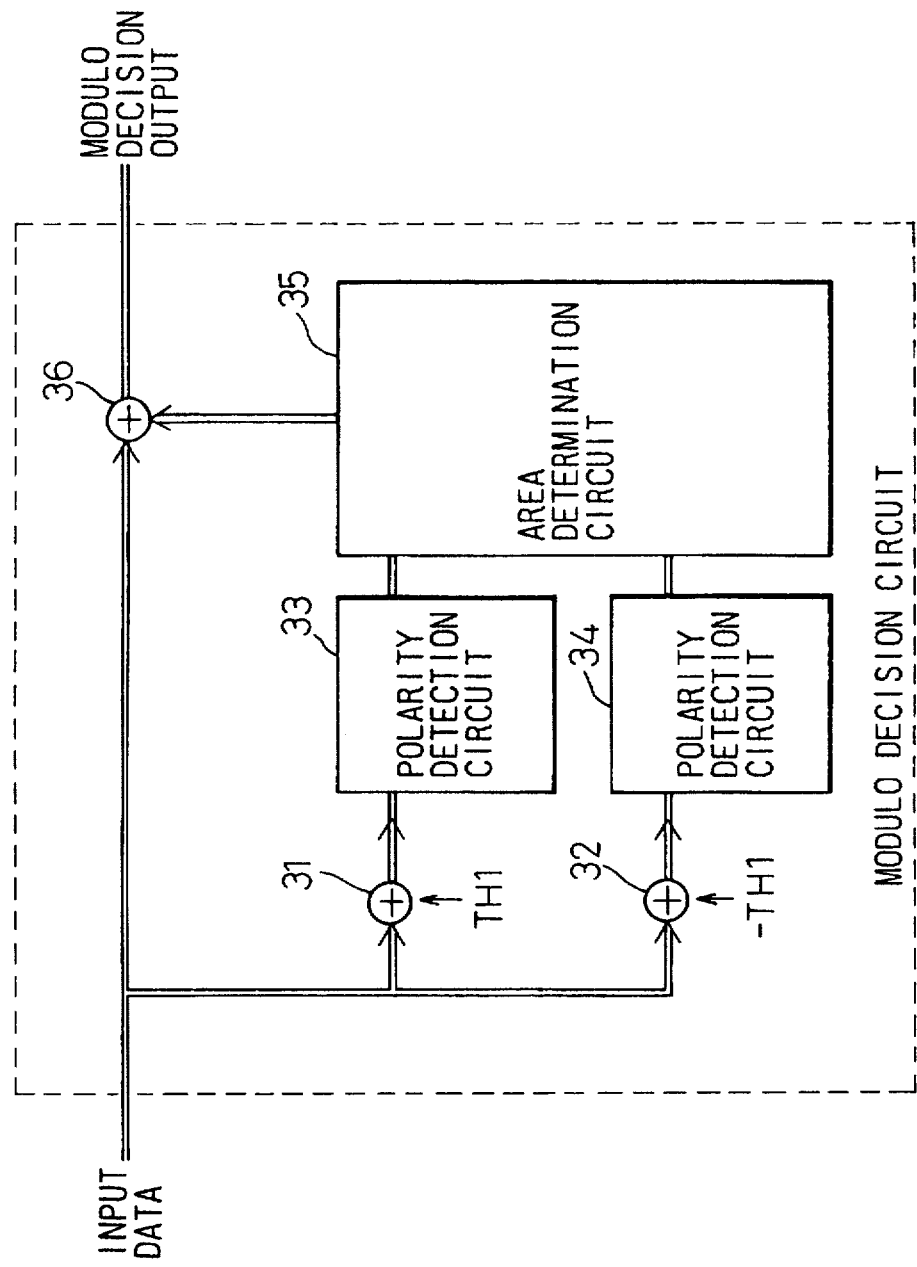
FIG. 26 is a diagram illustrating an example construction of the modulo decision circuit 15 in FIG. 24.

FIG. 26 is a diagram illustrating an example construction of the modulo decision circuit 15 in FIG. 24. In FIG. 26, reference numerals 31, 32, and 36 each denote an adder, 33 and 34 each denote a polarity detection circuit, and 35 denotes an area determination circuit. Each component of the input data is compared with the lower and upper limits −TH and TH by the first construction comprised of the adder 31 and the polarity detection circuit 33 and the second construction comprised of the adder 32 and the polarity detection circuit 34, respectively. In the case of FIG. 25, the upper limit TH is equal to +4, and the lower limit −TH is equal to −4. The area determination circuit 35 determines whether or not each component of the input data exceeds the boundaries of the modulo frame, based on the comparison results by the above first and second constructions, and supplies the above-mentioned addend or subtrahend to the adder 36 for performing the modulo operation at the adder 36 for each component. Thus, when the signal point represented by the input data is located outside the modulo frame, the input data are changed so that the corresponding signal point is shifted to another location within the modulo frame.

The partial response filter 13b in contained in the modulator 13a in FIG. 9. Although not shown, the modulator 13a also contain constructions for modulating the output of the partial response filter 13b by the quadrature amplitude modulation technique. In the partial response filter 13b, each component of the output of the modulo precoder 12a is applied to the partial response filter tap 18, and is held therein for being added to a corresponding component of the next output of the modulo precoder 12a. The component of the output of the modulo precoder 12a is also applied to the adder 17, and is added to the component of the previous output of the modulo precoder 12a held in the partial response filter tap 18. The output of the adder 17 is supplied to the above constructions for the quadrature amplitude modulation.

Figure 27:
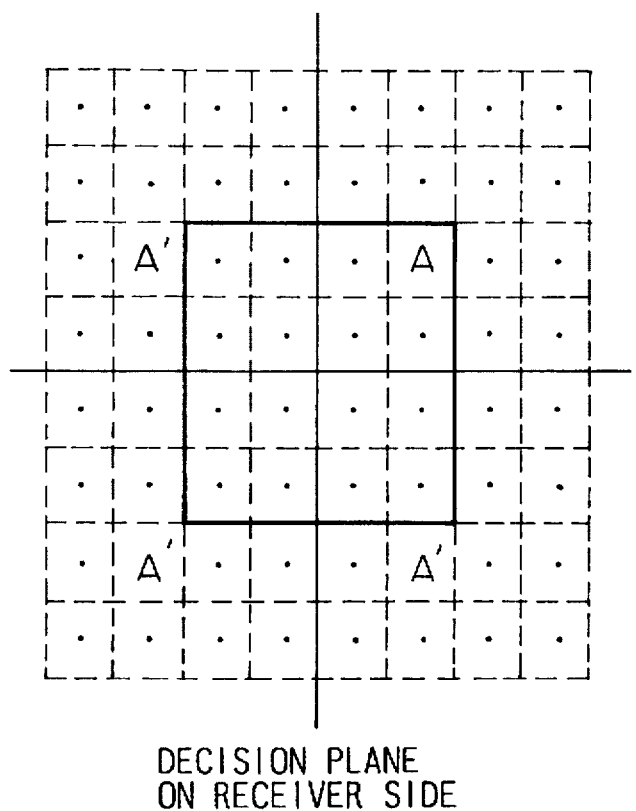
FIG. 27 is a diagram illustrating a distribution of signal points on the receiver side when the above construction including the modulo precoder 12a and the partial response filter 13b is provided on the transmitter side.

FIG. 27 is a diagram illustrating a distribution of signal points on the receiver side when the above construction including the modulo precoder 12a and the partial response filter 13b is provided on the transmitter side. When the above construction including the modulo precoder 12a and the partial response filter 13b is provided on the transmitter side, for example, signal points A' appear, corresponding to the original signal point A, on the receiver side, due to the modulo operation, and thus a total number of the signal points becomes four times the number of the original signal points as indicated in FIG. 27. Therefore, the power of the received signal is increased, and the SNR characteristic of the received signal is not satisfactory. The cause of the increases in the number of the signal points on the receiver side and the power of the received signal, is the narrowness of the modulo frame. This problem is solved by the embodiments explained below.

THIRD EMBODIMENT. (FIGS. 28 to 32)

Figure 28:
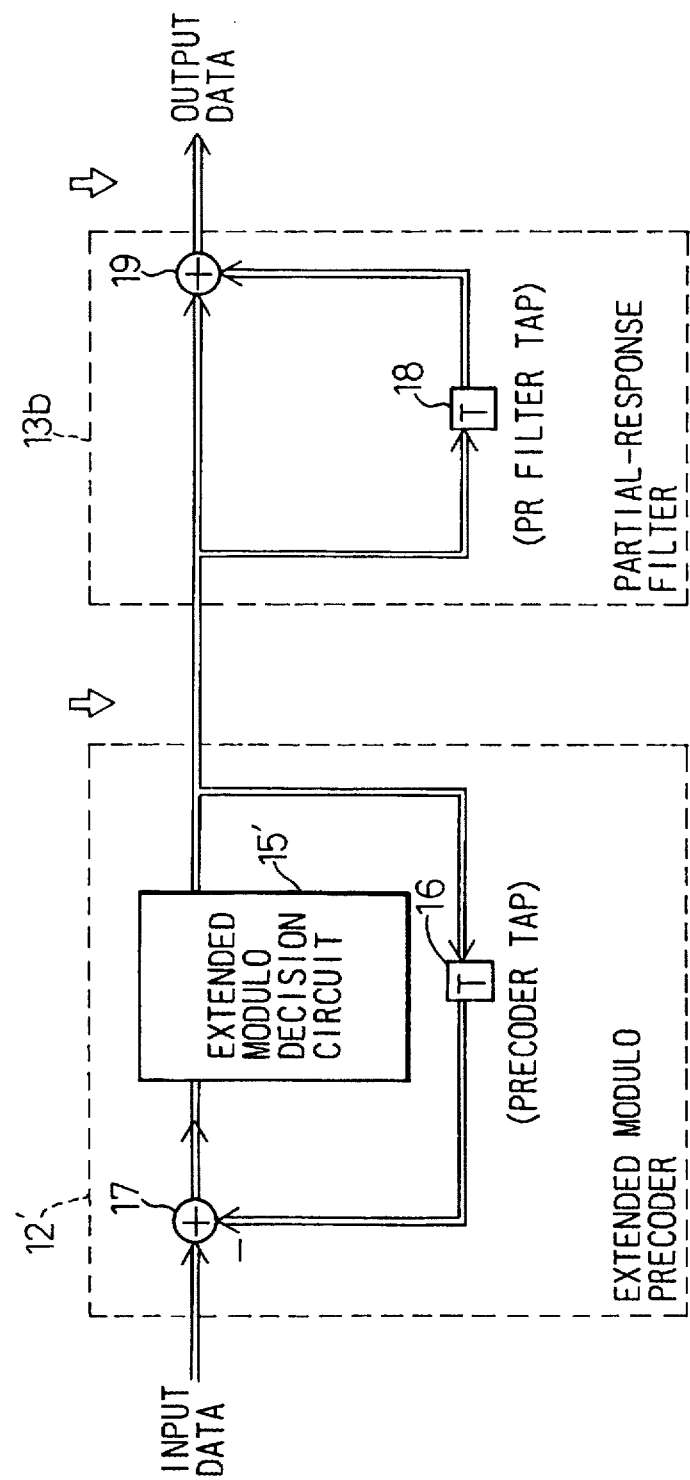
FIG. 28 is a diagram illustrating the construction of the modulo precoder and the partial response filter provided in the third embodiment of the present invention.

In order to solve the above problem, in the third embodiment of the present invention, the modulo frame is extended. The absolute values of the upper and lower limits of the extended modulo frame in the third embodiment is greater than the amount of the shifting of each component of the output of the adder 17 in the modulo operation. FIG. 28 is a diagram illustrating the construction of the modulo precoder and the partial response filter provided in the third embodiment of the present invention. The only difference between the constructions of FIGS. 24 and 28, resides in that the extended modulo precoder 15' is provided in the construction of FIG. 28, instead of the modulo decision circuit 15 in FIG. 24.

Figure 29:
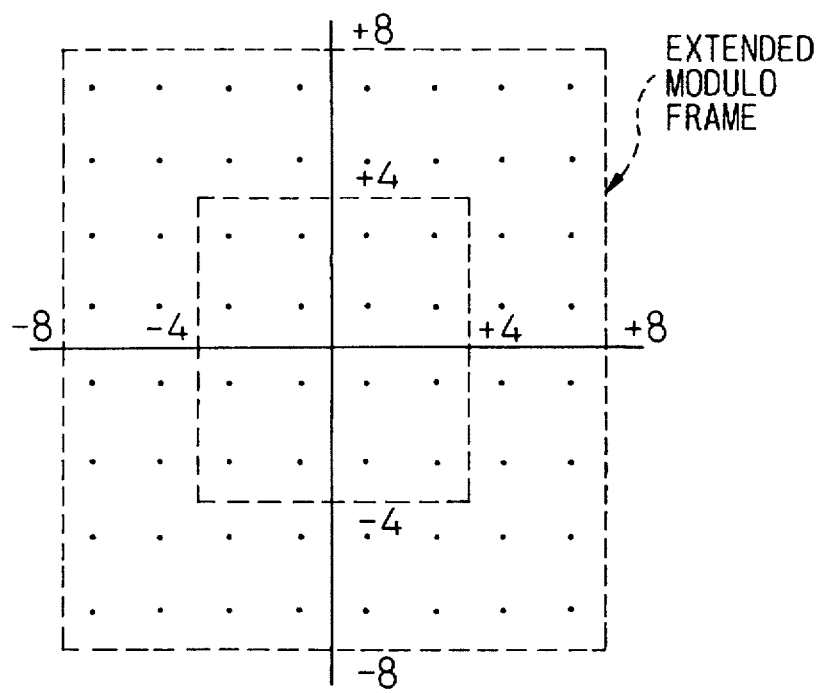
FIG. 29 is a diagram illustrating an example of the extended modulo frame having a square form and extending to ±8 in both the x and y directions.

FIG. 29 is a diagram illustrating an example of the extended modulo frame having a square form and extending to ±8 in both the x and y directions, where the sixteen original signal points can be located at the points having the x and/or y coordinates of ±1 and ±3. The extended modulo frame of FIG. 28 is four times greater than the modulo frame of FIG. 25. The modulo decision circuit 15' examines each component of the output of the adder 17, and performs an extended modulo operation when it is determined that the component exceeds the boundaries of the extended modulo frame, i.e., ±8. The extended modulo operation is to subtract ±4 from the component when the component exceeds the upper limit +8, and to add +4 to the component when the component falls below the lower limit −8. That is, in the extended modulo operation, the addend or subtrahend is smaller than the absolute value of the upper or lower limit of the extended modulo frame.

Figure 30:
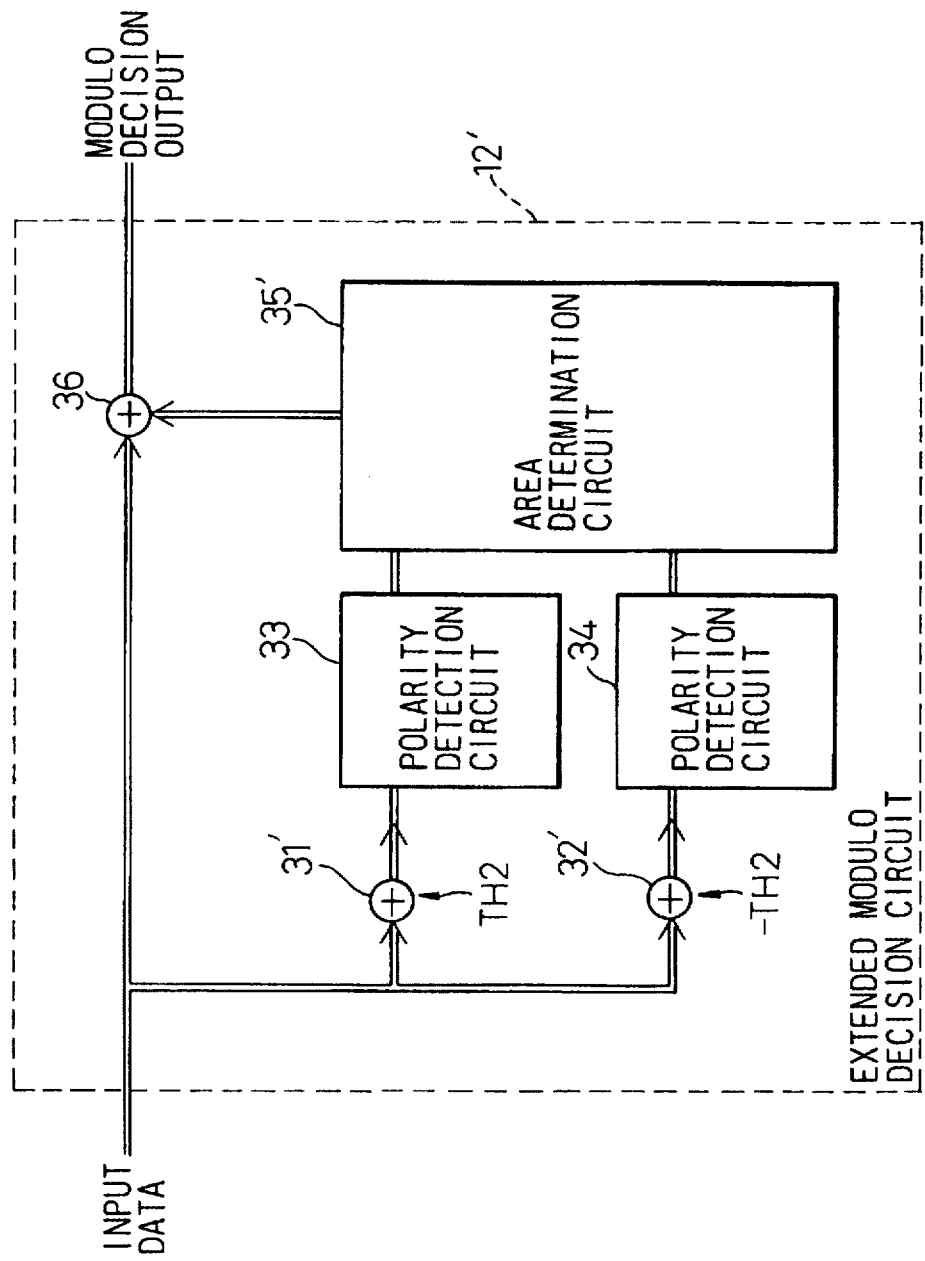
FIG. 30 is a diagram illustrating an example construction of the extended modulo decision circuit 15' in FIG. 28.

FIG. 30 is a diagram illustrating an example construction of the extended modulo decision circuit 15' in FIG. 28. In FIG. 30, reference numerals 31', 32', and 36 each denote an adder, 33 and 34 each denote a polarity detection circuit, and 35 denotes an area determination circuit. Each component of the input data is compared with the lower and upper limits −TH2 and TH2 by the first construction comprised of the adder 31' and the polarity detection circuit 33 and the second construction comprised of the adder 32' and the polarity detection circuit 34, respectively. In the case of FIG. 29, the upper limit TH2 is equal to +8, and the lower limit −TH2 is equal to −8. The area determination circuit 35 determines whether or not each component of the input data exceeds the boundaries of the modulo frame, based on the comparison results by the above first and second constructions, and supplies the addend or subtrahend (±4) to the adder 36 for performing the modulo operation at the adder 36 for each component. Thus, when the signal point represented by the input data is located outside the extended modulo frame, the input data are changed so that the corresponding signal point is shifted to another location within the modulo frame. The only difference between the constructions of FIGS. 30 and 26 is that the addend TH2 in FIG. 30 is different from the addend TH1 in FIG. 26, and that the subtrahend −TH2 in FIG. 30 is different from the subtrahend −TH1 in FIG. 26.

According to the construction of the third embodiment, the probability of occurrences of the modulo operation is reduced by extending the boundaries of the modulo frame. Since the modulo operation is a cause of the increase in the power of the received signal, the SNR characteristic of then received signal is improved by the provision in the third embodiment. In the received signal in the third embodiment, the probability of appearance of the signal point becomes greater as the location of the signal point becomes nearer the origin of the vector signal space.

Figure 31:
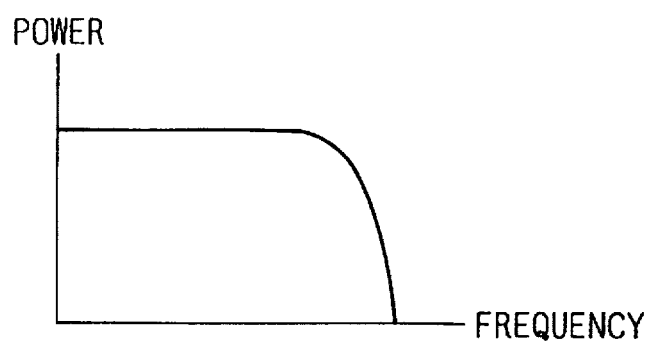
FIG. 31 is a diagram illustrating a frequency spectrum of the output of the partial response filter in the third embodiment.
Figure 32:
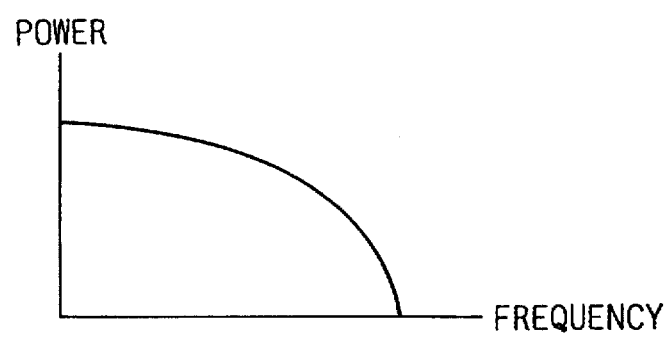
FIG. 32 is a diagram illustrating a frequency spectrum of the output of the partial response filter in the first embodiment.

FIG. 31 is a diagram illustrating a frequency spectrum of the output of the partial response filter in the third embodiment, and FIG. 32 is a diagram illustrating a frequency spectrum of the output of the partial response filter in the first embodiment. The frequency spectrum in the third embodiment shows a flat characteristic in the region of a relatively higher frequency due to the use of the extended modulo frame, while in the frequency spectrum in the first embodiment the power is reduced in the region of a higher frequency due to the use of the extended modulo frame. Namely, the SNR characteristic in the third embodiment is better than that in the first embodiment.

Figure 33:
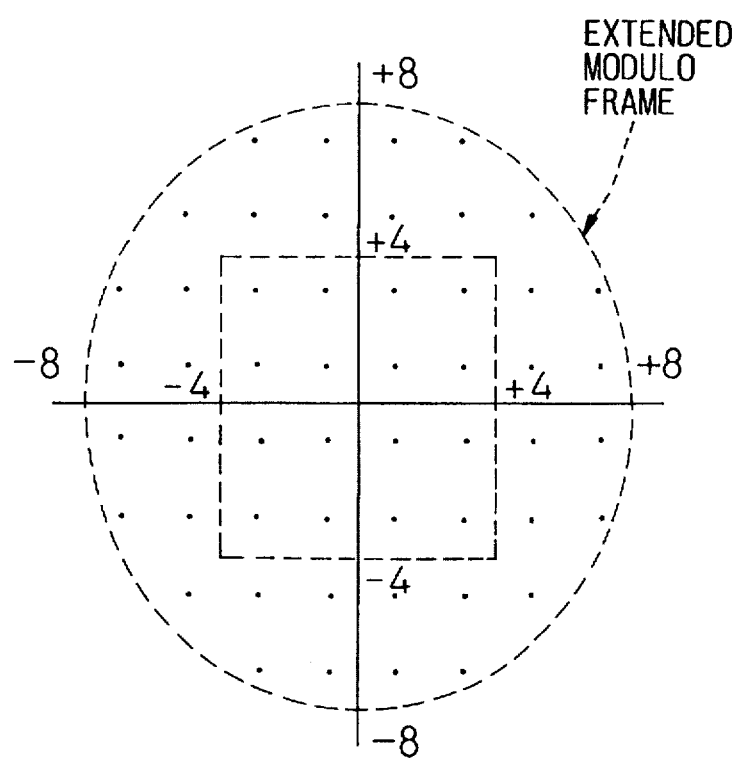
FIG. 33 is a diagram illustrating an example of the extended modulo frame having a form of a circle of a diameter equal to 8.
Figure 34:
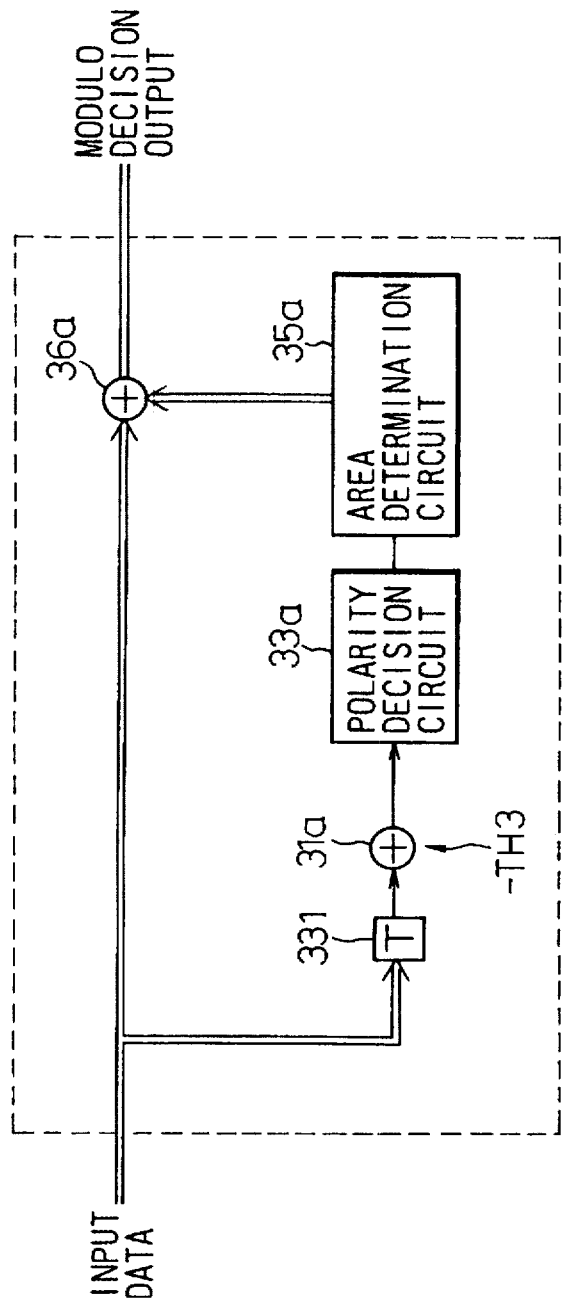
FIG. 34 is a diagram illustrating the example construction of the extended modulo decision circuit 15' in the fourth embodiment of the present invention.

FOURTH EMBODIMENT (FIGS. 33 and 34)

In the fourth embodiment of the present invention, the extended modulo frame is made in the form of a circle. FIG. 33 is a diagram illustrating an example of the extended modulo frame having a form of a circle of a diameter equal to 8, where the sixteen original signal points can be located at the points having the x and/or y coordinates of ±1 and ±3.

The construction of FIG. 28 can also be applied to the fourth embodiment, except that the construction and the operation of the extended modulo decision circuit 15' in FIG. 28 are different from that in the third embodiment. FIG. 34 is a diagram illustrating the example construction of the extended modulo decision circuit 15' in the fourth embodiment of the present invention. In FIG. 34, reference numeral 331 denotes a square calculation circuit, 31a denotes an adder, 33a denotes a polarity decision circuit, 35a denotes an area determination circuit, and 36a denotes an adder. The square of the input vector data is calculated by the square calculation circuit 331, and the calculated square is compared with the threshold value TH3 (which is equal to 8 in the case of FIG. 33) through the construction comprised of the adder 31a and the polarity decision circuit 33a. The area determination circuit 35a determines whether or not the extended modulo operation is to be performed, based on the result of the above comparison. When it is determined that the signal point of the input vector data is resides within the circle of the extended modulo frame, no extended modulo operation is performed. When it is determined that the signal point of the input vector data is resides outside the circle of the extended modulo frame, the extended modulo operation is performed by supplying an addend or subtrahend to the adder 36a for each component. The extended modulo operation is a selected one of possible combinations of additions of +4, 0, and −4 to the x component and additions of +4, 0, and −4 to the y component, where the above selection is made based on a principle that the power of the signal should be minimized. According to this selection, the area determination circuit 35a supplies the addend or subtrahend to the adder 36a. As possible variations of the fourth embodiment, the extended modulo frame may have a form of a polygon.

According to the construction of the fourth embodiment of the present invention, the power of the received signal can be further reduced, and the SNR characteristic can be further improved, compared with the third embodiment.

PROBLEMS IN MODULO OPERATIONS (Tables 6-1 to 6-7, FIGS. 35 to 40)

Tables 6-1 to 6-7 indicate the inputs and outputs of the modulo precoder 12a in FIG. 24, and the corresponding outputs (PRF) of the partial response filter 13b in FIG. 24, for the various precoder tap values (which are denoted by "Previous Tap Outputs"), in the case wherein the number of the original signal points is equal to 64, and the absolute values of the upper and lower limits for the x and y components are equal to 16. As explained before with reference to FIG. 24, in the modulo precoder 12a, the difference between the input data and the precoder tap value is obtained, and the modulo operation is performed on the difference when the difference exceeds +16, or falls below −16. In the partial response filter 13b, the sum of the current and previous outputs of the modulo precoder 12a is obtained as the output PRF of the partial response filter 13b.

The operations in the case wherein the precoder tap value (which is denoted by "Previous Tap Outputs" in Table 6-1) is equal to −16, are explained below. When the input of the modulo precoder 12a is −7, the output of the modulo precoder 12a is $$-7-(-16)=+9.$$

Since the partial response filter tap 18 stores −16, the output of the partial response filter 13b is $$+9+(-16)=-7,$$

which is the same as the input of the modulo precoder 12a. The output of the partial response filter 13b is $$+9+(-16)=-7,$$

the same as the input of the modulo precoder 12a when the input of the modulo precoder 12a is in the range of −7 to −1 in the case wherein the precoder tap value is −16.

When the input of the modulo precoder 12a is +1, the difference between the input and the precoder tap value is $$+1-(-16)=+17,$$

which exceeds the upper limit value +16. In this case, the modulo operation is performed, and the modulo precoder 12a outputs $$+17-(-16)=+1.$$

This output of the modulo precoder 12a is added to the precoder tap value, −16 in the partial response filter 13b. The result of the addition, $$+1+(-16)=-15$$

is output from the partial response filter 13b. This output is different from the input of the modulo precoder 12a. Similar phenomenon occurs in the conditions falling within the encircled area in Tables 6-1 to 6-7.

As explained above, the precoder tap value is decreased when the difference obtained in the adder 17 in the modulo precoder 12a exceeds the upper limit, the decrease in the precoder tap value is reflected in the output of the partial response filter 13b. Therefore, an abnormal peak value may appear in the output of the partial response filter 13b.

FIG. 35 illustrates locations of the sixty-four original signal points. In FIG. 35, four block areas located in the four quadrants and each containing sixteen signal points, are denoted by [1], [2], [3], and [4], respectively. The absolute values of the upper and lower limits for the x and y components are equal to 16. FIG. 36 illustrates the distribution of 256 signal points in the output of the modulo precoder. In FIG. 36, each block area (n) is an area into which the signal points in the above block area [n] are likely to be shifted by the modulo operation, where n is an integer which is equal to 1, 2, 3, or 4.

Figure 37:
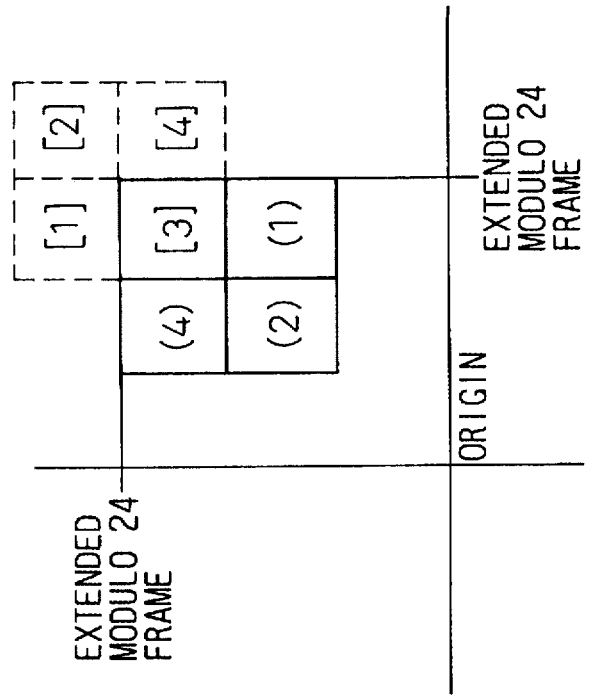
FIGS. 37 and 38 are explanatory diagrams for illustrating the shift operations of the locations of the original signal points of FIG. 35 when the precoder tap values correspond to the corner of the extended modulo frame having upper limit values equal to 24 for the x and y components.
Figure 38:
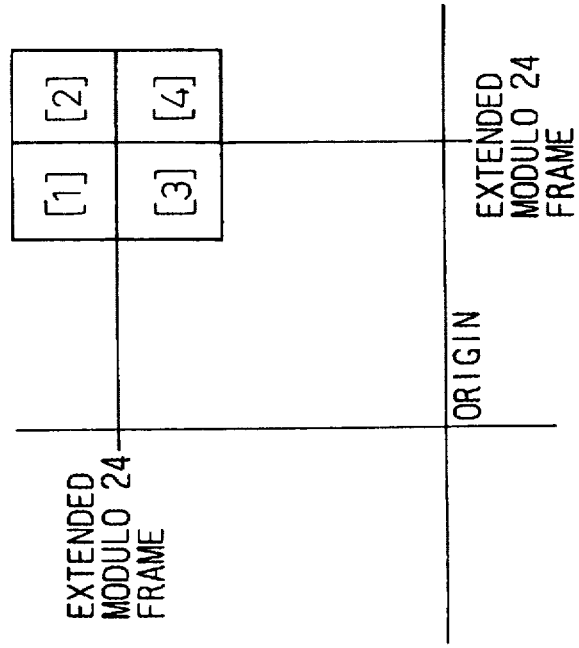

FIGS. 37 and 38 are explanatory diagrams for illustrating the shift operations of the locations of the original signal points of FIG. 35 when the precoder tap values correspond to the corner of the extended modulo frame having upper limit values equal to 24 for the x and y components.

When the precoder tap values are (−24, −24) and the input of the modulo precoder 12a corresponds to (0, 0), the precoder tap values are renewed to the new values of (24, 24). In this situation, when the original signal points of FIG.

35 is input into the modulo precoder 12a, the outputs of the adder 17 in FIG. 24 are located as indicated by [1], [2], [3], and [4] in FIG. 37. The signal points in the block areas [1], [2], and [4] indicated in FIG. 37, are shifted by the modulo operations to the locations indicated in FIG. 38 by (1), (2), and (4), respectively.

Figure 39:
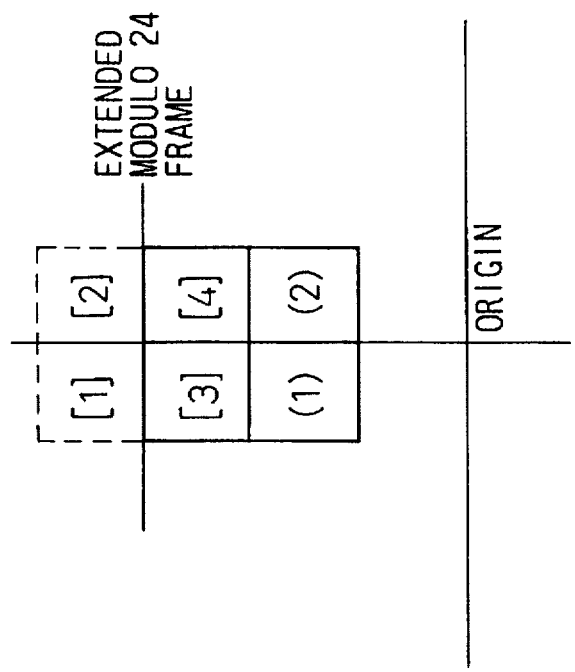
FIGS. 39 and 40 are explanatory diagrams for illustrating the shift operations of the locations of the original signal points of FIG. 35 when the precoder tap values correspond to the upper boundary of the extended modulo frame having an upper limit value equal to 24 for the y component.
Figure 40:
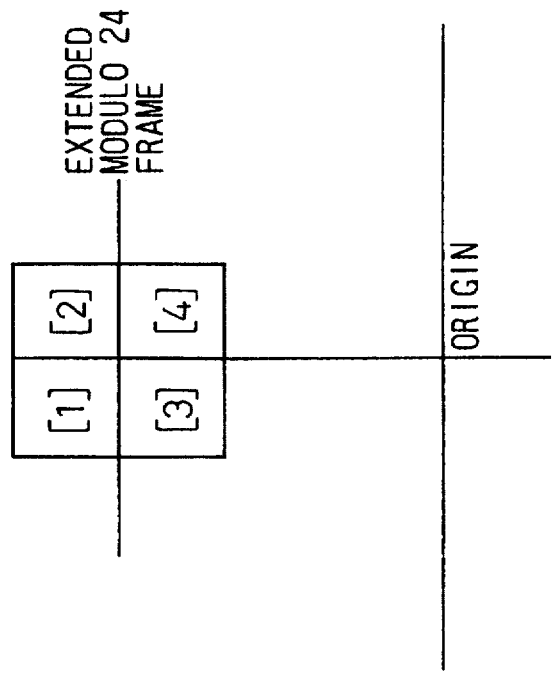

FIGS. 39 and 40 are explanatory diagrams for illustrating the shift operations of the locations of the original signal points of FIG. 35 when the precoder tap values correspond to the upper boundary of the extended modulo frame having an upper limit value equal to 24 for the y component.

When the precoder tap value for the y component is −24, and the y component of the input of the modulo precoder 12a is 0, the precoder tap value is renewed to the new value equal to 24. In this situation, when the original signal points of FIG. 35 is input into the modulo precoder 12a, the outputs of the adder 17 in FIG. 24 are located as indicated by [1], [2], [3], and [4] in FIG. 39. The signal points in the block areas [1] and [2] indicated in FIG. 39, are shifted by the modulo operations to the locations indicated in FIG. 38 by (1) and (2), respectively.

In particular, in the case wherein the modulo frame has a rectangular form and the original signal points distribute in a rectangular area, signal points located near the corner of the rectangular tends to be greatly shifted by the modulo operation. Therefore, this problem may be relieved by changing the form of the modulo frame to a circle. In addition, when the form of the modulo frame is changed to a circle, the powers of the received signals will be equalized. Further, when the form of the distribution of the original signal points is changed to a circle, the powers of the received signals will further be equalized.

In the following embodiments, several provisions are made for solving the above problems.

The fifth to tenth embodiments explained hereinafter, are provided for realizing the following objects:

(1) to reduce the peak factors in the precoder;

(2) to make the frequency spectrum flat;

(3) to reduce the peak factors in partial response filter (roll-off filter); and (4) to improve the SNR characteristic.

ADDITIONAL SIGNAL POINTS (FIGS. 41, 42, 43, and 44)

In the fifth to ninth embodiments explained hereinafter, according to the third and fourth aspects of the present invention, a plurality of second signal points are defined corresponding to each original signal point. In particular, at least one additional signal point is added to each original signal point. Before explaining the fifth to ninth embodiments of the present invention, examples of manners of locating the additional signal point corresponding to each original signal point, are indicated with reference to FIGS. 41 to 44.

Figure 41:
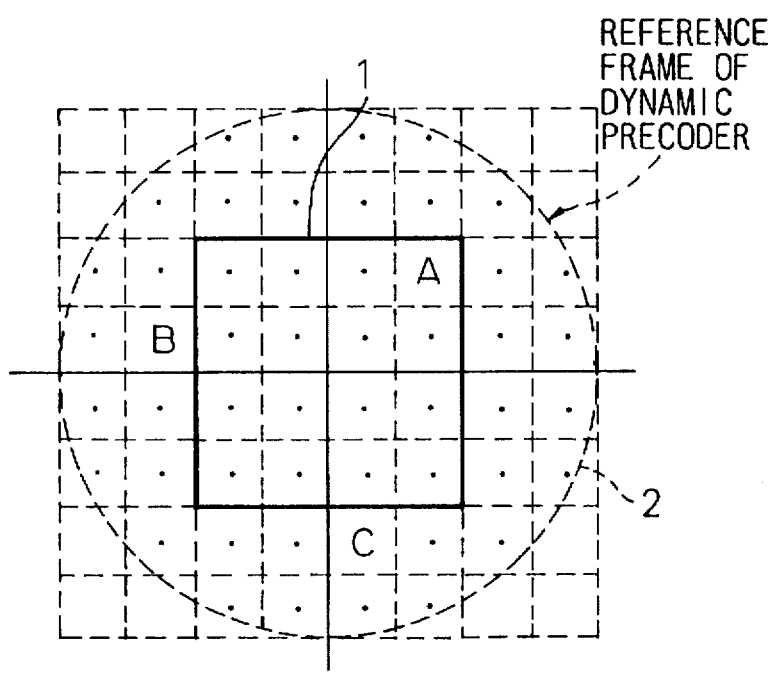
FIG. 41 is a diagram illustrating the first way of locating the additional signal points corresponding to each original signal point.

FIG. 41 is a diagram illustrating the first way of locating the additional signal points corresponding to each original signal point. In FIG. 41, A denotes an original signal point, 1 denotes an area in which the original signal points are distributed, B and C each denote an additional signal point corresponding to the original signal point A, and 2 denotes a reference frame for a dynamic precoder.

Namely, in the example of FIG. 41, two additional signal points B and C are defined corresponding to each original signal point A. The additional signal points are defined outside the area 1 in which the original signal points are distributed. In addition, preferably, the phases (angular positions in the vector space) of the two additional signal points are determined so that the distances between any two of the original signal point A and the corresponding additional signal points B and C are equalized and maximized. Namely, preferably, the difference between any two of these signal points A, B, and C is 98.11° to 163.78°, and optimally, the difference between any two of these signal points A, B, and C is equal to 120°. These values for the range of angles are determined by the following equations.

$$98.11° = (360.0° - 163.78°)/2, \text{ and}$$

$$163.78° = \cos^{-1}(18.1/128) \times 2$$

The purpose of this configuration, and the use of the reference frame 2 in FIG. 41, are explained later in relation to the fifth embodiment.

Figure 42:
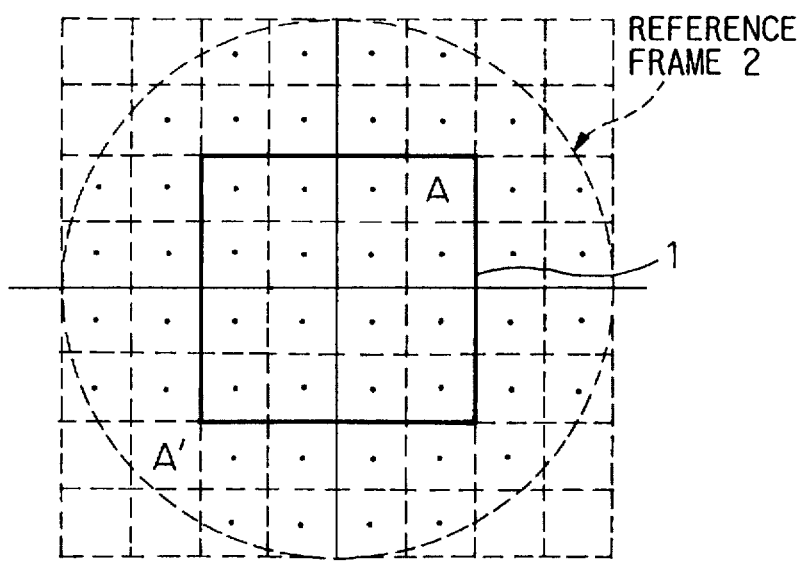
FIG. 42 is a diagram illustrating the second way of locating the additional signal point corresponding to each original signal point.

FIG. 42 is a diagram illustrating the second way of locating the additional signal point corresponding to each original signal point. In FIG. 42, A denotes an original signal point, 1 denotes an area in which the original signal points are distributed, A' denotes an additional signal point corresponding to the original signal point A, and 2 denotes a reference frame for a dynamic precoder.

Namely, in the example of FIG. 42, one additional signal point A' is defined corresponding to each original signal point A. The additional signal point is defined outside the area 1 in which the original signal points are distributed. In addition, preferably, the phases (angular positions in the vector space) of the additional signal points are determined so that the distance between the original signal point A and the corresponding additional signal point A' is maximized. Namely, preferably, the difference between any two of these signal points A and B is nearly or exactly equal to 180°.

The purpose of this configuration, and the use of the reference frame 2 in FIG. 42, are explained later in relation to the sixth embodiment.

Figure 43:
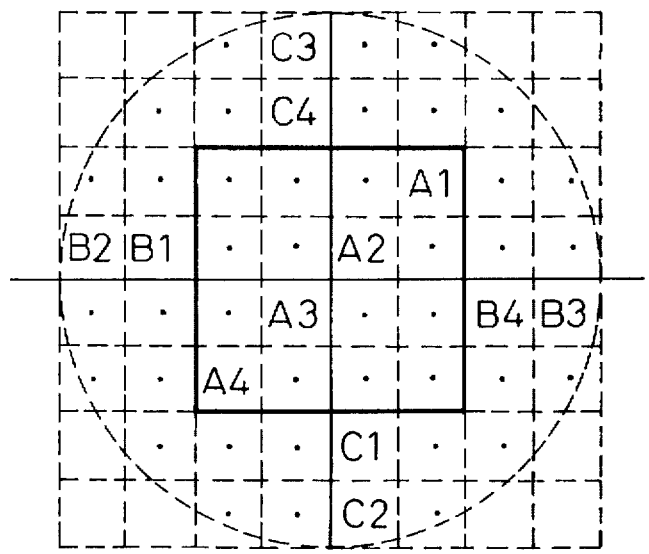
FIGS. 43 and 44 are diagrams illustrating two ways of defining the locations of the additional signal points based on the distance from the origin of the vector space.
Figure 44:
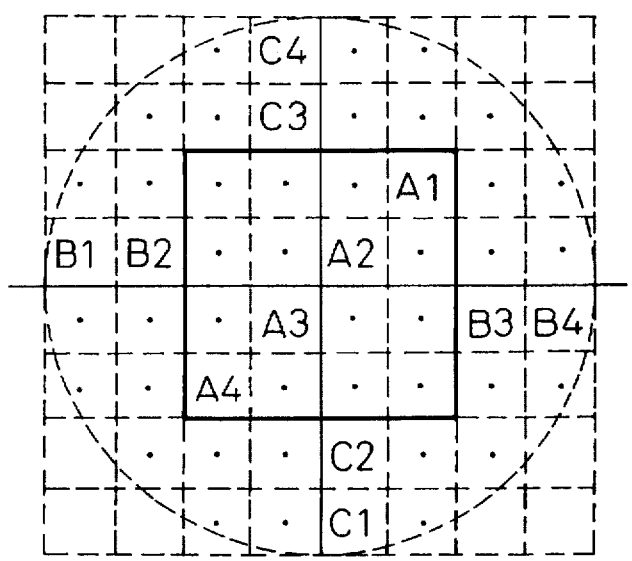

FIGS. 43 and 44 are diagrams illustrating two ways of defining the locations of the additional signal points based on the distance from the origin of the vector space. In the configuration of FIG. 43, when the original signal point is located relatively near the origin of the vector space, such as the original signal points A2 and A3, the corresponding additional signal points such as B2, B3, C2, and C3, are located relatively far from the origin, and when the original signal point is located relatively far from the origin, such as the original signal points A1 and A4, the corresponding additional signal points such as B1, B4, C1, and C4, are located relatively near the origin. On the other hand, in the configuration of FIG. 44, when the original signal point is located relatively far from the origin of the vector space, such as the original signal points A1 and A4, the corresponding additional signal points such as B1, B4, C1, and C4, are also located relatively far from the origin, and when the original signal point is located relatively near the origin, such as the original signal points A2 and A3, the corresponding additional signal points such as B2, B3, C2, and C3, are also located relatively near the origin.

Figure 45:
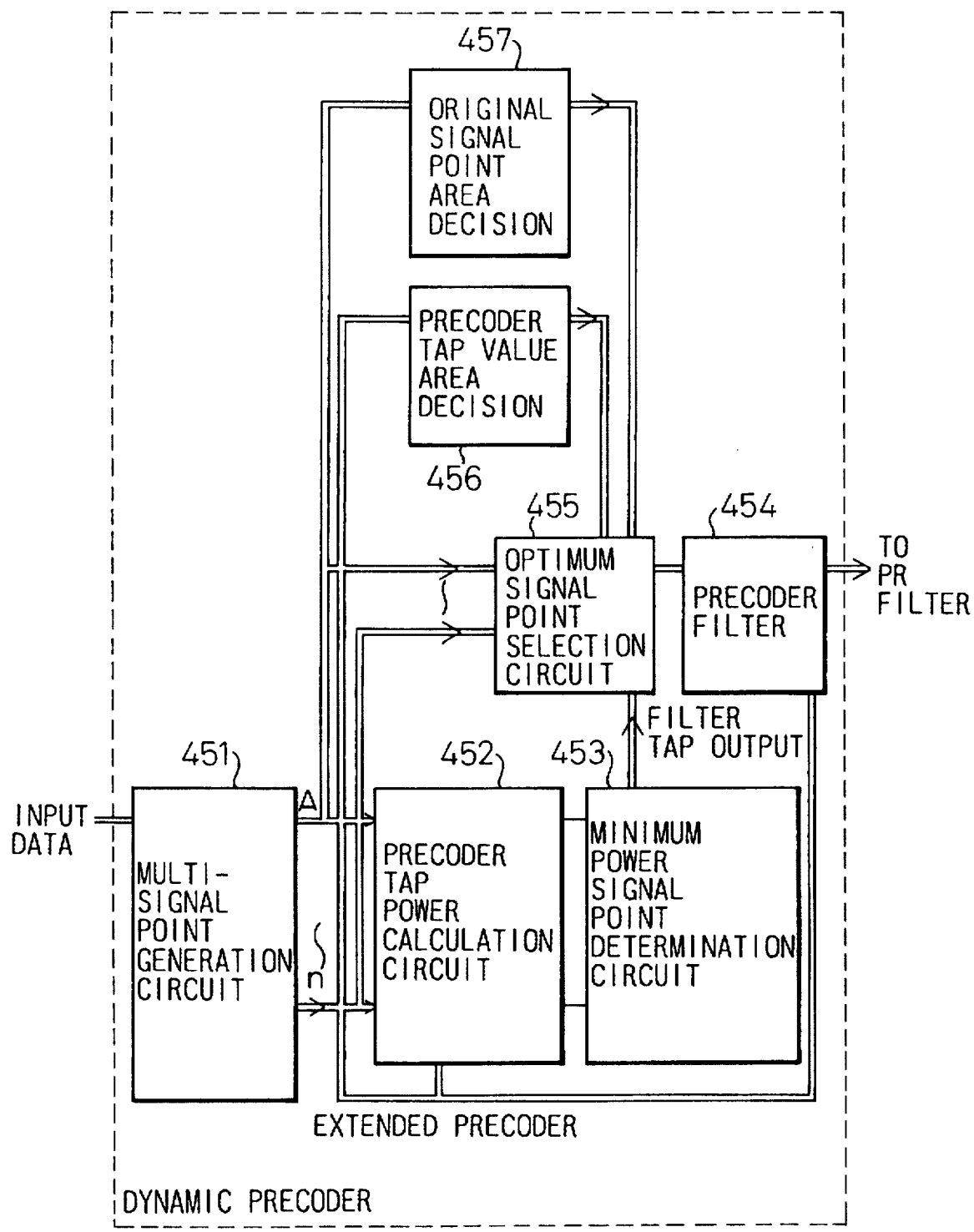
FIG. 45 is a diagram illustrating the construction of the dynamic precoder of the fifth embodiment of the present invention.
Figure 46:
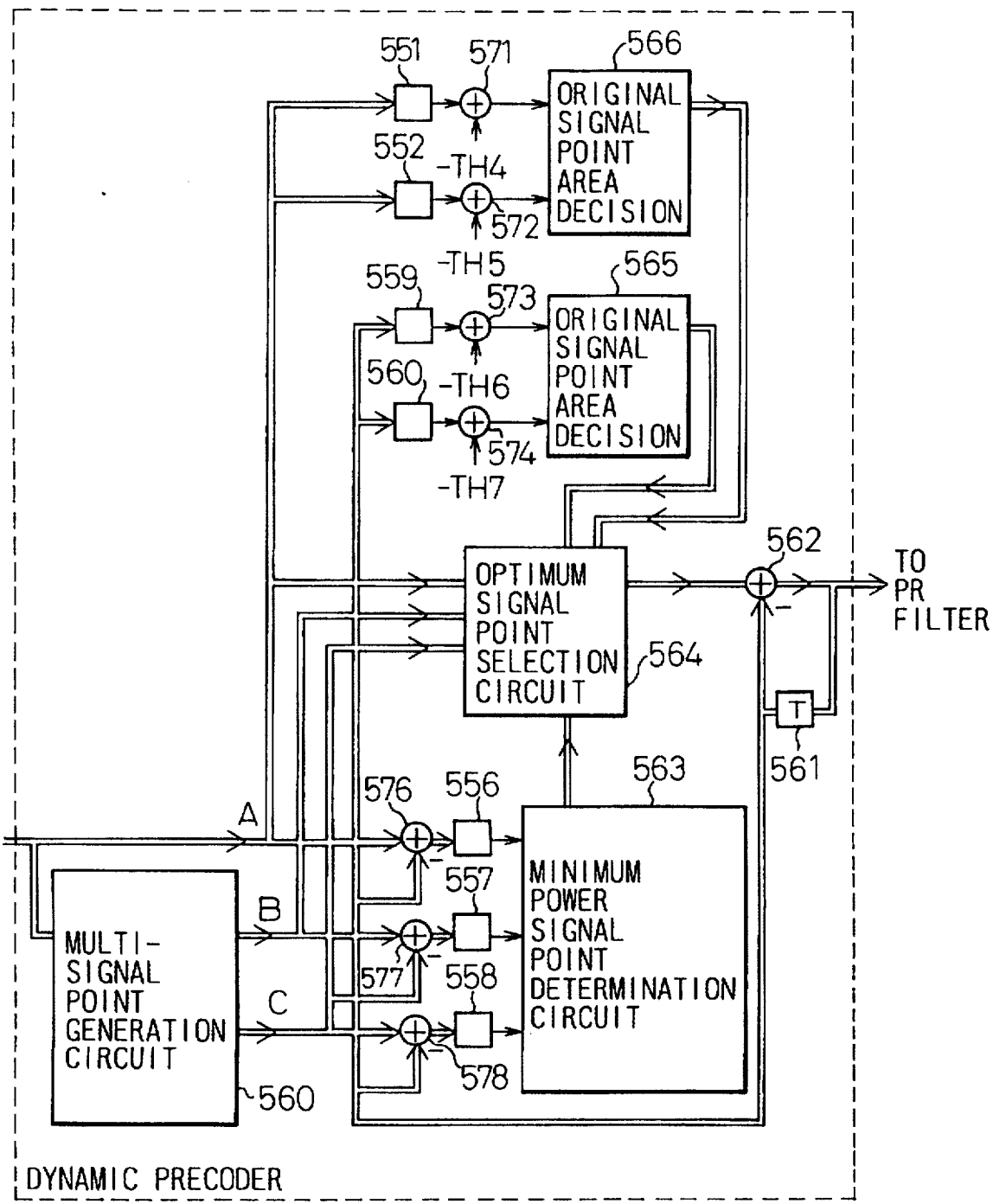
FIG. 46 is a diagram illustrating details of the construction of the dynamic precoder of FIG. 45.
Figure 47:
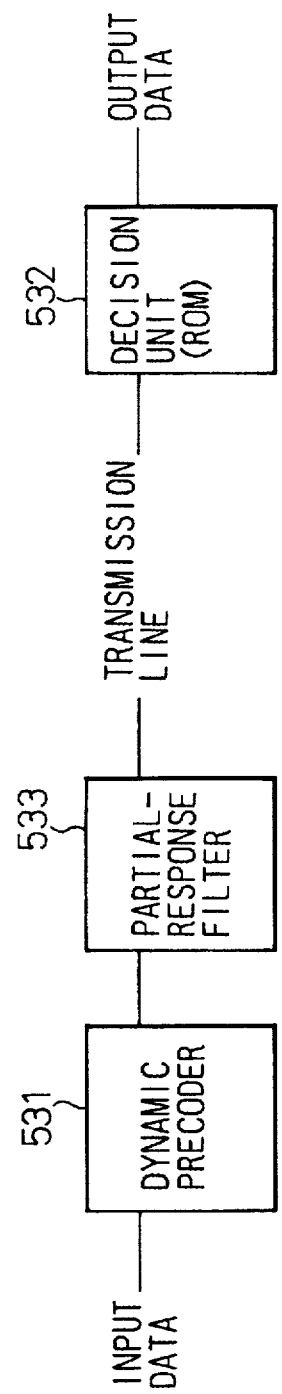
FIG. 47 is a diagram illustrating a construction for an application to a transmission system.

FIFTH EMBODIMENT (FIGS. 45, 46, and 47)

The fifth embodiment of the present invention corresponds to the third and fourth aspects of the present invention. The fifth embodiment of the present invention relates to a precoder, which is hereinafter called dynamic precoder. The hardware construction of the dynamic precoder in the fifth embodiment of the present invention is indicated in FIG. 45.

FIG. 45 is a diagram illustrating the construction of the dynamic precoder of the fifth embodiment of the present invention. In FIG. 45, reference numeral 451 denotes a multi-signal point generation circuit, 452 denotes a precoder tap power calculation circuit, 453 denotes a minimum power signal point determination circuit, 54 denotes a precoder filter, 455 denotes an optimum signal point selection circuit, 456 denotes a precoder tap value area decision circuit, and 457 denotes an original signal point area decision circuit.

The multi-signal point generation circuit 451 inputs input data representing an input signal point, and generates a plurality of signal points for each input signal point, as explained above with reference to FIGS. 41, 42, 43, and 44. The plurality of signal points are first supplied through the optimum signal point selection circuit 455 to the precoder filter 454. The precoder filter 454 precodes each vector component of the plurality of signal points, so that an inter-symbol interference which is expected to be generated on the output side of the construction of FIG. 45, will be cancelled on the receiver side which receives the output of the construction of FIG. 45, through a signal transfer system (for example, an analog transmission line) which causes the inter-symbol interference in the signal received on the receiver side. The precoded signals corresponding to the above plurality of signal points are supplied to the precoder tap power calculation circuit 452, and the powers of the plurality of precoded signal points are calculated in the precoder tap power calculation circuit 452. The calculated powers are supplied to the minimum power signal point determination circuit 453, and the powers are compared to determine one of the plurality of precoded signal points which has the minimum power. The information on the determined one of the precoded signal point having the minimum power is supplied to the optimum signal point selection circuit 455. The optimum signal point selection circuit 455 selects the above one of the plurality of signal point based on the information from the minimum power signal point determination circuit 453, and supplies the selected one of the signal points to the precoder filter 454. The precoder precodes each vector component of the selected signal points, and outputs the precoded signal.

In addition to the above constructions, the original signal point area decision circuit 457 and the precoder tap value area decision circuit 456 are provided for determining whether or not the above operation of selecting one of the plurality of signal points is carried out, based on first information regarding which one of predetermined plurality of first portions of the original signal point plane the input signal point is located, and second information regarding which one of predetermined plurality of second portions of the precoder tap plane the input signal point is located. The results of the above determinations by the original signal point area decision circuit 457 and the precoder tap value area decision circuit 456 are supplied to the optimum signal point selection circuit 455 in FIG. 45. The details of this operation are explained later with reference to FIGS. 48 and 49.

FIG. 46 is a diagram illustrating the concrete example of the construction of FIG. 45. In the construction of FIG. 46, the multi-signal point generation circuit 560 generates the additional signal paints B and C corresponding to each input data representing the input signal point A. The precoder filter 454 in FIG. 45 is realized by the adder 562 and the precoder tap (register) 561. The adder 562 obtains a difference between each component of the input thereto and the corresponding component held in the precoder tap 561, and the precoder tap 561 holds the output of the adder 562 for the next calculation of the difference. The construction of the precoder filter in FIG. 46 is a provision corresponding to a partial response characteristic expected in the above signal transfer system.

The precoder tap power calculation circuit 452 in FIG. 45 is realized by the adders 576 to 578 and the square calculation circuits 556 to 558 in FIG. 46. The adders 576 to 578 are provided for calculating the differences corresponding to the operation in the adder 562 in the precoder filter, and the output of the precoder tap 561 is supplied to the adders 576 to 578 as subtrahends in the adders 576 to 578. The square calculation circuits 556 to 558 calculates the squares of the outputs of the adders 576 to 578, respectively, to obtain power of the vector (signal point) signal.

The original signal point area decision circuit 457 in FIG. 45 is realized in FIG. 46 by the square calculation circuits 551 and 552 and the adders 571 and 572. The square calculation circuits 551 and 552 each calculate the powers of the input signal point A, and the adders 571 and 572 obtain differences between the calculated powers and predetermined threshold values TH4 and TH5, respectively. As explained later with reference to FIGS. 60 to 69, the construction of the original signal point area decision circuit realized in FIG. 46 is a provision for determining which one of three portions on the vector (original signal point) plane the input signal point is located, and the three portions are predetermined based on the distance from the origin of the original signal point plane. The original signal point area decision circuit 566 in FIG. 46 performs the determination based on the polarities of the outputs of the adders 571 and 572. The determination result is supplied to the optimum signal point selection circuit 564 in FIG. 46. As explained later, for use in the cases of FIGS. 48 and 49, the vector (original signal point) plane is divided into two portions based on the distance from the origin, and therefore the square calculation circuit 552 and the adder 572 can be eliminated.

Similarly, the precoder tap value area decision circuit 456 in FIG. 45 is realized in FIG. 46 by the square calculation circuits 559 and 560, and the adders 573 and 574. The square calculation circuits 559 and 560 each calculate the powers of the output of the precoder tap 562 corresponding to the input signal point A, and the adders 571 and 572 obtain differences between the calculated powers and predetermined threshold values TH6 and TH7, respectively. As explained later with reference to FIGS. 60 to 69, the construction of the precoder tap value area decision circuit realized in FIG. 46 is a provision for determining which one of three portions on the vector (precoder tap) plane the signal point represented by the output of the precoder tap 561 is located, and the three portions are predetermined based on the distance from the origin of the precoder tap plane. The precoder tap value area decision circuit 565 in FIG. 46 performs the determination based on the polarities of the outputs of the adders 573 and 574. The determination result is supplied to the optimum signal point selection circuit 564 in FIG. 46. As explained later, for the use in the cases of FIGS. 48 and 49, the vector (precoder tap) plane is divided into two portions based on the distance from the origin, and therefore the square calculation circuit 560, and the adder 574 can be eliminated.

FIG. 47 is a diagram illustrating a simplified example construction of a transmission system using the dynamic precoder in the fifth embodiments of the present invention. In the construction of FIG. 47, reference numeral 531 denotes the dynamic precoder as explained above, 533 denotes a partial response filter, and 532 denotes a decision unit. The partial response filter 533 is provided for realizing the expected frequency characteristic in a signal transfer system between the transmitter side and the receiver side.

The above output of the dynamic precoder 531 is filtered through the partial response filter 533, and transmitted through the transmission line to the receiver side. During the filtering and transmission, the signal suffers from an inter-symbol interference, and the inter-symbol interfered signal is received on the receiver side. The decision unit 523, provided on the receiver side, receives inter-symbol interfered signal, and determines (regenerates) the input signal point which is input into the dynamic precoder 531. This determination can be performed because the relationship of inputs and outputs of the decision unit 523 is predetermined based on the relationship between the possible input of the dynamic precoder 531 and the corresponding inter-symbol interfered signal received on the receiver side. The relationship between the possible input of the dynamic precoder 531 and the corresponding inter-symbol interfered signal received on the receiver side can be predetermined because the characteristics of the dynamic precoder 531 including the locations of the additional signal points, the partial response filter 533, and the transmission line are known, and the decision unit 523 can be realized by a read-only memory (ROM).

In the construction of FIG. 47, the partial response filter 532 is not necessary, and the transmission line may be any system for transferring digital signals. For example, the transmission line in FIG. 47 may be replaced with any transmission system, or a data writing and reading mechanism in a digital data recording apparatus. In the above transmission system, the signal may not be modulated. Namely, the digital data may be transmitted as a form of a baseband signal. In this case, the vector (signal point) signal is transmitted through a two parallel transmission lines for transmitting the respective components of the vector signal. Further, in the data writing and reading mechanism in a digital data recording apparatus, the data writing in a recording medium may be performed by either of a modulated signal or a baseband signal. When writing data by the baseband signal, the writing of the two vector components representing the signal points are carried out in parallel. Since the data writing and reading mechanism per se is well known, that is not explained in detail in this specification, the only necessary matter to apply the present invention to the data writing and reading mechanism is to provide the construction of the present invention on the input and output sides of the data writing mechanism. In addition, when the baseband signal is used for data writing, the data writing and reading mechanism must be modified to realize a construction for recording and regenerating baseband signals in parallel.

OPERATION MODES OF FIFTH EMBODIMENT
(FIGS. 48, 49, 50, and 51)

Figure 48:
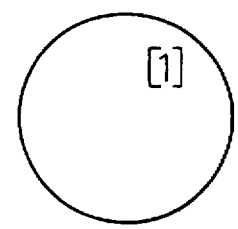
FIG. 48 is a diagram illustrating an example division into two portions of the input signal point plane provided for the above operation by the original signal point area decision circuit 457 in FIG. 45.
Figure 49:
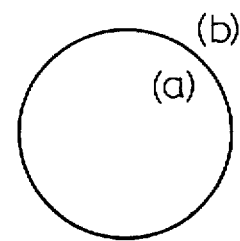
FIG. 49 is a diagram illustrating an example division into two portions of the precoder tap plane provided for the above operation by the precoder tap value area decision circuit 456 in FIG. 45.

FIG. 48 is a diagram illustrating an example division into two portions of the input signal point plane provided for the above operation by the original signal point area decision circuit 457 in FIG. 45, and FIG. 49 is a diagram illustrating an example division into two portions of the precoder tap plane provided for the above operation by the precoder tap value area decision circuit 456 in FIG. 45.

In the example of FIG. 48, the first portion is determined to be equal to the area [1] in which the original signal points are distributed, and the second portion is the other area on the precoder tap plane. In the example of FIG. 49, the first portion is determined to be the area (a) in which the original signal points are distributed, and the second portion is the other area (b) on the precoder tap plane.

As mentioned before, generally, the characteristic operation of the dynamic precoder of FIG. 45 (or 46) is activated based on the results of the above determinations by the original signal point area decision circuit 457 and the precoder tap value area decision circuit 456. However, since in this case, the first portion is determined to be equal to the area [1] in which the original signal points are distributed, the determination result from the original signal point area decision circuit 457 is always identical. In the mode of operation of the dynamic precoder, the optimum signal point selection circuit 455 performs the above selection of one of the plurality of signal points for each input signal point when the signal point represented by the precoder tap values is located in the portion (b) in FIG. 49. In the other cases, the optimum signal point selection circuit 455 simply supplies the vector components representing the input signal point A to the precoder filter 454 in FIG. 45.

Figure 50:
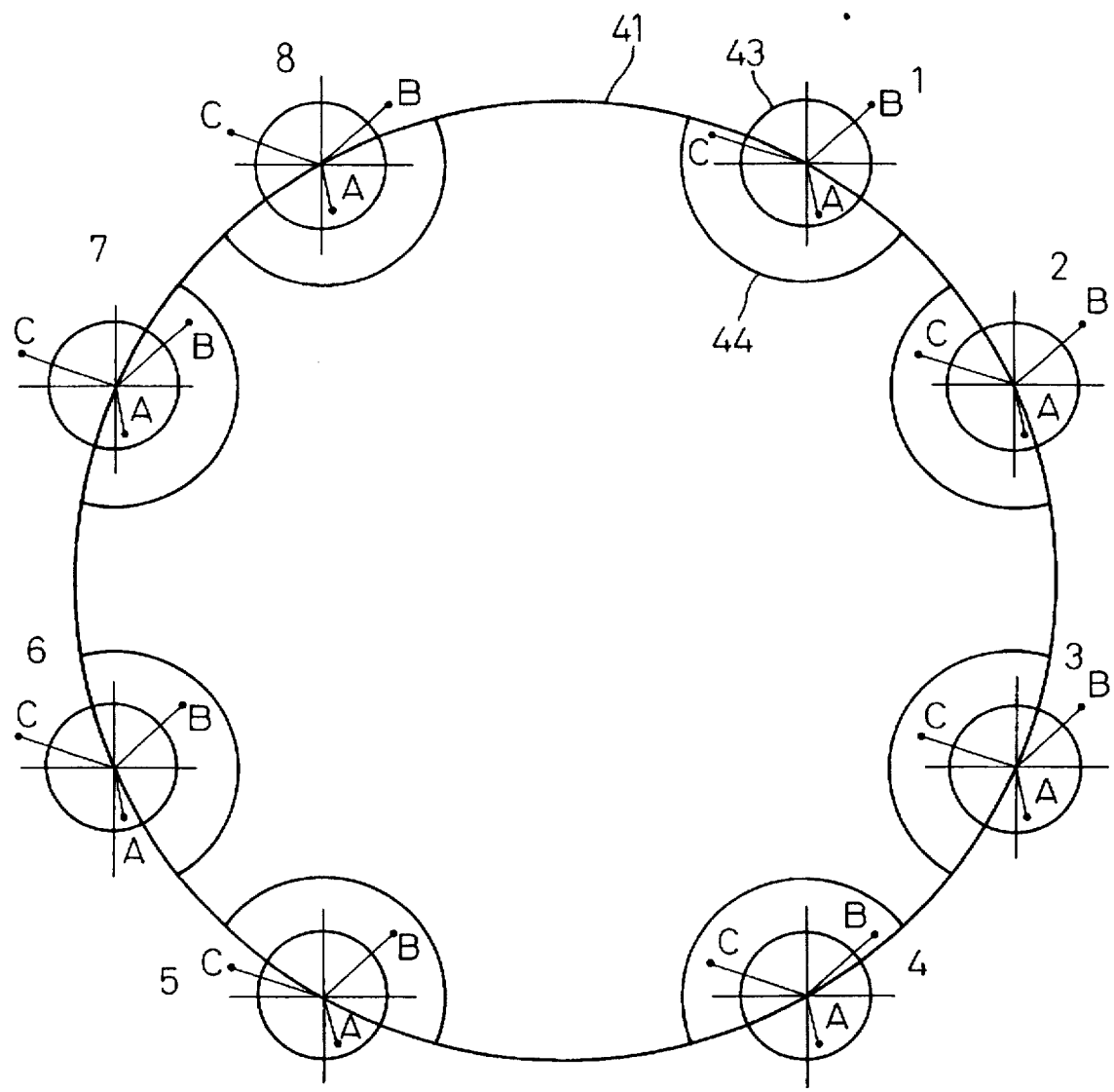
FIG. 50 is a diagram illustrating locations of the three signal points A, B, and C when the signal point represented by the output of the precoder tap 561 is located at eight example locations 1 to 8 on the boundary circle which divides the first and second portions of FIG. 49.

FIG. 50 is a diagram illustrating locations of the three signal points A, B, and C when the signal point represented by the output of the precoder tap 561 is located at eight example locations 1 to 8 on the boundary circle which divides the first and second portions of FIG. 49. The boundary circle is provided as a limit such that the signal points which are output from the dynamic precoder should be located within the boundary circle. In FIG. 50, reference numeral 41 denotes the boundary circle of FIG. 49, 43 denotes an area in which the original signal points are distributed, and 44 denotes the reference frame. In this example, the plurality of signal points A, B, and C are located around the origin of the original signal point plane so that the phase differences between any two of these signal points A, B, and C are almost the same, i.e., nearly equal to 120°. The reference frame 44 corresponds to the circle 2 in FIG. 41, and the additional signal points B and C are defined within this circle. The difference between the arrangement of FIG. 50 and that of FIG. 41 is that the shape of the area 43 in which the original signal points are distributed, is a circle in FIG. 50, while the shape of the area 1 in which the original signal points are distributed, is a square in FIG. 41. As indicated in FIG. 50, the power of the output of the precoder filter 454 can be minimized by selecting one of the three signal points A, B, and C wherever the signal point represented by the output of the precoder tap 561 is located. For example, at the example location 1, the signal point A is selected as the signal point which provides the minimum power of the output of the precoder filter 454, and at the example location 2, the signal point C is selected as the signal point which provides the minimum power of the output of the precoder filter 454. When the phases of the additional signal points B and C are defined as above, at least one of the three signal points is located within the boundary circle 41.

Figure 51:
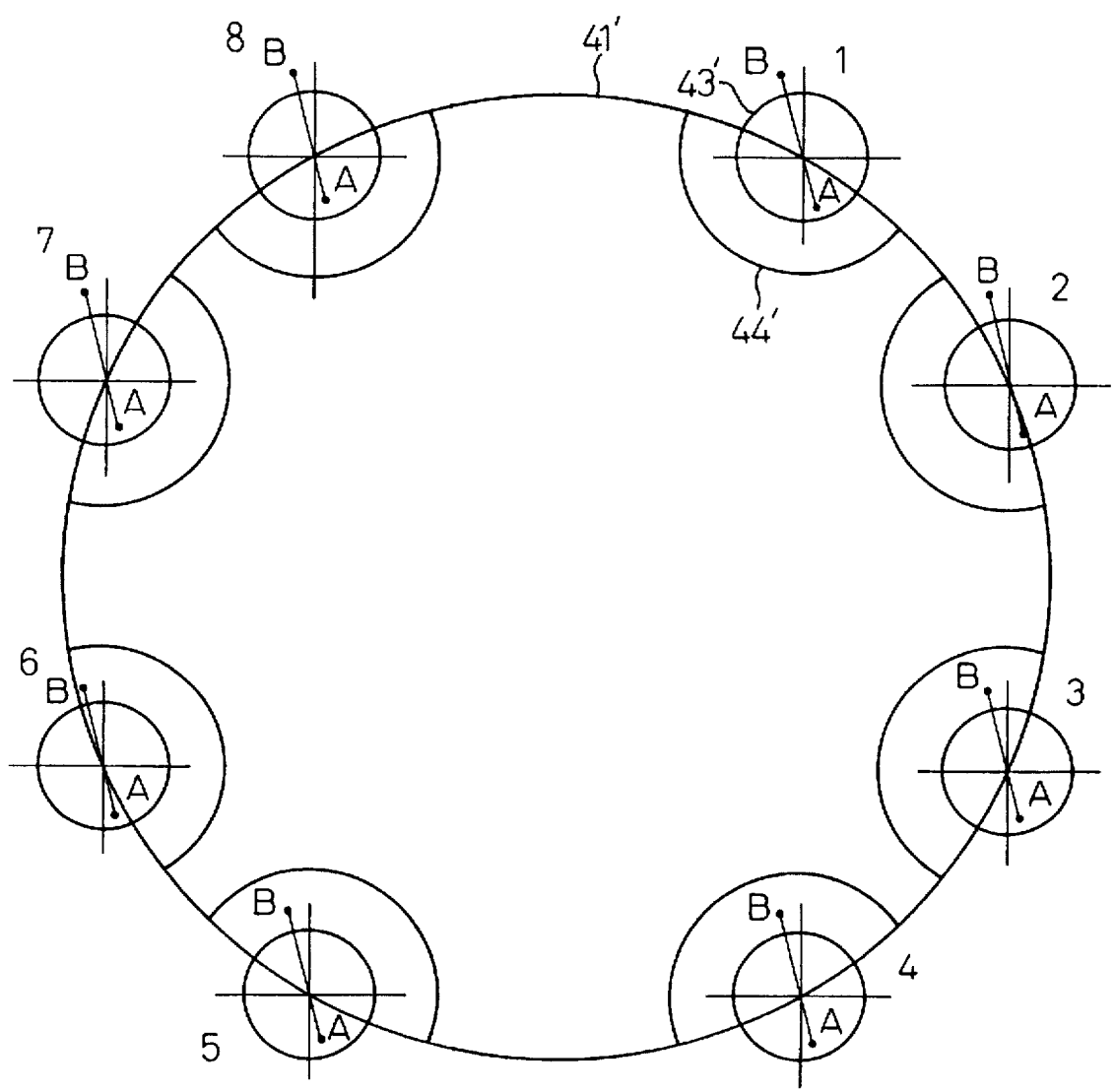
FIG. 51 is a diagram illustrating locations of the two signal points A and B when the signal point represented by the output of the precoder tap 561 is located at eight example locations 1 to 8 on the boundary circle which divides the first and second portions of FIG. 49.

FIG. 51 is a diagram illustrating locations of the two signal points A and B when the signal point represented by the output of the precoder tap 561 is located at eight example locations 1 to 8 on the boundary circle which divides the first and second portions of FIG. 49. In FIG. 51, reference numeral 41' denotes the boundary circle of FIG. 49, 43' denotes an area in which the original signal points are distributed, and 44' denotes the reference frame. In this example, the plurality of signal points A and B are located around the origin of the original signal point plane so that the phase differences between the two signal points A and B is maximized, i.e., nearly equal to 180°. The reference frame 44' corresponds to the circle 2 in FIG. 42, and the additional signal point B (corresponding to the signal point A' in FIG. 42) is defined within this circle. The difference between the arrangement of FIG. 51 and that of FIG. 42 is that the shape of the area 43' in which the original signal points are distributed, is a circle in FIG. 51, while the shape of the area 1 in which the original signal points are distributed, is a square in FIG. 42. As indicated in FIG. 51, the power of the output of the precoder filter 454 can be minimized by selecting one of the three signal points A, B, and C wherever the signal point represented by the output of the precoder tap 561 is located. For example, at the example location 1, the signal point A is selected as the signal point which provides the minimum power of the output of the precoder filter 454, and at the example location 4, the signal point B is selected as the signal point which provides the minimum power of the output of the precoder filter 454.

However, since only two signal points A and B are defined in the case of FIG. 51, both of the signal points A and B may be located outside the boundary circle. Therefore, from the view point of reducing the power of the output signal, the provision of more than two signal points for each input (original) signal point is preferable.

SIXTH EMBODIMENT (FIG. 52 to 59)

When the power of the signal point is great, the SNR characteristic is deteriorated. Namely, it is desirable to transmit digital information by a signal point having a smaller power. Therefore, in the sixth embodiment realizing the fifth aspect of the present invention, an operation which reduces the power of the signal points is executed as explained below.

FIG. 52 is a diagram illustrating a configuration of sixty-four original signal points. In FIG. 52, the powers of the signal points located outside the square indicated by solid lines, are greater than the powers of the signal point located inside the square. Therefore, in the sixth embodiment, the configuration of the original signal points are relocated when a total powers of a predetermined number of successive signal points after the relocation is smaller than a total powers of a predetermined number of successive signal points before the relocation. FIG. 53 is a diagram illustrating the configuration of the original signal points after the original signal points of FIG. 52 are relocated. As understood from FIGS. 52 and 53, by this relocation, the block area in the first quadrant and the block area in the third quadrant are exchanged, and the block area in the second quadrant and the block area in the fourth quadrant are exchanged. Thus, when the above predetermined number of successive signal points are statistically located far from the origin of the original signal point plane, the total power of these signal points is reduced by the relocation.

In an application in which a soft decision is used in the receiver side, it is necessary to the subsets (as indicated in Table 3) of the signal points are not changed by the above relocation. In the relocation from FIG. 52 to FIG. 53, the configuration of subsets is not changed. The black, blank, and double circles are used for indicating the configuration of some representatives of the subsets.

Figure 54:
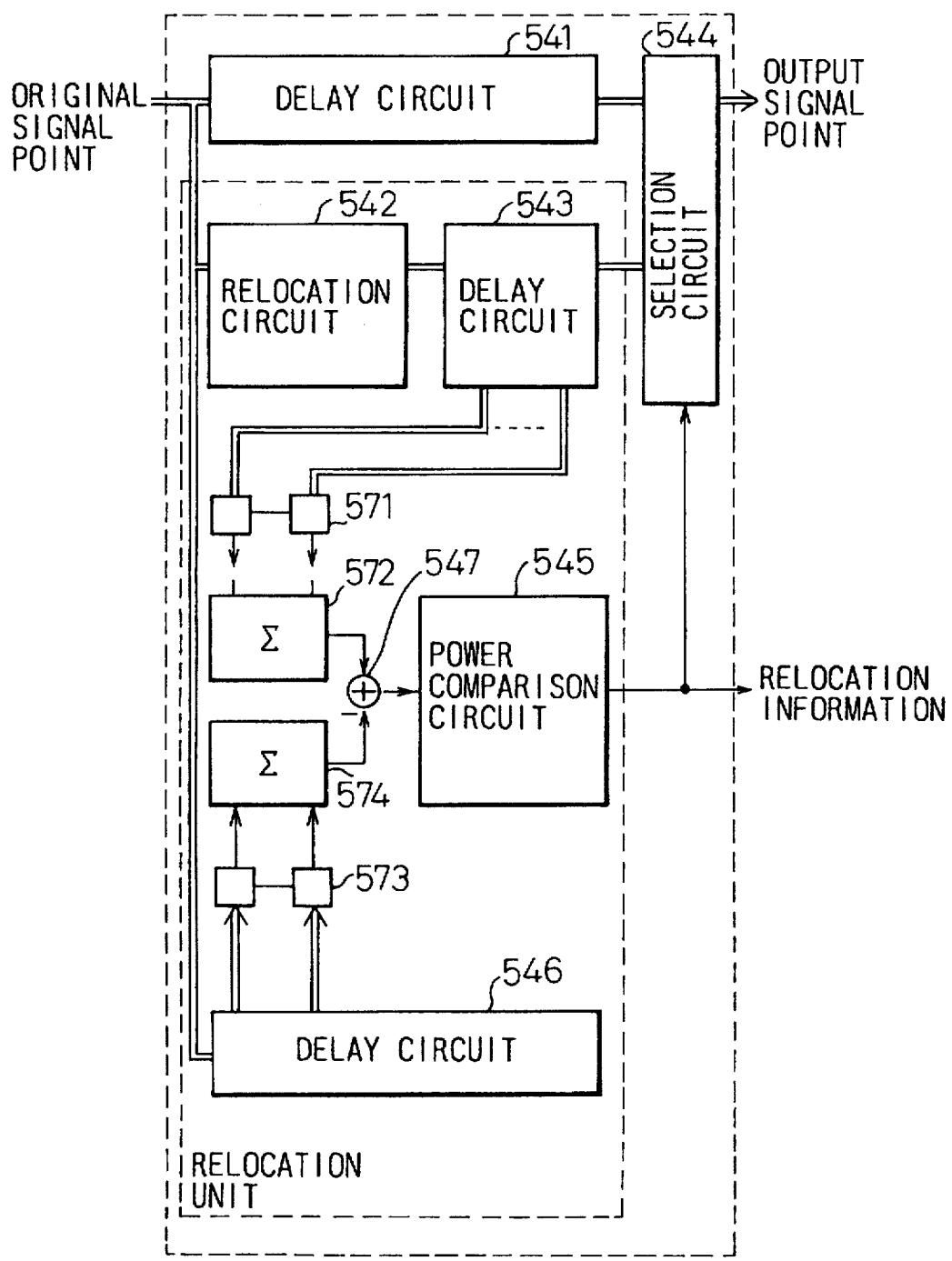
FIG. 54 is a diagram illustrating an example construction for executing the relocation of the original signal points.

FIG. 54 is a diagram illustrating an example construction for executing the relocation of the original signal points as above. In FIG. 54, reference numerals 541, 543, and 546 each denote a delay circuit, 542 denotes a relocation circuit, 544 denotes a selection circuit, 545 denotes a power comparison circuit, 547 denotes an adder, 571 and 573 each denote a plurality of square calculation circuits, and 572 and 574 each denote a summation circuit.

The relocation circuit 524 performs the above relocation of the original signal points. The relocation circuit 524 may be realized by a read-only memory (ROM) which inputs vector components (coordinates) of each original signal point as an address, and outputs corresponding vector components of the signal points after relocated. The delay circuit 543 delays the output of the relocation circuit 542 for storing vector components of a group of successive relocated symbols. The stored vector components of the group of successive relocated symbols are output in parallel, and are supplied to the plurality of square calculation circuits 571. Then, a sum of the calculated squares of the vector components of the group of successive relocated symbols are obtained as a total power of the successive relocated symbols in the summation circuit 572, and is supplied to the adder as a minuend. In addition, the vector components of successive symbols which are equal to the inputs of the relocation circuit 542 corresponding to the above successive relocated symbols, are stored in the delay circuit 546. The stored vector components of the group of successive symbols are output in parallel, and are supplied to the plurality of square calculation circuits 574. Then, a sum of the calculated squares of the vector components of the group of successive symbols are obtained as a total power of the successive symbols in the summation circuit 574, and is supplied to the adder as a subtrahend. The adder 547 calculates a difference of the above minuend and the subtrahend, and the calculated difference is supplied to the power comparison circuit 545. The power comparison circuit 545 determines the polarity of the output of the adder, and outputs relocation information which indicates which of the total powers of the group of successive symbols and the corresponding successive relocated symbols is smaller, i.e., whether or not the relocation is performed for the group of successive symbols. The relocation information is transmitted to the receiver side, for example, through a secondary channel, for informing the receiver side whether or not the relocation is performed for the group of successive symbols, and is also used for controlling the selection circuit 544. The selection circuit 544 receives the above group of successive symbols through the delay circuit 541 and the corresponding successive relocated symbols through the delay circuit 543, and selects one of these outputs from the delay circuits 541 and 543 based on the relocation information so that the successive symbols which provides a smaller total power are selected as signal points to be output.

Figure 55:
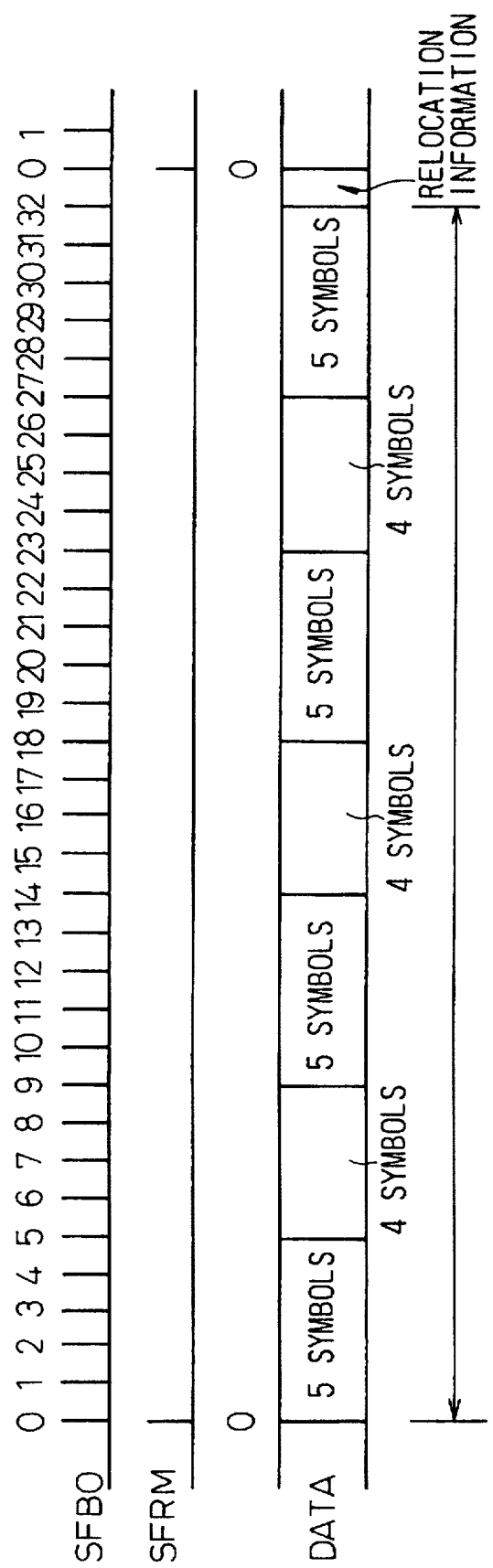
FIG. 55 is a timing diagram illustrating an example operation of transmitting the outputs of the construction of FIG. 54.

FIG. 55 is a timing diagram illustrating an example operation of transmitting the outputs of the construction of FIG. 54. In FIG. 55, reference SFBO denotes timeslots for a main channel, SFRM denotes timeslots for the secondary channel, and DATA denotes the contents of information transmitted to receiver side. In this example, the number of symbols contained in the above group is alternatively changed between four and five. i.e., the above determination of the necessity of the relocation and the selection of the relocated group or non-relocated group is performed for every five or four successive symbols, alternatively. The relocation information for seven groups of symbols is time-division-multiplexed after the data of the signal points for the seven groups.

Figure 56:
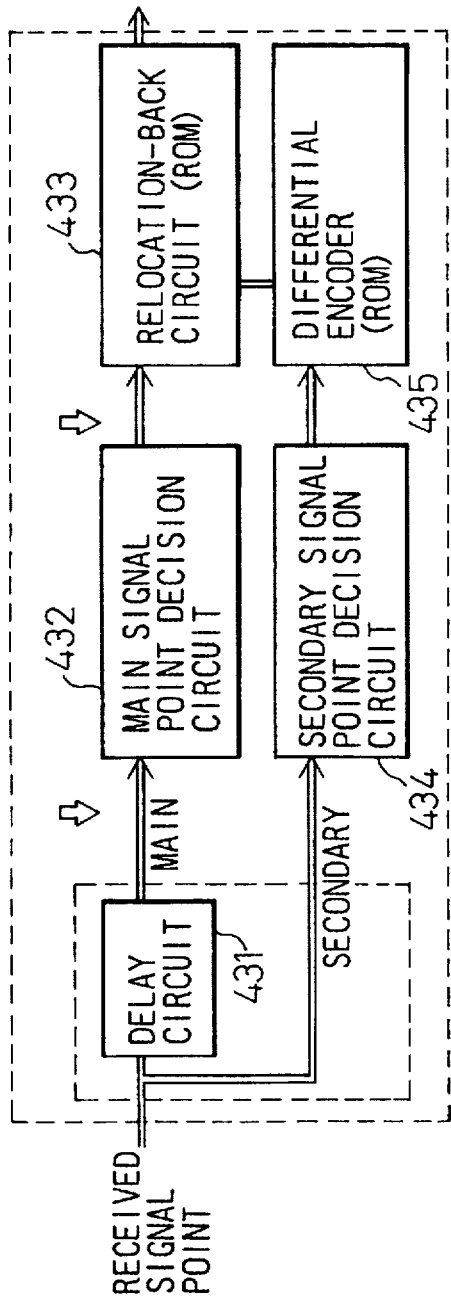
FIG. 56 is a diagram illustrating an example construction to be provided on the receiver side for processing the data output from the construction of FIG. 54.

FIG. 56 is a diagram illustrating an example construction to be provided on the receiver side for processing the data output from the construction of FIG. 54. In FIG. 56, reference numeral 431 denotes a delay circuit, 432 denotes a main signal point decision circuit, 433 denotes a relocation-back circuit, 434 denotes a secondary signal point decision circuit, and 435 denotes a differential encoder. In the received signal containing the data as indicated in FIG. 55, the data in the main channel is delayed in the delay circuit 431, and is then supplied to the main signal point decision circuit 432. On the other hand, the relocation information in the secondary channel is directly supplied to the secondary signal point decision circuit 434.

Figure 78:
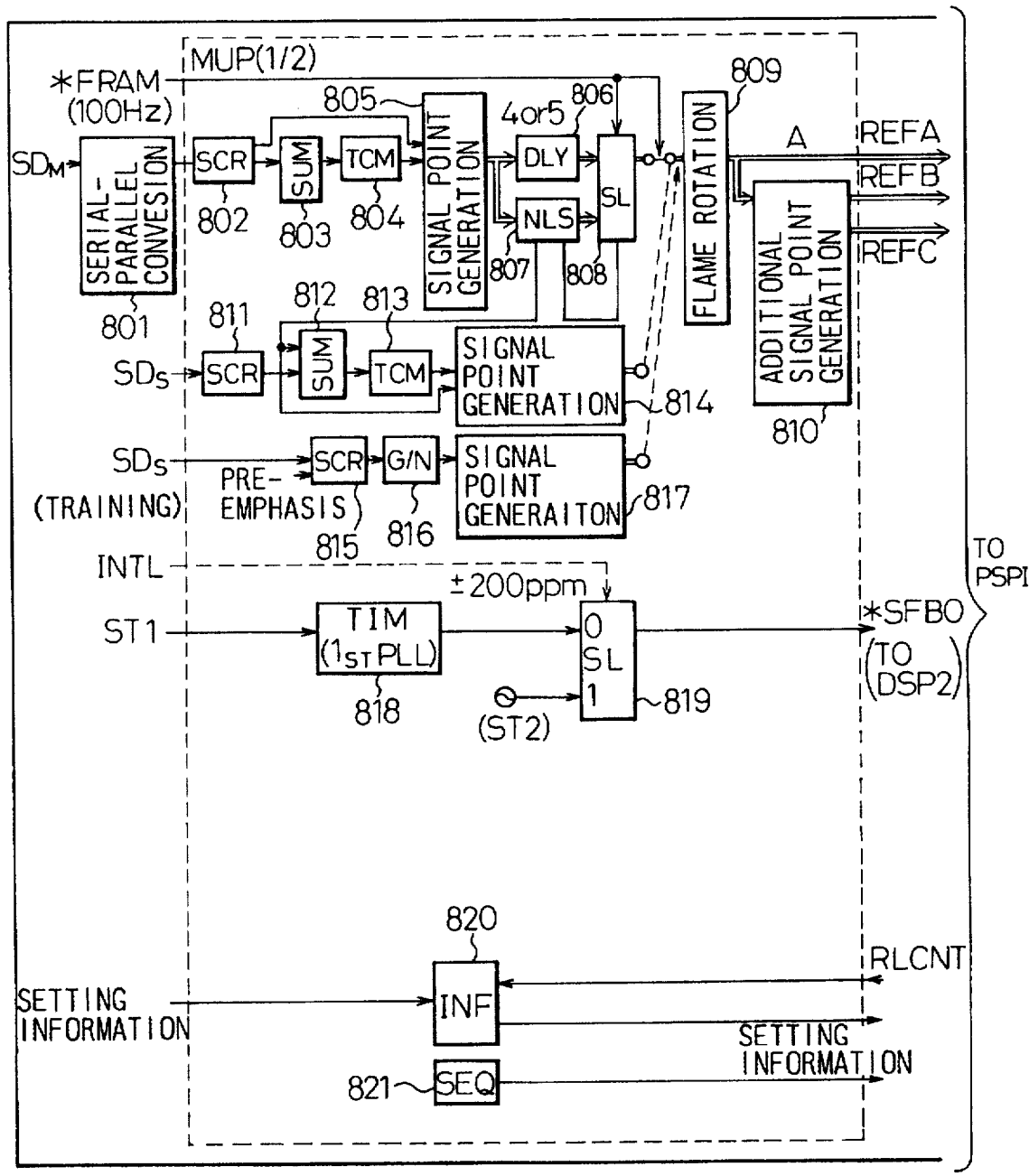
FIGS. 78 to 81 are diagrams illustrating the concrete construction of a modem to which the various aspects of the present invention are applied.

The construction of FIG. 56 is provided for the case wherein the construction of FIG. 54 is used together with the dynamic precoder in the fifth embodiment. Therefore, the main signal point decision circuit 432 and the secondary signal point decision circuit 434 are provided for the main and secondary channels, respectively. Each of the main signal point decision circuit 432 and the secondary signal point decision circuit 434 has essentially the same function as the decision unit 532 in the construction of FIG. 47. Therefore, each of the main signal point decision circuit 432 and the secondary signal point decision circuit 434 can also be realized by a read-only memory (ROM). Thus, the output of the main signal point decision circuit 432 corresponds to the output of the selection circuit 544 in the construction of FIG. 54. The information output from the secondary signal point decision circuit 434, is supplied to the differential encoder 435. The differential encoder 435 is provided in this example construction because the construction of FIG. 56 is provided for the case wherein the relocation information output from the construction of FIG. 54 is encoded by a cumulative encoder (for example, as indicated in FIG. 78 by reference 812). Therefore, the output of the differential encoder 435 corresponds to the relocation information output from the construction of FIG. 54. The relocation-back circuit 433 performs on data for each group of symbols the inverse operation as the operation of the relocation circuit 542 in FIG. 54 when the relocation information supplied corresponding to the group, which is supplied from the differential encoder 435, indicates that the relocation is performed for the group. The relocation-back circuit 433 passes the data for each group of symbols when the relocation information supplied corresponding to the group, which is supplied from the differential encoder 435, indicates that the relocation is not performed for the group. The relocation information corresponding to the group to be processed is supplied to the relocation-back circuit 433 at an appropriate timing due to the delay provided by the delay circuit 431.

In both of the above cases, in the construction of FIG. 47, the partial response filter 532 is not necessary, and the transmission line may be any system for transferring digital signals. For example, the transmission line in FIG. 47 may be replaced with any transmission system, or a data writing and reading mechanism in a digital data recording apparatus. In the above transmission system, the signal may not be modulated. Namely, the digital data may be transmitted as a form of a baseband signal. In this case, the vector (signal point) signal is transmitted through a two parallel transmission lines for transmitting the respective components of the vector signal. Further, in the data writing and reading mechanism in a digital data recording apparatus, the data writing in a recording medium may be performed by either of a modulated signal or a baseband signal. When writing data by the baseband signal, the writing of the two vector components representing the signal points are carried out in parallel. Since the data writing and reading mechanism per se is well known, that is not explained in detail in this specification, the only necessary matter to apply the present invention to the data writing and reading mechanism is to provide the construction of the present invention on the input and output sides of the data writing mechanism. In addition, when the baseband signal is used for data writing, the data writing and reading mechanism must be modified to realize a construction for recording and regenerating baseband signals in parallel.

Figure 57:
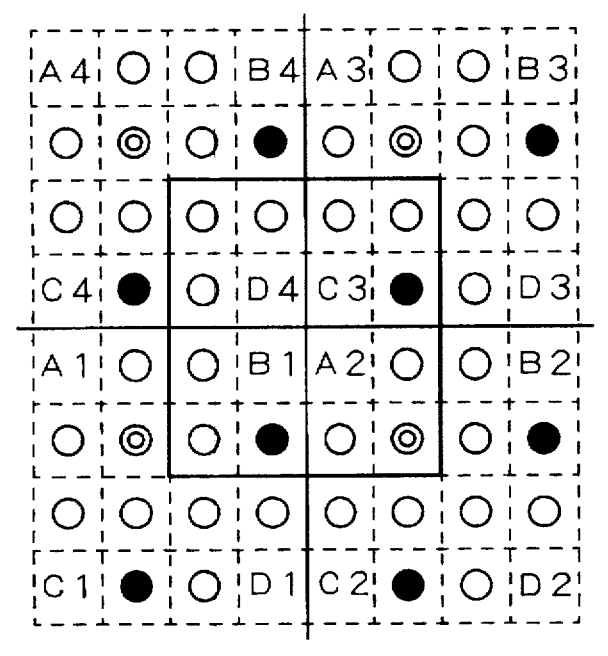

SEVENTH EMBODIMENT (FIGS. 57 and. 58)

FIG. 57 is a diagram illustrating an example configuration of signal points on a decision plane on which a hard decision is performed on the receiver side to determine the received signal point. When performing, on the receiver side, a hard decision for signal points located at the outer end of the configuration, conventionally, it is necessary to perform a special processing, called "peripheral processing". In the algorithm for performing the peripheral processing, imaginary signal points are introduced around the signal point to be determined, and the hard decision is performed by assuming the existence of the imaginary signal points around the signal point to be determined. However, in particular, when the boundary of the configuration of the received signal points is a circle, a great amount of the peripheral processing is required.

According to the sixth aspect of the present invention, in the seventh embodiment of the present invention, additional signal points are defined around the extent of the distribution of received signal points which are expected from the manner of precoding and filtering on the transmitter side and the frequency characteristic in the transmission system between the transmitter side and the receiver side.

Figure 58:
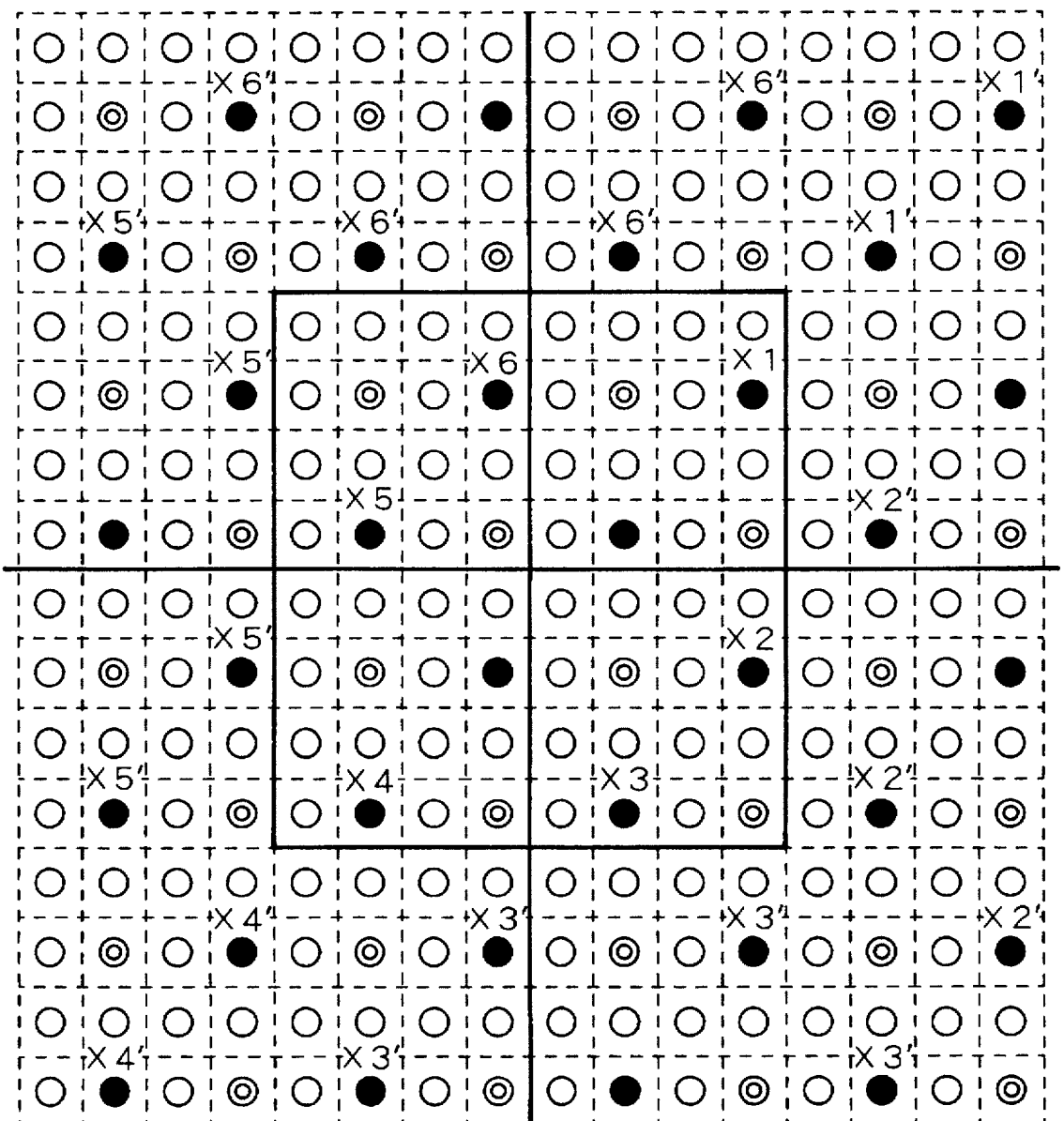
FIG. 58 is a diagram illustrating an example of the configuration of signal points on the received signal plane, wherein additional signal points are defined around the extent of the distribution of received signal points which are expected from the manner of precoding and filtering on the transmitter side and the frequency characteristic in the transmission system between the transmitter side and the receiver side.

FIG. 58 is a diagram illustrating an example of the configuration of signal points on the received signal plane, wherein additional signal points are defined around the extent of the distribution of received signal points which are expected from the manner of precoding and filtering on the transmitter side and the frequency characteristic in the transmission system between the transmitter side and the receiver side.

In the configuration of FIG. 58, the signal points inside the square indicated by solid lines are the signal points of FIG. 57. For example, corresponding to the signal point X1 which are originally defined, additional signal points X1' are defined at the locations indicated in FIG. 58. Namely, the additional signal points X1' are located with a constant interval at the locations for the same subset as the corresponding signal point X1 which are originally defined. In addition, corresponding to the signal point X5 which are originally defined, the additional signal points X5' are defined in two directions with a constant interval at the locations for the same subset as the signal point X5 which are originally defined.

When one of the above additional signal points, for example, the additional signal point X5', is determined by the hard decision on the receiver side, the corresponding signal point X5 which are originally defined can be recognized from the correspondence as indicated in FIG. 58. Such correspondence may be stored in the form of a table on a memory, or a read-only memory (ROM) which inputs vector components of the additional signal point, and outputs a signal point which is originally defined, corresponding to the additional signal point input thereto, may be provided.

Figure 59:
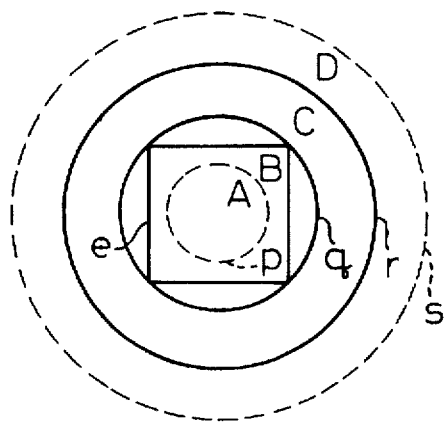
FIG. 59 is a diagram illustrating an example configuration of the additional signal points for the dynamic precoder in the fifth embodiment.
Figure 61:
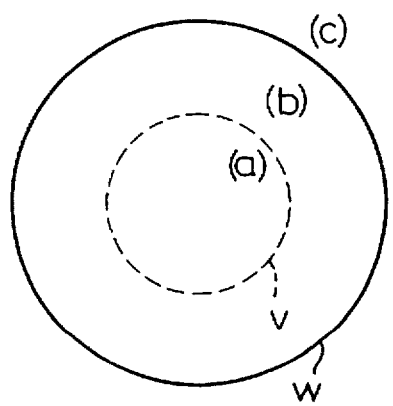
FIG. 61 is a diagram illustrating a plurality of portions of the precoder tap plane defined in the eighth embodiment for the operation of the precoder tap value area decision circuit 456 in FIG. 45.

EIGHTH EMBODIMENT (FIGS. 59 and 61)

FIG. 59 is a diagram illustrating an example configuration of the additional signal points for the dynamic precoder in the fifth embodiment. In FIG. 59, reference A denotes an inner portion of the original signal point area, B denotes an outer portion of the original signal point area, C denotes a nearer portion of the peripheral area, and D denotes an outer portion of the peripheral area. The portions A and B are divided by a circle p, the portions B and C are divided by the circle q, the portions C and D are divided by the circle r, and the portion D is encircled by the circle s. In addition, the area in the square is a relocation area in which the relocation explained in the sixth embodiment with reference to FIGS. 52 to 56, is performed. Namely, in the eighth embodiment, both the provisions in the fifth and sixth embodiments are adopted. In the eighth embodiment, the additional signal points corresponding to the original signal points located in the inner portion A of the original signal point area, are located in the outer portion D of the peripheral area, and the additional signal points corresponding to the original signal points located in the outer portion B of the original signal point area, are located in the inner portion C of the peripheral area. This definition is similar to the configuration in FIG. 43. The above correspondence is introduced in this embodiment based on the consideration that the original signal points located in the outer portion B will increase the power of the precoder tap values more than the original signal points located in the inner portion A.

Figure 60:
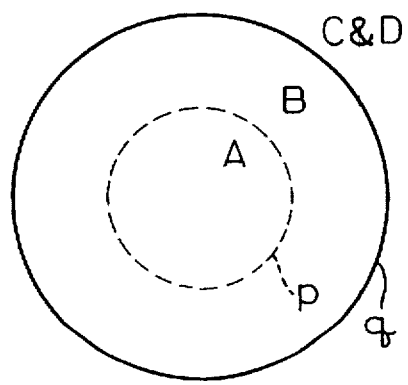
FIG. 60 is a diagram illustrating a plurality of portions of the original signal point plane defined in the eighth embodiment for the operation of the original signal point area decision circuit 457 in FIG. 45.

FIG. 60 is a diagram illustrating a plurality of portions of the original signal point plane defined in the eighth embodiment for the operation of the original signal point area decision circuit 457 in FIG. 45. In FIG. 60, the above inner portion A in FIG. 59 and the above outer portion B in FIG. 59 are defined as the plurality of portions for use by the original signal point area decision circuit 457 in FIG. 45. Namely, the threshold value TH4 corresponds to the diameter of the circle p in FIG. 60 (59).

FIG. 61 is a diagram illustrating a plurality of portions of the precoder tap plane defined in the eighth embodiment for the operation of the precoder tap value area decision circuit 456 in FIG. 45. The precoder tap plane is divided into three portions by circles v and w, as indicated in FIG. 61, and the inner area (a), the middle area (b), and the outer area (c), are defined as the plurality of portions defined for the precoder tap value area decision circuit 456 in FIG. 45. Namely, the threshold values TH6 and TH7 correspond to the diameters of the circles p and q in FIG. 60 (59), respectively.

In the eighth embodiment, the optimum signal point selection circuit 455 in FIG. 45 is controlled as follows.

| Precoder Tap | Original | |
| --- | --- | --- |
| Output | A | B |
| (a) | ORIGINAL | ORIGINAL |
| (b) | ORIGINAL | OPTIMUM |
| (c) | OPTIMUM | OPTIMUM |

In the above table, "A" indicates the case wherein the original signal point is located in the portion A in FIG. 60, "B" indicates the case wherein the original signal point is located in the portion B in FIG. 60, "(a)" indicates the case wherein the signal point represented by the precoder tap values is located in the area (a) in FIG. 61, "(b)" indicates the case wherein the signal point represented by the precoder tap values is located in the area (b) in FIG. 61, and "(c)" indicates the case wherein the signal point represented by the precoder tap values is located in the area (c) in FIG. 61. In the entries in the above Table, "ORIGINAL" indicates that the optimum signal point selection circuit 455 in FIG. 45 is controlled to output the original signal point, and "OPTIMUM" indicates that the optimum signal point selection circuit 455 in FIG. 45 is controlled to output the optimum one of the three signal points.

NINTH EMBODIMENT (FIGS. 62 to 65)

In the ninth embodiment, the additional signal points corresponding to the original signal points located relatively nearer the origin, are located nearer the origin in the peripheral area, and the additional signal points corresponding to the original signal points located relatively further from the origin, are located relatively further from the origin in the peripheral area. This definition is similar to the configuration in FIG. 44. The reason the above correspondence is introduced in this embodiment is explained later with reference to FIGS. 64 to 66.

Figure 62:
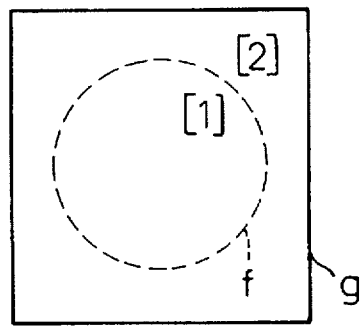
FIG. 62 is a diagram illustrating a plurality of portions of the original signal point plane defined in the ninth embodiment for the operation of the original signal point area decision circuit 457 in FIG. 45.

FIG. 62 is a diagram illustrating a plurality of portions of the original signal point plane defined in the ninth embodiment for the operation of the original signal point area decision circuit 457 in FIG. 45. In FIG. 62, the original signal point area has a form of the square g, and a circle f is defined in the square g to divide the original signal point area into the inner portion [1] and the outer portion [2], which are defined as the plurality of portions for use by the original signal point area decision circuit 457 in FIG. 45. Namely, the threshold value TH4 corresponds to the diameter of the circle f in FIG. 62.

In addition, in the ninth embodiment, both the provisions in the fifth and sixth embodiments are adopted, and the above square g is used as the relocation frame in which the relocation of the signal points is performed.

In the ninth embodiment, the plurality of portions defined for the precoder tap value area decision circuit 456 in FIG. 45 are defined in the same manner as the eighth embodiment.

In the ninth embodiment, the optimum signal point selection circuit 455 in FIG. 45 is controlled as follows.

| Precoder Tap | Original | |
| --- | --- | --- |
| Output | [1] | [2] |
| (a) | ORIGINAL | ORIGINAL |
| (b) | OPTIMUM | ORIGINAL |
| (c) | OPTIMUM | OPTIMUM |

In the above table, "[1]" indicates the case wherein the original signal point is located in the portion [1] in FIG. 62, and "[2]" indicates the case wherein the original signal point is located in the portion [2] in FIG. 62.

Figure 66:
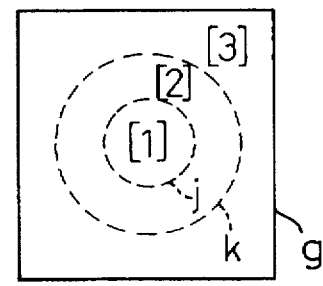
FIG. 66 is a diagram illustrating a plurality of portions of the original signal point plane defined in the tenth embodiment for the operation of the original signal point area decision circuit 457 in FIG. 45.
Figure 65:
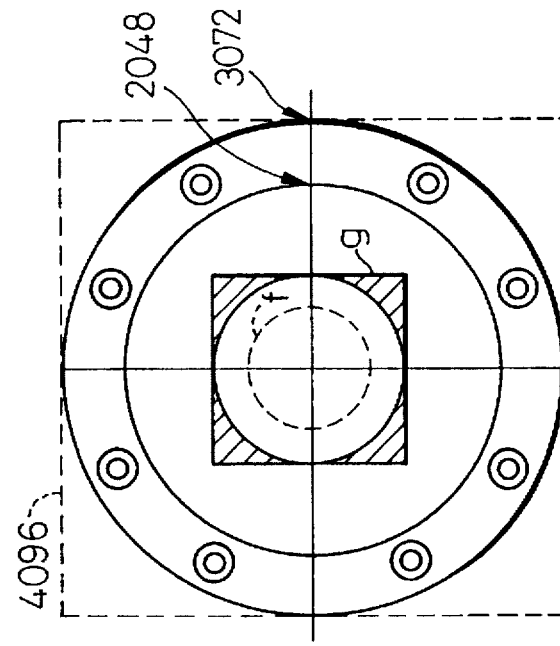
FIGS. 63 to 65 are diagrams for indicating the locations of areas in which the probability of appearance of the signal points is small.
Figure 64:
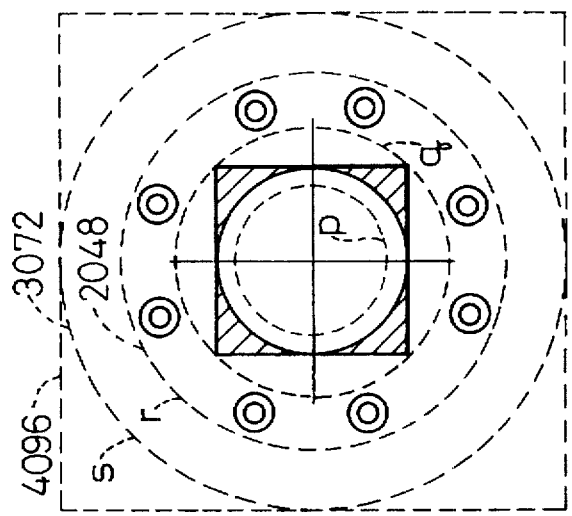
Figure 63:
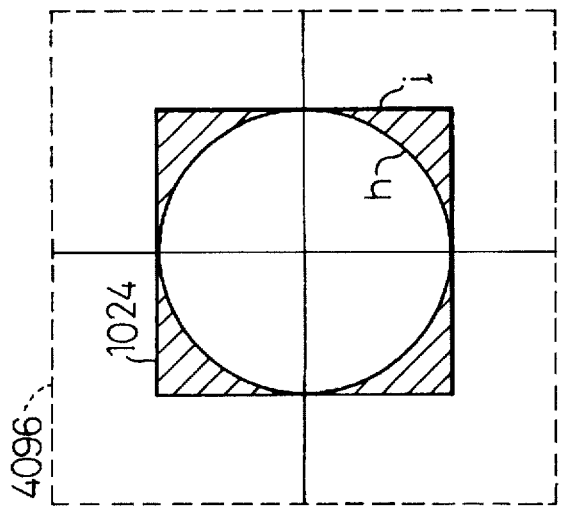
Figure 68:
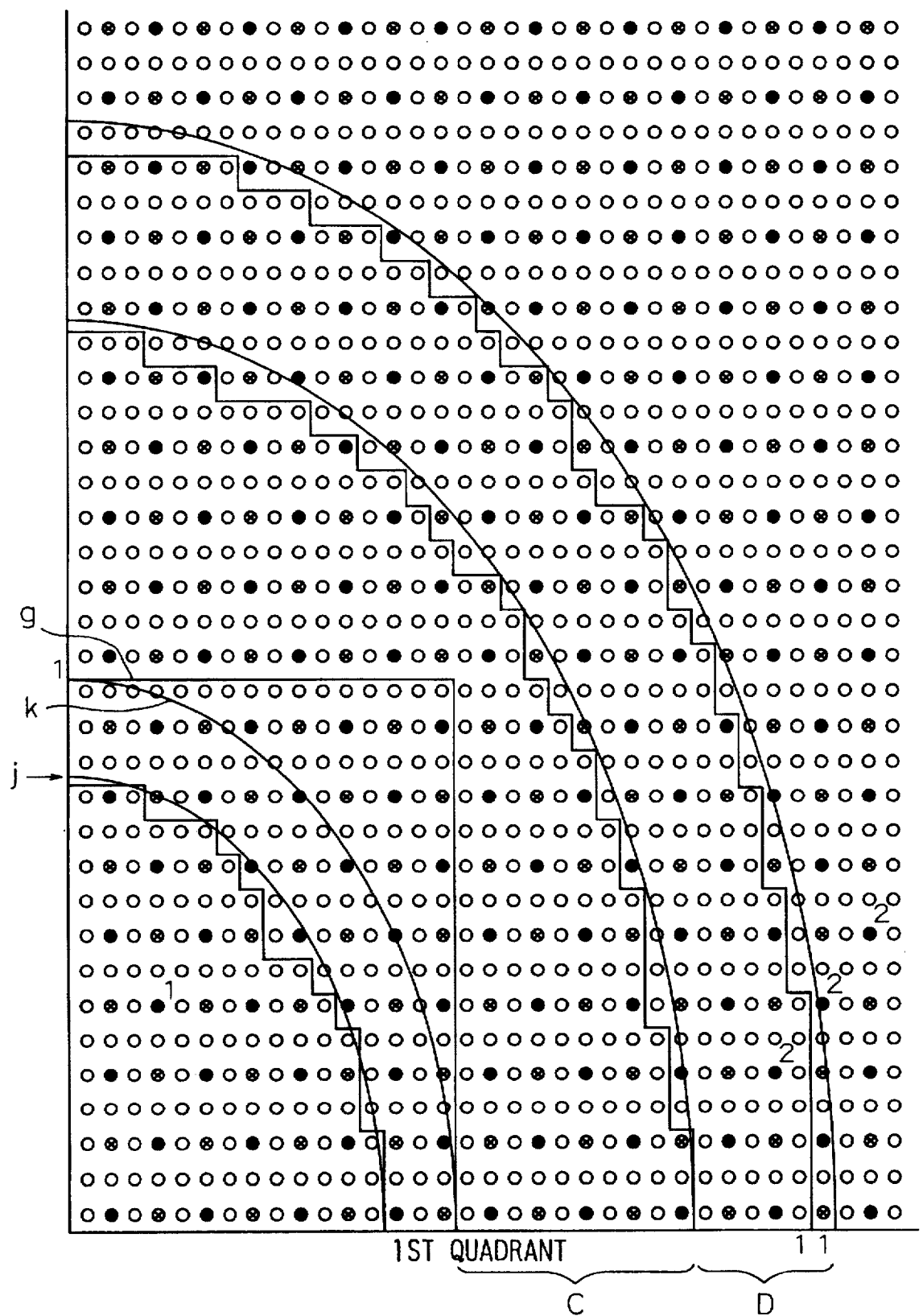
FIGS. 68 to 71 are diagrams illustrating a first example configuration of the signal points in the first to fourth quadrants, respectively.
Figure 69:
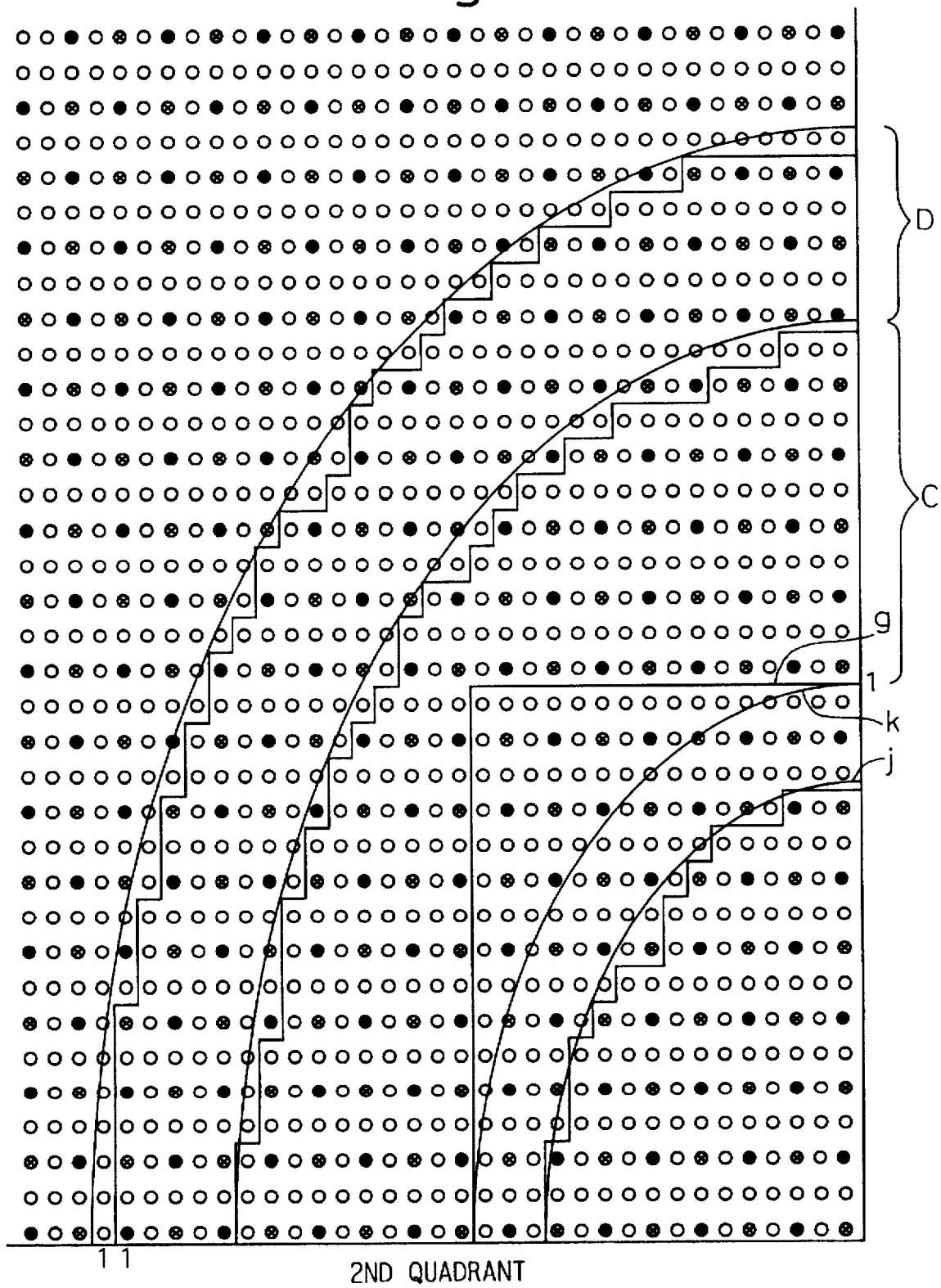
Figure 70:
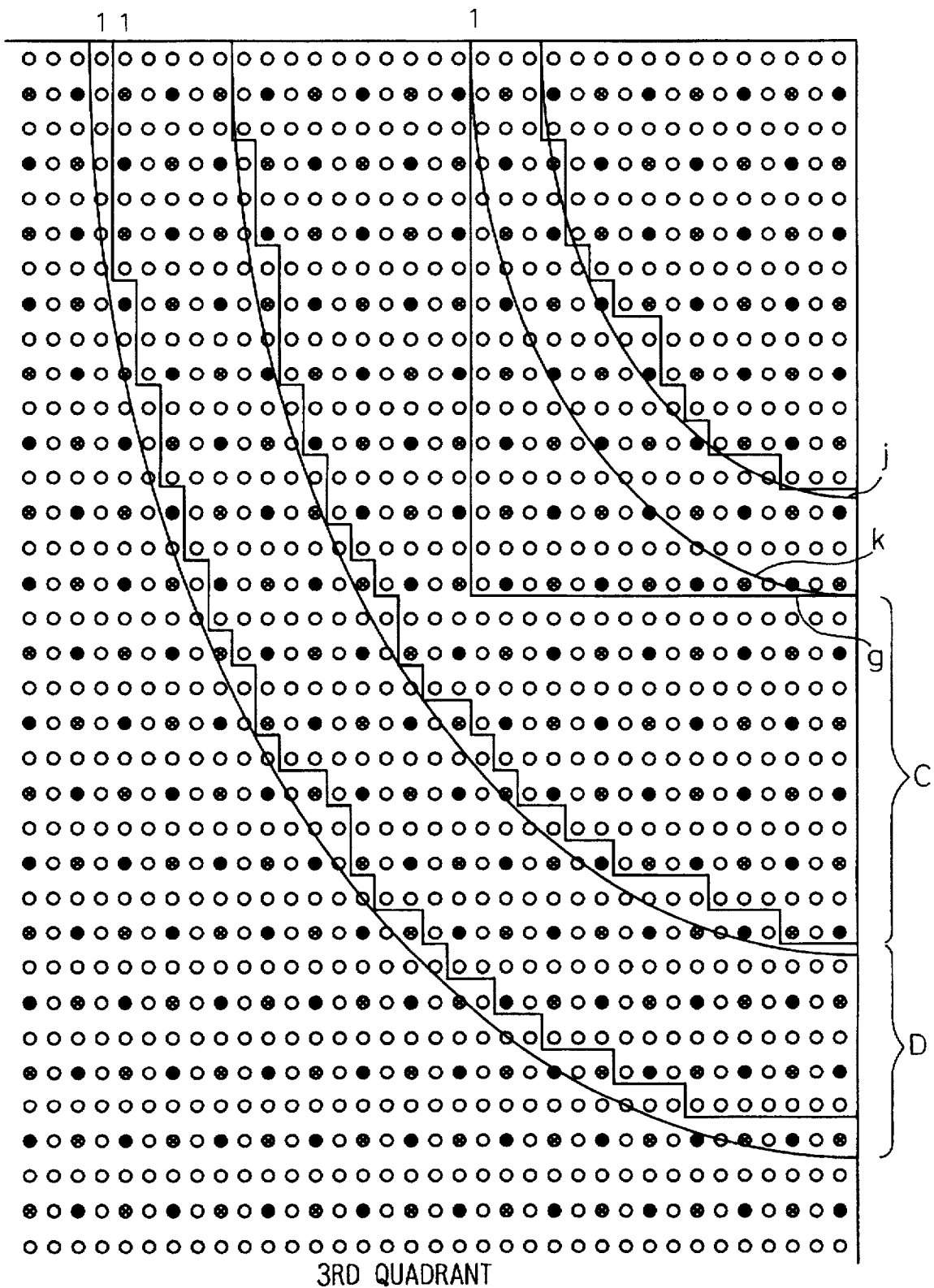
Figure 71:
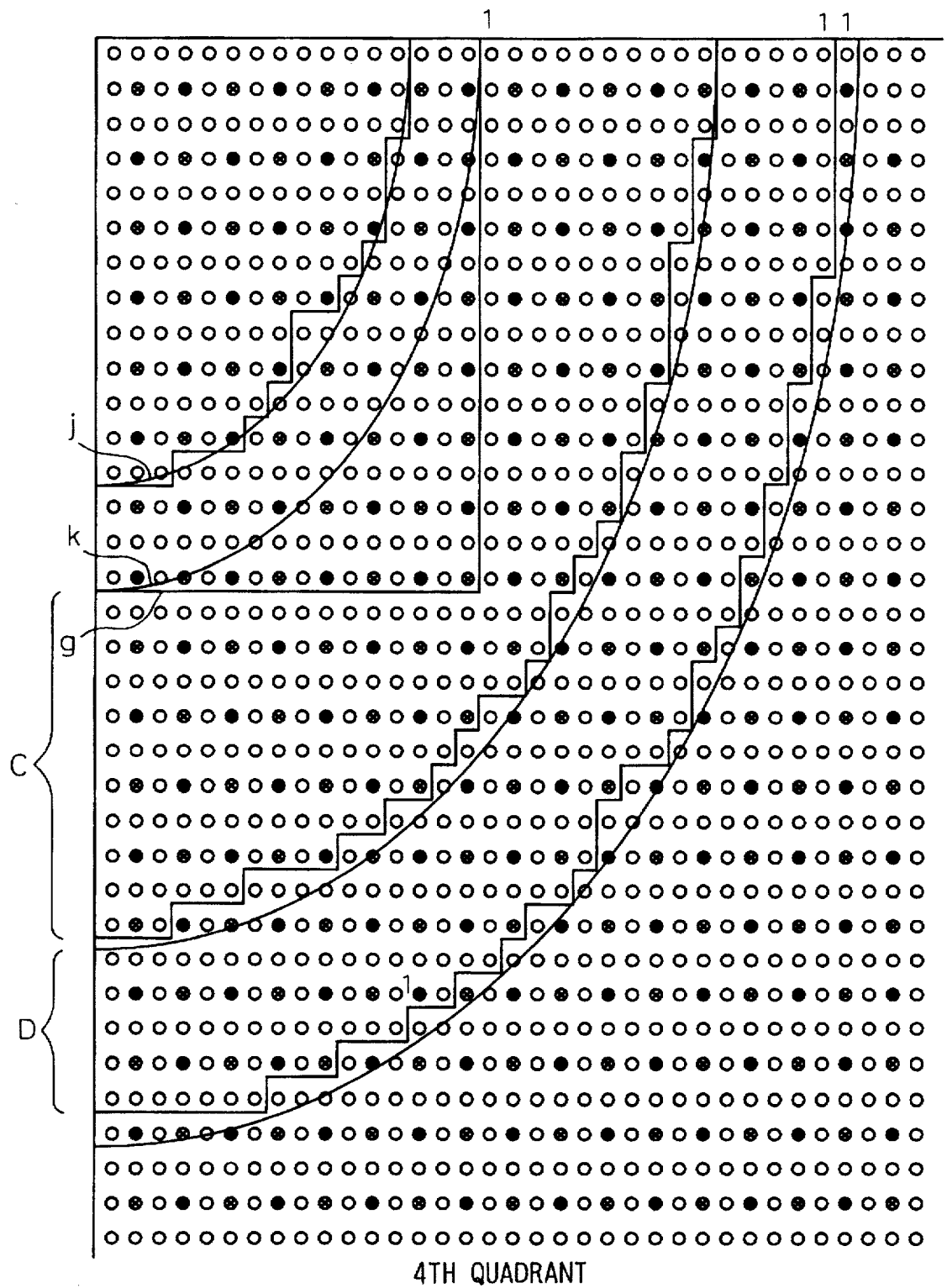
Figure 72:
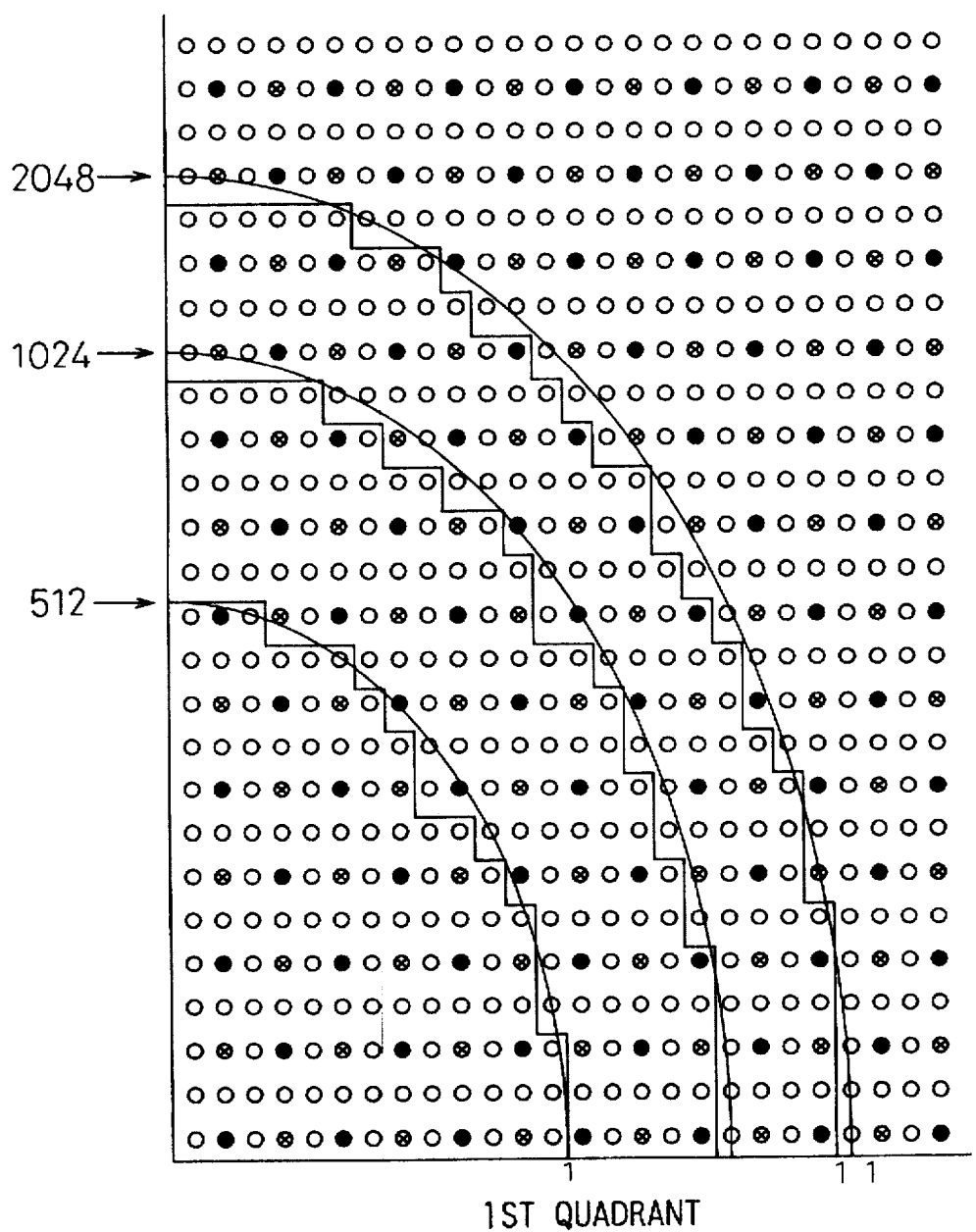
FIGS. 72 to 75 are diagrams illustrating a second example configuration of the signal points in the first to fourth quadrants, respectively.
Figure 73:
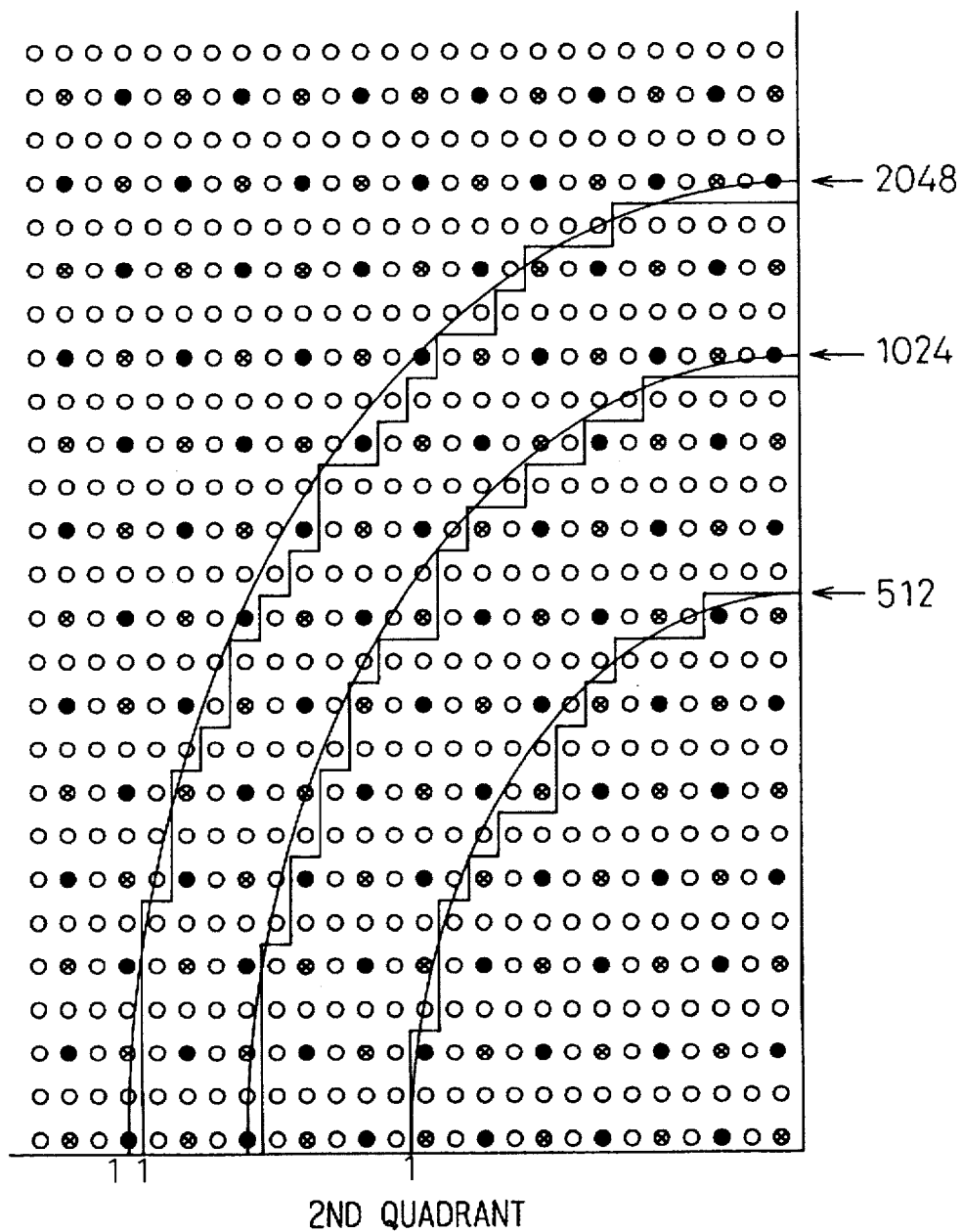
Figure 74:
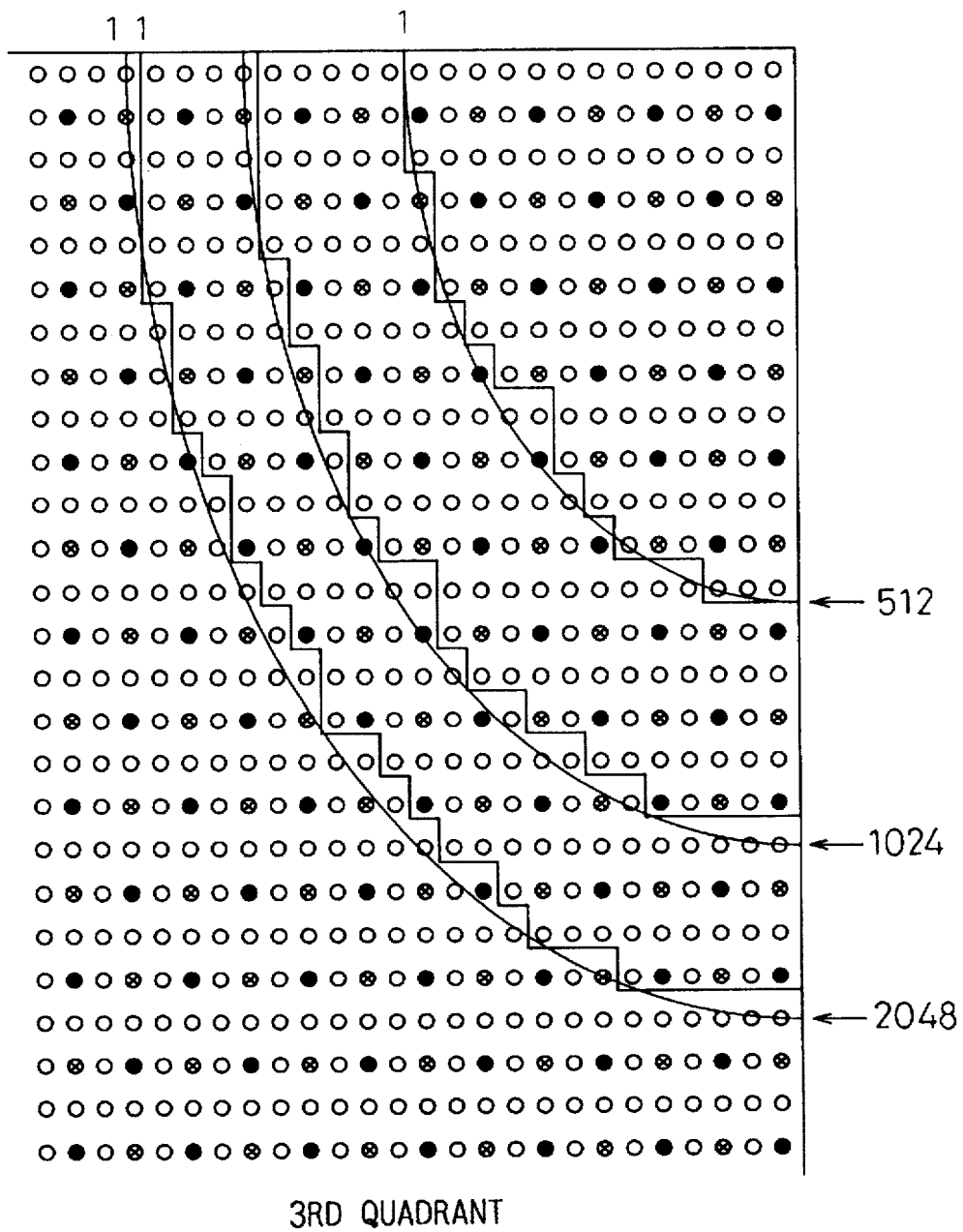
Figure 75:
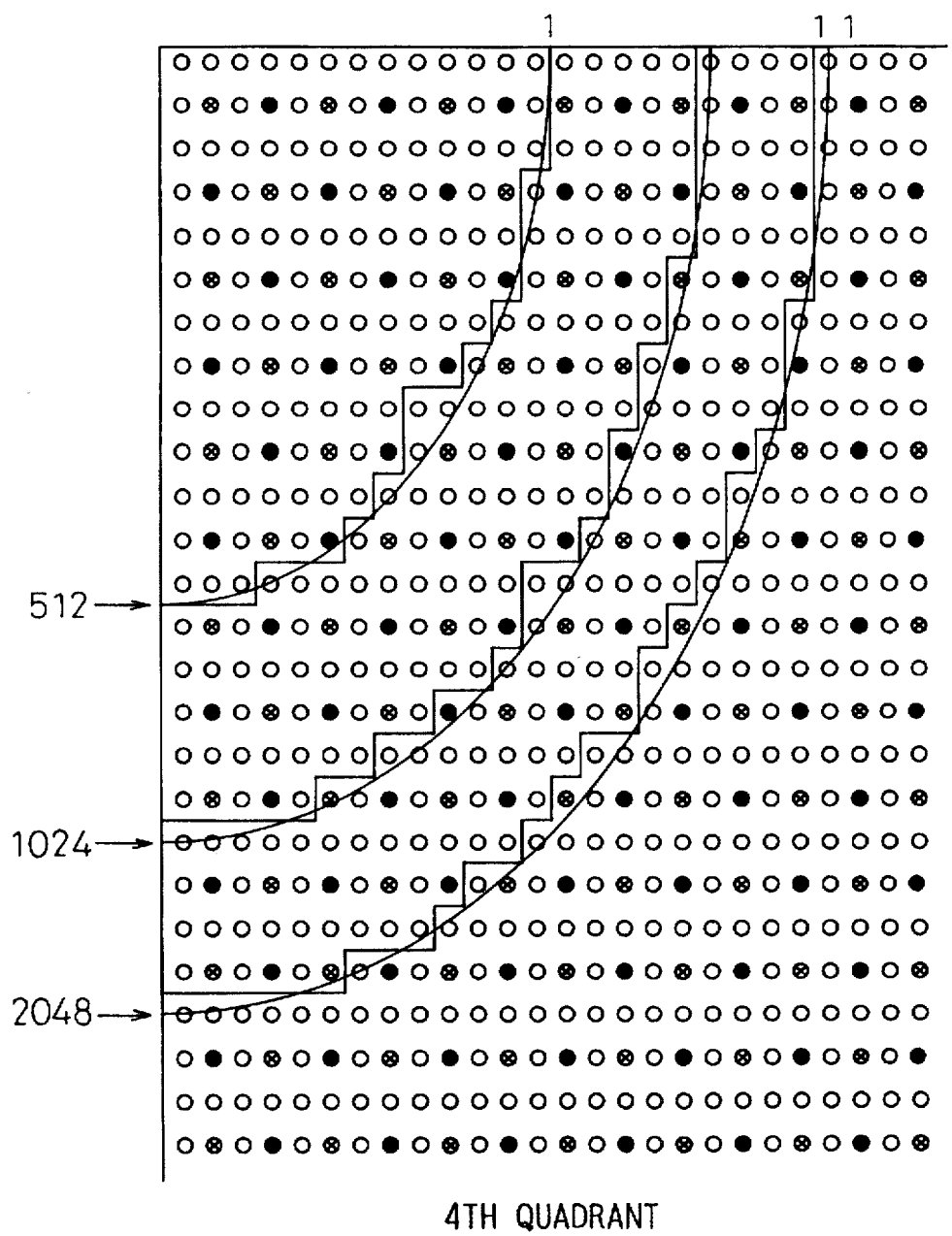

FIGS. 63 to 65 are diagrams for indicating the locations of areas in which the probability of appearance of the signal points is small. FIG. 64 is a diagram illustrating the locations of areas in which the probability of appearance of the signal points is small when the relocation of the sixth embodiment is adopted. FIG. 65 is a diagram illustrating the locations of areas in which the probability of appearance of the signal points is small in the case of the eighth embodiment. FIG. 66 is a diagram illustrating the locations of areas in which the probability of appearance of the signal points is small in the case of the ninth embodiment. In FIGS. 63 to 65, the hatched areas are portions of the original signal point area in which portions the probability of appearance of the signal points is small due to the relocation of the sixth embodiment, and the areas containing the double circles are portions of the peripheral area around the original signal point area, where in the portions the probability of appearance of the signal points is small because the dynamic precoder of the fifth embodiment generates in these portions the additional signal points corresponding to the original signal points in the above hatched areas.

In particular, as indicated in FIG. 64, in the eighth embodiment, the above portions in which the probability of appearance of the signal points is small, are located at the mean distance from the origin. Therefore, such configuration seems to increase the average power of the output signal points.

On the other hand, as indicated in FIG. 65, in the ninth embodiment, the above portions in which the probability of appearance of the signal points is small, are located at a relatively larger distance from the origin. Therefore, such configuration seems to be decrease the average power of the output signal points. However, in the ninth embodiment, the additional signal points corresponding to the original signal points located near the origin, are defined near the original signal point area. Generally, the probability that the original signal points located near the origin makes the precoder tap value exceed the boundary of the precoder tap plane, is very small.

The simulation results of the above eighth and ninth embodiments are compared with the simulation result of the tenth embodiment, later with reference to FIG. 67.

TENTH EMBODIMENT (FIG. 66)

In the tenth embodiment, the additional signal points corresponding to the original signal points located near the origin, are located relatively further from the origin in the peripheral area, and the additional signal points corresponding to the original signal points located relatively far from the origin, are located relatively nearer the origin in the peripheral area. This definition is similar to the configuration in FIG. 43.

FIG. 66 is a diagram illustrating a plurality of portions of the original signal point plane defined in the tenth embodiment for the operation of the original signal point area decision circuit 457 in FIG. 45. In FIG. 66, the original signal point area has a form of the square g, and circles j and k are defined in the square g to divide the original signal point area into the inner portion [1], the middle portion [2], and the outer portion [3], which are defined as the plurality of portions for use by the original signal point area decision circuit 457 in FIG. 45. Namely, the threshold values TH4 and TH5 correspond to the diameters of the circles j and k in FIG. 66, respectively.

In addition, in the tenth embodiment, both the provisions in the fifth and sixth embodiments are adopted, and the above square g is used as the relocation frame in which the relocation of the signal points is performed.

In the tenth embodiment, the plurality of portions defined for the precoder tap value area decision circuit 456 in FIG. 45, are defined in the same manner as the eighth and ninth embodiments.

In the ninth embodiment, the optimum signal point selection circuit 455 in FIG. 45 is controlled as follows.

| Precoder Tap | Original | | |
|---|---|---|---|
| Output | [1] | [2] | [3] |
| (a) | ORIGINAL | ORIGINAL | OPTIMUM |
| (b) | ORIGINAL | OPTIMUM | OPTIMUM |
| (c) | OPTIMUM | OPTIMUM | OPTIMUM |

In the above table, "[1]" indicates the case wherein the original signal point is located in the portion [1] in FIG. 66, "[2]" indicates the case wherein the original signal point is located in the portion [2] in FIG. 66, and "[3]" indicates the case wherein the original signal point is located in the portion [3] in FIG. 66.

COMPARISON OF SIMULATION RESULTS (FIG. 67)

FIG. 67 is a diagram illustrating the comparison of simulation results of the eighth, ninth, and tenth embodiments. As indicated in FIG. 67, the simulation result indicates that the tenth embodiment is superior to the other embodiments.

EXAMPLES OF SIGNAL POINT CONFIGURATION (FIGS. 68 to 77)

FIGS. 68 to 71 are diagrams illustrating a first example configuration of the signal points in the first to fourth quadrants, respectively. In FIGS. 68 to 71, various small circles such as black, blank, and the like, are used for indicating the distribution of the respective subsets. This example is provided for the modem transmission with 28.8 Kbps. In FIGS. 68 to 71, the 1024 original signal points are located in the square g, and the two circles located on the outer side determine the inner and outer portions C and D of the peripheral area, where the additional signal points for the dynamic precoder are defined in these portions C and D. The two circles j and k correspond to the two circles with the same references in FIG. 66, and reference numeral 11 denotes the boundary circle of the precoder tap output. As a total, 4096 signal points are defined in FIGS. 68 to 71.

FIGS. 72 to 75 are diagrams illustrating a second example configuration of the signal points in the first to fourth quadrants, respectively. This example is provided for the transmission of the secondary channel in the modem with 28.8 Kbps. In FIGS. 72 to 75, the 512 original signal points are located in the smallest circle, and the two circles located on the outer side determine the inner and outer portions of the peripheral area, where the additional signal points for the dynamic precoder are defined in the inner and outer portions of the peripheral area.

Figure 76:
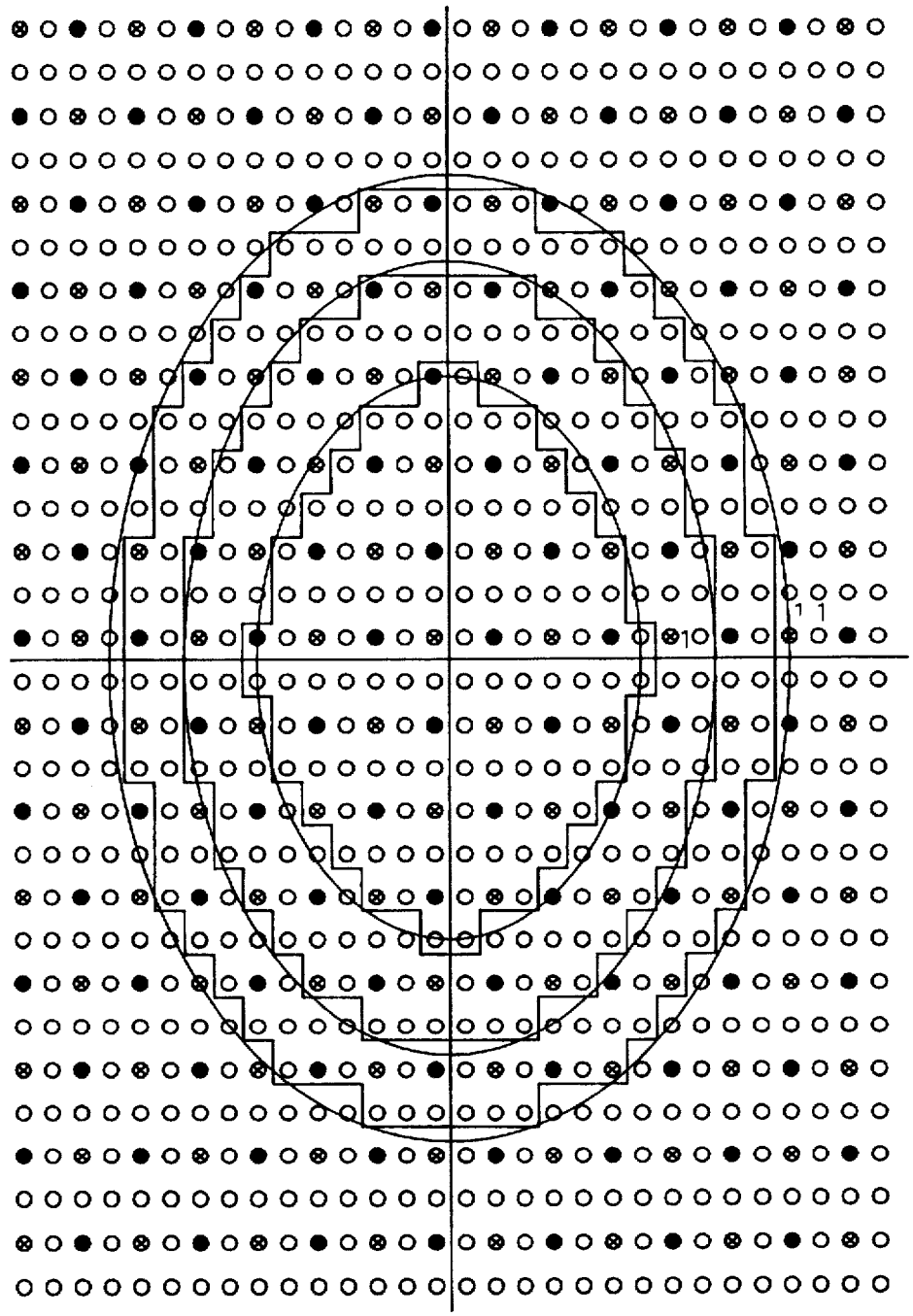
FIG. 76 is diagram illustrating a third example configuration of the signal points. This example is provided for the modem transmission with 19.2 Kbps.

FIG. 76 is diagram illustrating a third example configuration of the signal points. This example is provided for the modem transmission with 19.2 Kbps. In FIG. 76, the 128 original signal points are located in the smallest circle, and the two circles located on the outer side determine the inner and outer portions of the peripheral area, where the additional signal points for the dynamic precoder are defined in the inner and outer portions of the peripheral area.

Figure 77:
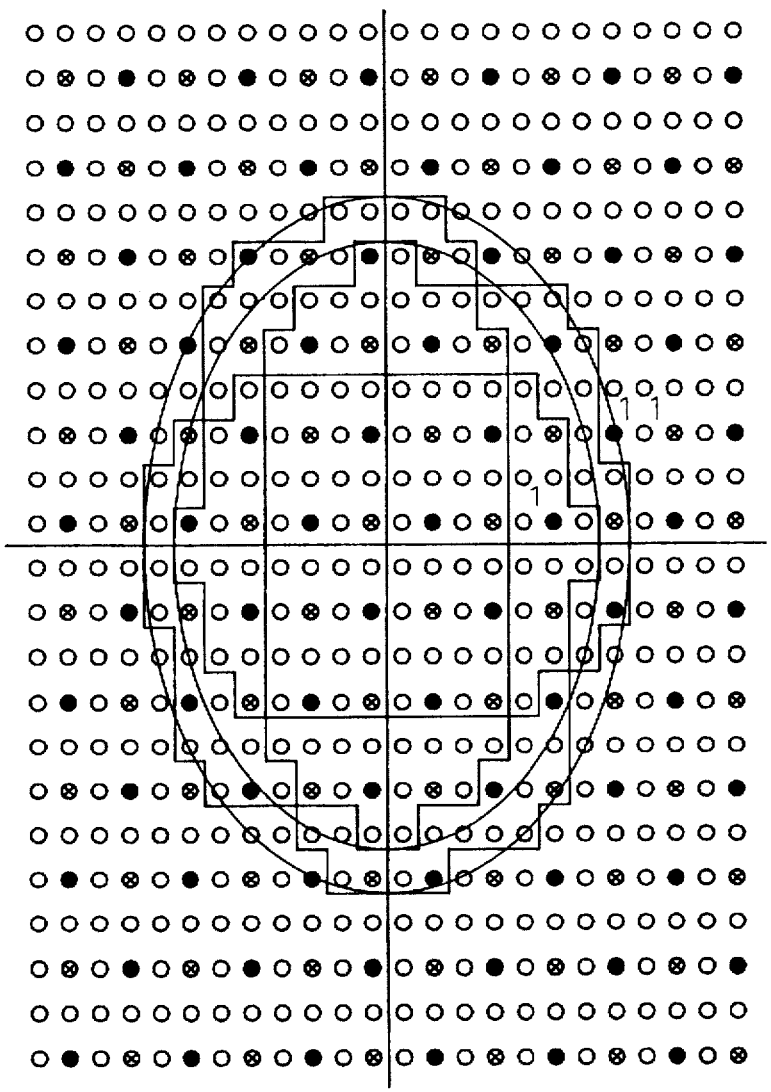
FIG. 77 is diagram illustrating a third example configuration of the signal points. This example is provided for the modem transmission with 14.4 Kbps.

FIG. 77 is diagram illustrating a third example configuration of the signal points. This example is provided for the modem transmission with 14.4 Kbps. In FIG. 77, the 128 original signal points are located in the square located in the center, and the two circles located on the outer side determine the inner and outer portions of the peripheral area, where the additional signal points for the dynamic precoder are defined in the inner and outer portions of the peripheral area.

APPLICATION TO MODEM (FIGS. 78 to 81)

Figure 79:
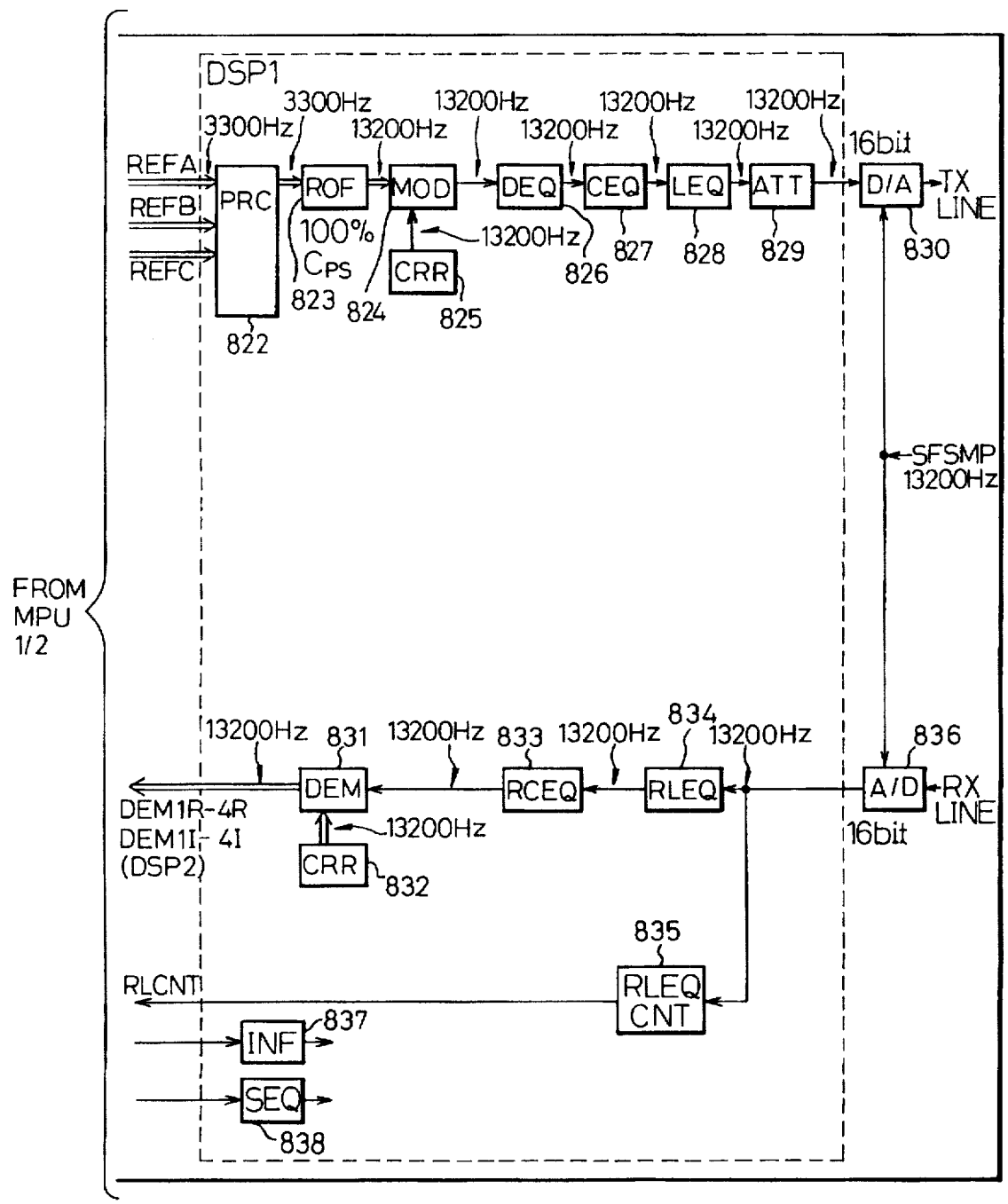
Figure 80:
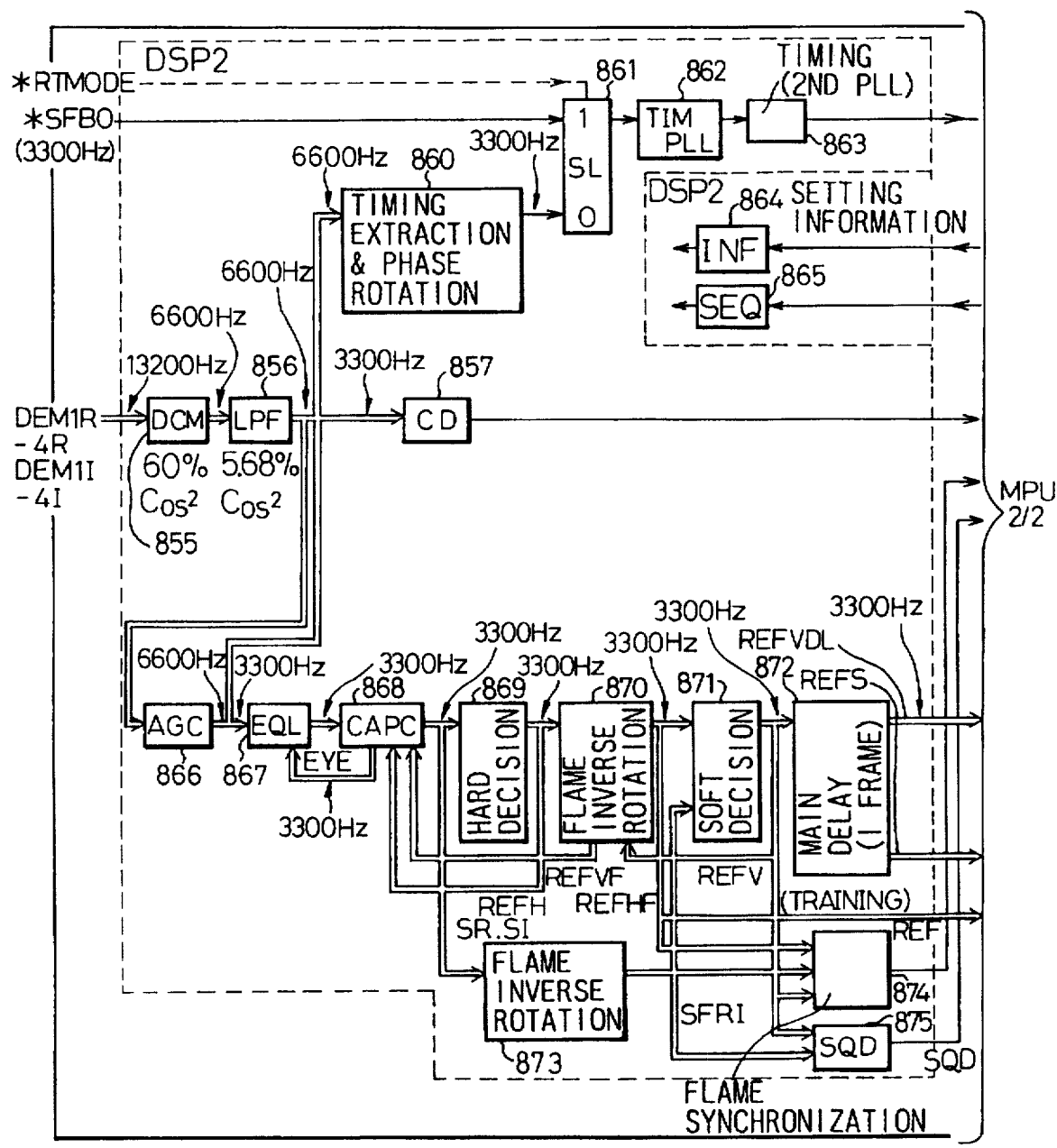
Figure 81:
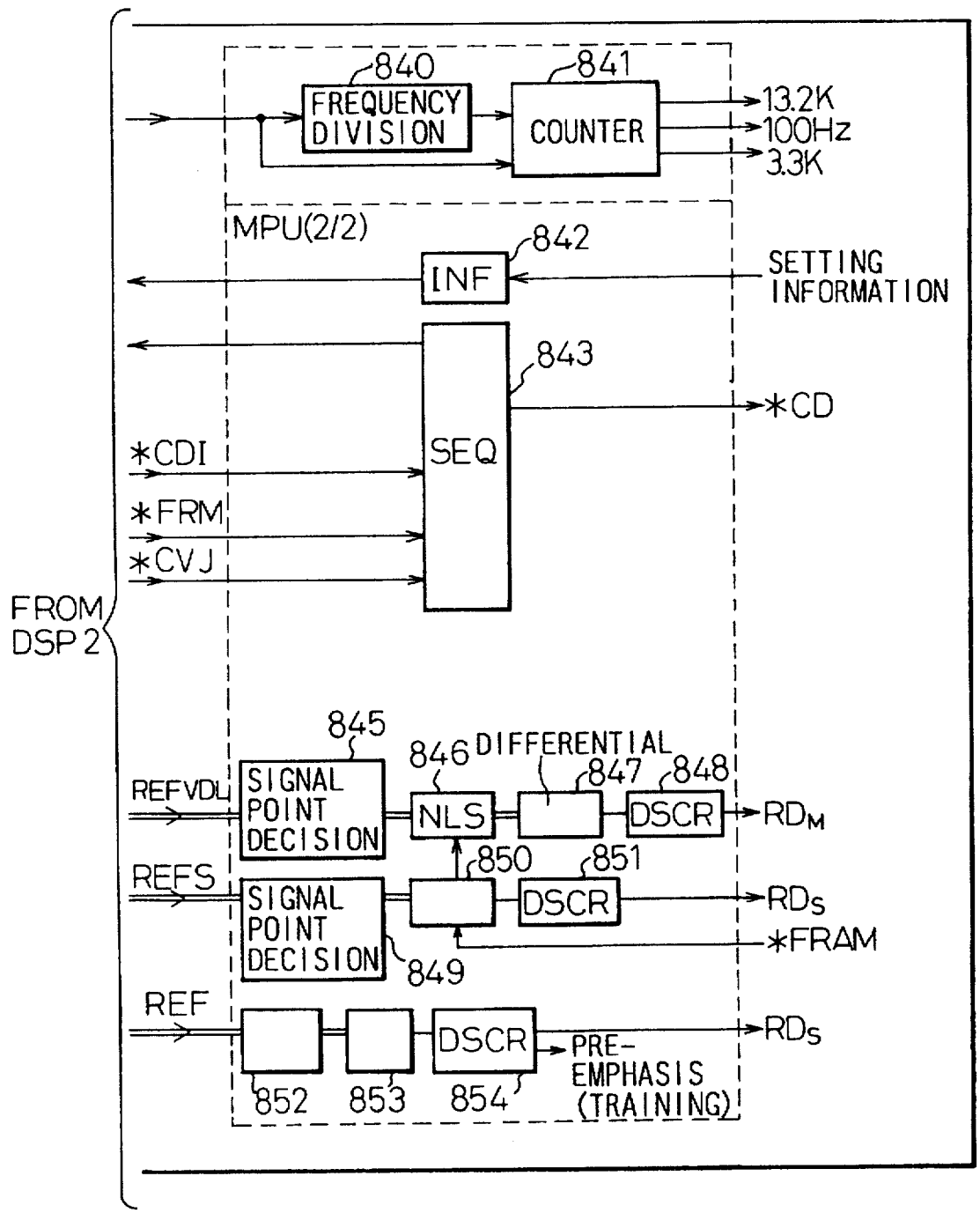

FIGS. 78 to 81 are diagrams illustrating the concrete construction of a modem to which the various aspects of the present invention are applied. The construction on the transmitter side is indicated in FIGS. 78 and 79, and the construction on the receiver side is indicated in FIGS. 80 and 81. The construction indicated in FIG. 78 is mainly realized by a microprocessor unit (MPU), and the construction indicated in FIG. 79 is mainly realized by a digital signal processor (DSP1). The construction indicated in FIG. 80 is mainly realized by the above microprocessor unit (MPU), and the construction indicated in FIG. 81 is mainly realized by another digital signal processor (DSP2).

Referring to FIG. 78, the serial data $SD_M$ in the main channel is converted to a parallel form in the serial-to-parallel converter 801, and the parallel data is scrambled by the scrambler 802. The scrambled data is Trellis-coded by the cumulative encoder 803 and the Trellis encoder 804, and a signal point is generated by the signal point mapping table 805.

Next, the element 807 denotes the construction (the relocation unit) for relocating the signal points as indicated in FIG. 54, the element 806 is a delay circuit corresponding to the delay circuit 541 in FIG. 54, and the element 808 corresponds to the selection circuit 544 in FIG. 54.

Then, in the frame rotation circuit 809, the phase of the signal is cyclically changed between 0° and 90° for transmitting information for frame synchronization. In the element 810, the additional points B and C are generated corresponding to the original signal point A, and the three signal points are supplied to the precoder 822 indicated in FIG. 79. The precoded signal is filtered by the roll-off filter 823, and the filtered signal is supplied to the QAM modulator 824. The QAM modulator 824 modulates the filtered signal with the carrier, which is supplied from the carrier oscillator 825. The modulated signal is transmitted through the delay equalizer 826, the compromise equalizer 827, the line equalizer 828, the attenuator 829, and the digital to analog converter 830, onto the analog transmission line.

The signal point of the secondary signal is also generated by the similar construction comprised of the scrambler 811, the cumulative encoder 812, the Trellis encoder 813, and the signal point mapping table 814. The relocation information generated in the relocation unit 807 is supplied to the cumulative encoder 812, and the signal point signal generated by the signal point mapping table 814 is inserted into the main signal in the manner of time division multiplex, as indicated in FIG. 55.

Referring to FIG. 80, the received signal is filtered through the decimation filter 855, and the low-pass filter 856, and the amplitude is controlled by the automatic gain control circuit 866. Then, the signal is equalized by the equalizer 867, and the phase change less than 90° is absorbed by the carrier automatic phase control circuit 868.

Next, the signal point represented by the signal is determined by the hard decision unit 869, and the determined signal is supplied to the frame inverse rotation circuit 870, at which the inverse operation of that is performed in the frame rotation circuit 809 is performed. Then, the signal is supplied to the soft decision circuit 871 to determine the signal points by soft decision.

Further, the signal point signal obtained by the soft decision is supplied to the main delay 872, in which thew signal is demultiplexed into the main signal and the secondary signal. The main signal and the secondary signal are supplied to other decision circuits 845 and 849, respectively. The decision circuits 845 and 849 are provided corresponding to the dynamic precoding on the transmitter side. The output of the decision circuit 849 is supplied to the differential decoder 850 to obtain the relocation information, and the output of the decision circuit 845 and the relocation information is supplied to the relocation-back circuit corresponding to the element 433 in FIG. 56. Then, the output of the relocation-back circuit 847 is supplied to the differential decoder 847 which is provided corresponding to the cumulative encoder 803 in FIG. 78, and output of the differential decoder 847 is descrambled in the descrambler 848 to obtain the received data RDs.

Since the other constructions indicated in FIGS. 78 to 81 are well known in the field of modems, and are not related to the present invention, no explanation is provided in this specification.

Figure 82:
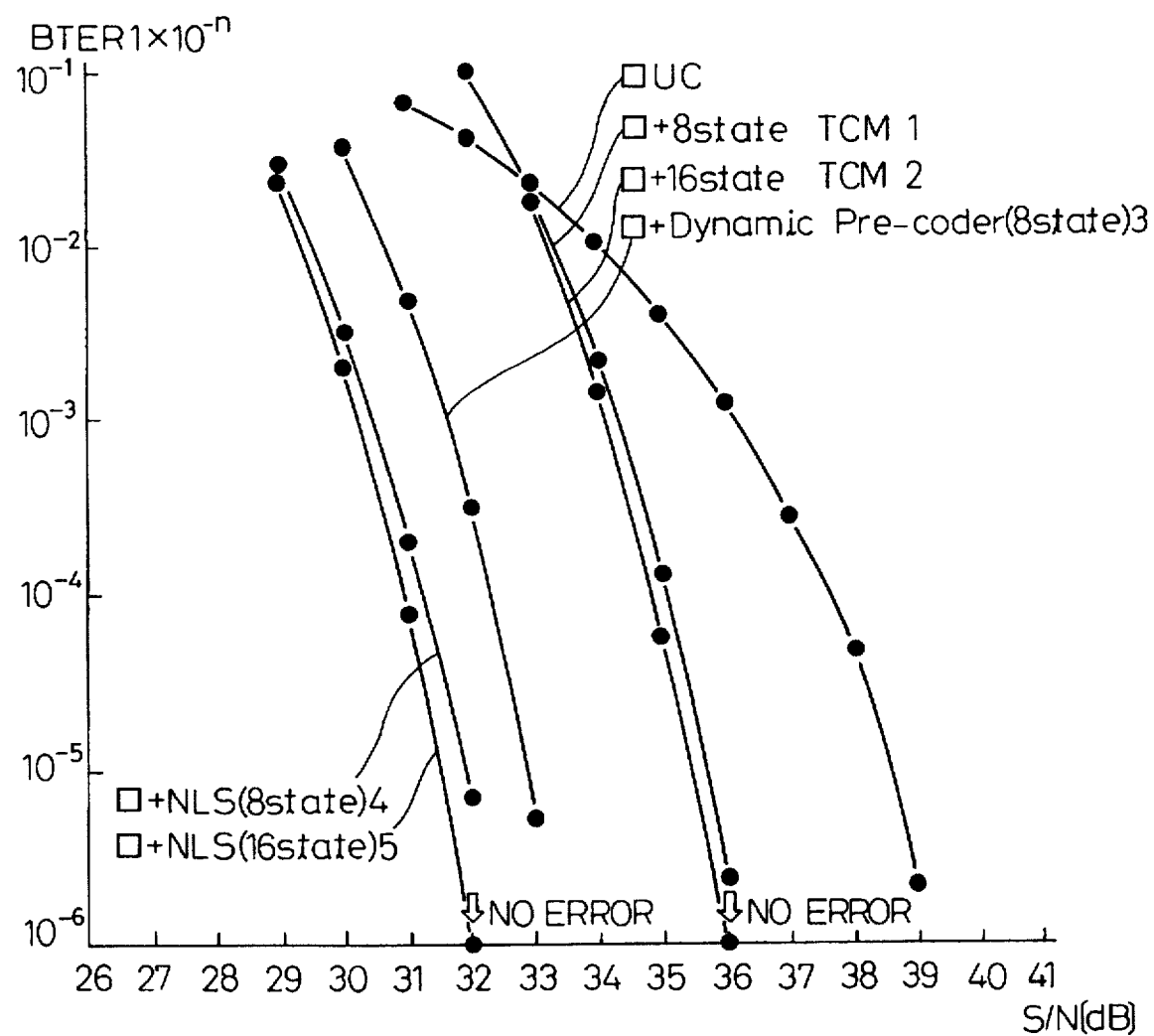
FIG. 82 is a diagram illustrating the SNR characteristic with regard to the bit error rate (BTER) for various embodiments of the present invention.
Figure 83:
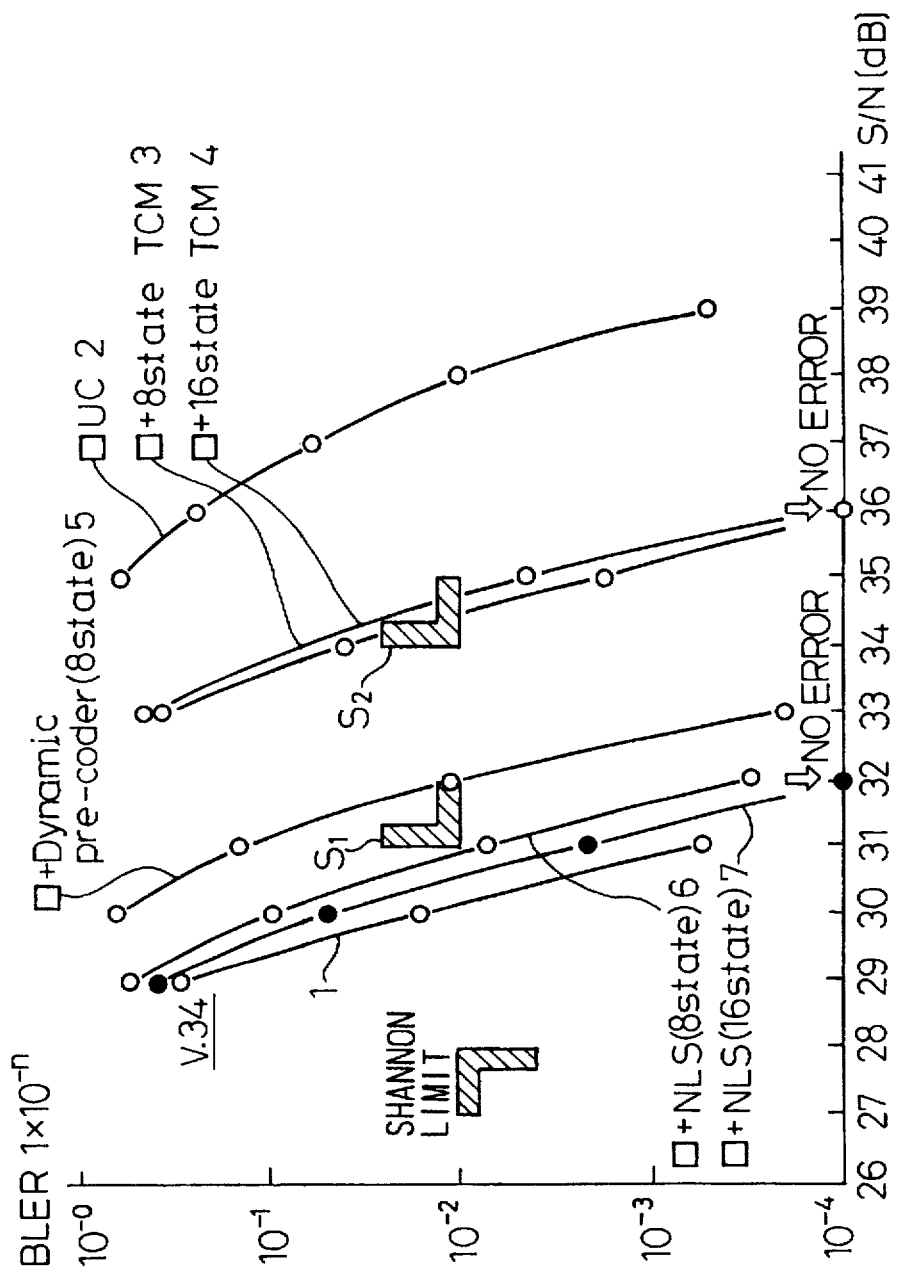
FIG. 83 is a diagram illustrating the SNR characteristic with regard to the block error rate (BLER) for various embodiments of the present invention.

SNR CHARACTERISTIC (FIGS. 82 and 83)

FIG. 82 is a diagram illustrating the SNR characteristic with regard to the bit error rate (BTER) for various embodiments of the present invention. In FIG. 82, reference UC denotes an uncoded transmission, 1 denotes the first embodiment using the 8-state Trellis encoding, 2 denotes the first embodiment using the 16-state Trellis encoding, 3 denotes the fifth embodiment using the dynamic precoder with the 8-state Trellis encoding, 4 denotes the sixth embodiment with the 8-state Trellis encoding, and 5 denotes the sixth embodiment with the 16-state Trellis encoding. As indicated in FIG. 82, the sixth embodiment with the 16-state Trellis encoding indicates the best SNR characteristic.

COMPARISON WITH V.34 (FIGS. 84 AND 85)

FIGS. 84 and 85 are diagrams illustrating the comparison results for various characteristics. As indicated in FIG. 84, the frequency band width achieved by the best mode combination of the embodiments of the present invention is narrower than that of V.34. Regarding the Trellis encoding, since V.34 uses the four-dimensional Trellis encoding, the amount of processing and the absolute delay time is greater than the two-dimensional 16-state Trellis encoding used in the best mode combination of the embodiments of the present invention. Regarding the SNR characteristic, V.34 is a little better than the best mode combination of the embodiments of the present invention. However, the best mode combination of the embodiments of the present invention satisfies the requirement of V.34. Regarding the inter-symbol interference, white noise, and timing jitter, the best mode combination of the embodiments of the present invention is more advantageous than V.34, due to the narrow frequency band width. As a total, the best mode combination of the embodiments of the present invention is competitive with V.34.

APPLICATION TO DATA RECORDING APPARATUS (FIG. 86)

Figure 86:
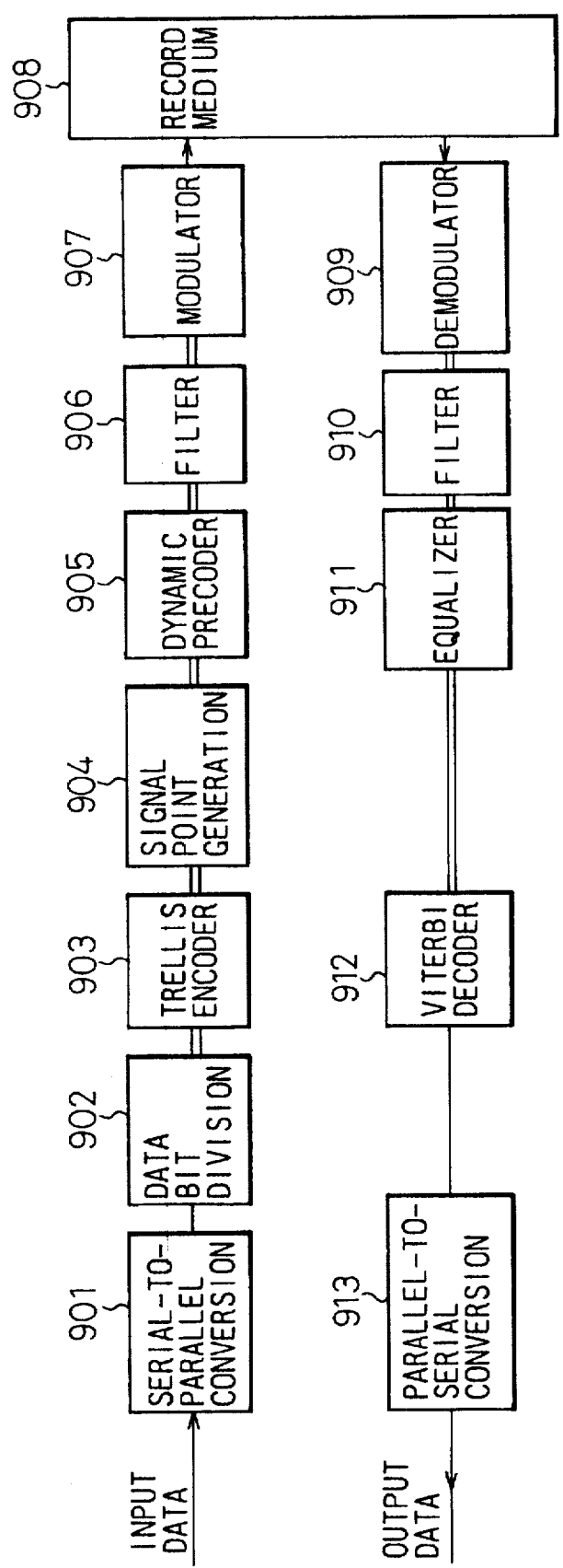
FIG. 86 is a diagram illustrating an example construction for data writing in and data reading from record medium.

FIG. 86 is a diagram illustrating an example construction for data writing in and data reading from record medium. In FIG. 86, reference numeral 901 denotes a serial-to-parallel conversion circuit, 902 denoted a data bit division circuit, 903 denotes a Trellis encoder, 904 denotes a signal point generation circuit, 905 denotes a dynamic precoder, 906 denotes a filter, 907 denotes a modulator, 908 denotes a record medium, 909 denotes a demodulator, 910 denotes a filter, 911 denotes an equalizer, 912 denotes a Viterbi decoder, and 913 denotes a parallel-to-serial conversion circuit.

In the construction of FIG. 86, the operations of the respective elements are the same as those explained in the various embodiments of the present invention.

In the data writing and reading mechanism in a digital data recording apparatus, the data writing in a recording medium my be performed by either of a modulated signal or a baseband signal. When writing data by the baseband signal, the writing of the two vector components representing the signal points are carried out in parallel. Since the data writing and reading mechanism per se is well known, that is not explained in detail in this specification. The only necessary matter to apply the present invention to the data writing and reading mechanism is to provide the construction of the present invention on the input and output sides of the data writing mechanism. In addition, when the baseband signal is used for data writing, the data writing and reading mechanism must be modified to realize a construction for recording and regenerating baseband signals in parallel.

TABLE 1

Comparison of Basic Transmission Methods

| Method | Transmission Rate Bauds | Bit/Symbol | | Number of Signal Points | | SNR BLER $1 \times 10^{-2}$ | | Band Width 3 dB down | | Evaluation |
|---|---|---|---|---|---|---|---|---|---|---|
| Nyquist | 2400 | x | 12 | x | 4096 | x | 44.5 dB | ○ | 2400 Hz | x |
| Transmission | 2618 | x | 11 | Δ | 2048 | x | 41.9 dB | ○ | 2618 Hz | x |
| | 2880 | x | 10 | ○ | 1024 | Δ | 39.3 dB | ○ | 2880 Hz | Δ |
| | 3200 | ○ | 9 | ⊚ | 512 | ○ | 36.8 dB | Δ | 3200 Hz | Δ |
| Non-Nyquist | 2400 | x | 12 | x | 16384 | x | 46.0 dB | ⊚ | 1200 Hz | Δ |
| Transmission | 2618 | x | 11 | x | 8192 | x | 43.4 dB | ⊚ | 1309 Hz | Δ |
| | 2880 | x | 10 | x | 4096 | x | 40.8 dB | ⊚ | 1440 Hz | Δ |
| | 3200 | ○ | 9 | Δ | 2048 | Δ | 38.3 dB | ⊚ | 1600 Hz | ○ |

TABLE 2-1

Inputs and Outputs of Cumulative Encoder and Differential Decoder When Phase Rotation During Signal Transmission Is 0°

| Cumulative Encoder | | | | | | Differential Decoder | | | | | |
|---|---|---|---|---|---|---|---|---|---|---|---|
| Inputs $Q1_n\ Q2_n$ (Phase) | | Previous Outputs $Y1_{n-1}, Y2_{n-1}$ (Phase) | | Outputs $Y1_n\ Y2_n$ (Phase) | | Inputs $Y1_n\ Y2_n$ (Phase) | | Previous Outputs $Y1_{n-1}, Y2_{n-1}$ (Phase) | | Outputs $Q1_n\ Q2_n$ (Phase) | |
| 00 | (0°) | 00 | (0°) | 00 | (0°) | 00 | (0°) | 00 | (0°) | 00 | (0°) |
| | | 01 | (180°) | 01 | (180°) | 01 | (180°) | 01 | (180°) | 00 | (0°) |
| | | 10 | (270°) | 10 | (270°) | 10 | (270°) | 10 | (270°) | 00 | (0°) |
| | | 11 | (90°) | 11 | (90°) | 11 | (90°) | 11 | (90°) | 00 | (0°) |
| 01 | (180°) | 00 | (0°) | 01 | (180°) | 01 | (180°) | 00 | (0°) | 01 | (180°) |
| | | 01 | (180°) | 00 | (0°) | 00 | (0°) | 01 | (180°) | 01 | (180°) |
| | | 10 | (270°) | 11 | (90°) | 11 | (90°) | 10 | (270°) | 01 | (180°) |
| | | 11 | (90°) | 10 | (270°) | 10 | (270°) | 11 | (90°) | 01 | (180°) |
| 10 | (270°) | 00 | (0°) | 10 | (270°) | 10 | (270°) | 00 | (0°) | 10 | (270°) |
| | | 01 | (180°) | 11 | (90°) | 11 | (90°) | 01 | (180°) | 10 | (270°) |
| | | 10 | (270°) | 01 | (180°) | 01 | (180°) | 10 | (270°) | 10 | (270°) |
| | | 11 | (90°) | 00 | (0°) | 00 | (0°) | 11 | (90°) | 10 | (270°) |
| 11 | (90°) | 00 | (0°) | 11 | (90°) | 11 | (90°) | 00 | (0°) | 11 | (90°) |
| | | 01 | (180°) | 10 | (270°) | 10 | (270°) | 01 | (180°) | 11 | (90°) |
| | | 10 | (270°) | 00 | (0°) | 00 | (0°) | 10 | (270°) | 11 | (90°) |
| | | 11 | (90°) | 01 | (180°) | 01 | (180°) | 11 | (90°) | 11 | (90°) |

TABLE 2-2

Inputs and Outputs of Cumulative Encoder and Differential Decoder When Phase Rotation During Signal Transmission Is 90°

| Cumulative Encoder | | | | | | Differential Decoder | | | | | |
|---|---|---|---|---|---|---|---|---|---|---|---|
| Inputs $Q1_n\ Q2_n$ (Phase) | | Previous Outputs $Y1_{n-1}, Y2_{n-1}$ (Phase) | | Outputs $Y1_n\ Y2_n$ (Phase) | | Inputs $Y1_n\ Y2_n$ (Phase) | | Previous Outputs $Y1_{n-1}, Y2_{n-1}$ (Phase) | | Outputs $Q1_n\ Q2_n$ (Phase) | |
| 00 | (0°) | 00 | (0°) | 00 | (0°) | 11 | (90°) | 11 | (90°) | 00 | (0°) |
| | | 01 | (180°) | 01 | (180°) | 10 | (270°) | 10 | (270°) | 00 | (0°) |
| | | 10 | (270°) | 10 | (270°) | 00 | (0°) | 00 | (0°) | 00 | (0°) |
| | | 11 | (90°) | 11 | (90°) | 01 | (180°) | 01 | (180°) | 00 | (0°) |
| 01 | (180°) | 00 | (0°) | 01 | (180°) | 10 | (270°) | 11 | (90°) | 01 | (180°) |
| | | 01 | (180°) | 00 | (0°) | 11 | (90°) | 10 | (270°) | 01 | (180°) |
| | | 10 | (270°) | 11 | (90°) | 01 | (180°) | 00 | (0°) | 01 | (180°) |
| | | 11 | (90°) | 10 | (270°) | 00 | (0°) | 01 | (180°) | 01 | (180°) |
| 10 | (270°) | 00 | (0°) | 10 | (270°) | 00 | (0°) | 11 | (90°) | 10 | (270°) |
| | | 01 | (180°) | 11 | (90°) | 01 | (180°) | 10 | (270°) | 10 | (270°) |
| | | 10 | (270°) | 01 | (180°) | 10 | (270°) | 00 | (0°) | 10 | (270°) |
| | | 11 | (90°) | 00 | (0°) | 11 | (90°) | 01 | (180°) | 10 | (270°) |

TABLE 2-2-continued

Inputs and Outputs of Cumulative Encoder and Differential Decoder
When Phase Rotation During Signal Transmission Is 90°

| Cumulative Encoder | | | | | | Differential Decoder | | | | | |
|---|---|---|---|---|---|---|---|---|---|---|---|
| Inputs $Q1_n\ Q2_n$ (Phase) | | Previous Outputs $Y1_{n-1}, Y2_{n-1}$ (Phase) | | Outputs $Y1_n\ Y2_n$ (Phase) | | Inputs $Y1_n\ Y2_n$ (Phase) | | Previous Outputs $Y1_{n-1}, Y2_{n-1}$ (Phase) | | Outputs $Q1_n\ Q2_n$ (Phase) | |
| 11 | (90°) | 00 | (0°) | 11 | (90°) | 01 | (180°) | 11 | (90°) | 11 | (90°) |
|  |  | 01 | (180°) | 10 | (270°) | 00 | (0°) | 10 | (270°) | 11 | (90°) |
|  |  | 10 | (270°) | 00 | (0°) | 11 | (90°) | 00 | (0°) | 11 | (90°) |
|  |  | 11 | (90°) | 01 | (180°) | 10 | (270°) | 01 | (180°) | 11 | (90°) |

TABLE 2-3

Inputs and Outputs of Cumulative Encoder and Differential Decoder
When Phase Rotation During Signal Transmission Is 180°

| Cumulative Encoder | | | | | | Differential Decoder | | | | | |
|---|---|---|---|---|---|---|---|---|---|---|---|
| Inputs $Q1_n\ Q2_n$ (Phase) | | Previous Outputs $Y1_{n-1}, Y2_{n-1}$ (Phase) | | Outputs $Y1_n\ Y2_n$ (Phase) | | Inputs $Y1_n\ Y2_n$ (Phase) | | Previous Outputs $Y1_{n-1}, Y2_{n-1}$ (Phase) | | Outputs $Q1_n\ Q2_n$ (Phase) | |
| 00 | (0°) | 00 | (0°) | 00 | (0°) | 01 | (180°) | 01 | (180°) | 00 | (0°) |
|  |  | 01 | (180°) | 01 | (180°) | 00 | (0°) | 00 | (0°) | 00 | (0°) |
|  |  | 10 | (270°) | 10 | (270°) | 11 | (90°) | 11 | (90°) | 00 | (0°) |
|  |  | 11 | (90°) | 11 | (90°) | 10 | (270°) | 10 | (270°) | 00 | (0°) |
| 01 | (180°) | 00 | (0°) | 01 | (180°) | 00 | (0°) | 01 | (180°) | 01 | (180°) |
|  |  | 01 | (180°) | 00 | (0°) | 01 | (180°) | 00 | (0°) | 01 | (180°) |
|  |  | 10 | (270°) | 11 | (90°) | 10 | (270°) | 11 | (90°) | 01 | (180°) |
|  |  | 11 | (90°) | 10 | (270°) | 11 | (90°) | 10 | (270°) | 01 | (180°) |
| 10 | (270°) | 00 | (0°) | 10 | (270°) | 11 | (90°) | 01 | (180°) | 10 | (270°) |
|  |  | 01 | (180°) | 11 | (90°) | 10 | (270°) | 00 | (0°) | 10 | (270°) |
|  |  | 10 | (270°) | 01 | (180°) | 00 | (0°) | 11 | (90°) | 10 | (270°) |
|  |  | 11 | (90°) | 00 | (0°) | 01 | (180°) | 10 | (270°) | 10 | (270°) |
| 11 | (90°) | 00 | (0°) | 11 | (90°) | 10 | (270°) | 01 | (180°) | 11 | (90°) |
|  |  | 01 | (180°) | 10 | (270°) | 11 | (90°) | 00 | (0°) | 11 | (90°) |
|  |  | 10 | (270°) | 00 | (0°) | 01 | (180°) | 11 | (90°) | 11 | (90°) |
|  |  | 11 | (90°) | 01 | (180°) | 00 | (0°) | 10 | (270°) | 11 | (90°) |

TABLE 2-4

Inputs and Outputs of Cumulative Encoder and Differential Decoder
When Phase Rotation During Signal Transmission Is 270°

| Cumulative Encoder | | | | | | Differential Decoder | | | | | |
|---|---|---|---|---|---|---|---|---|---|---|---|
| Inputs $Q1_n\ Q2_n$ (Phase) | | Previous Outputs $Y1_{n-1}, Y2_{n-1}$ (Phase) | | Outputs $Y1_n\ Y2_n$ (Phase) | | Inputs $Y1_n\ Y2_n$ (Phase) | | Previous Outputs $Y1_{n-1}, Y2_{n-1}$ (Phase) | | Outputs $Q1_n\ Q2_n$ (Phase) | |
| 00 | (0°) | 00 | (0°) | 00 | (0°) | 10 | (270°) | 10 | (270°) | 00 | (0°) |
|  |  | 01 | (180°) | 01 | (180°) | 11 | (90°) | 11 | (90°) | 00 | (0°) |
|  |  | 10 | (270°) | 10 | (270°) | 01 | (180°) | 01 | (180°) | 00 | (0°) |
|  |  | 11 | (90°) | 11 | (90°) | 00 | (0°) | 00 | (0°) | 00 | (0°) |
| 01 | (180°) | 00 | (0°) | 01 | (180°) | 11 | (90°) | 10 | (270°) | 01 | (180°) |
|  |  | 01 | (180°) | 00 | (0°) | 10 | (270°) | 11 | (90°) | 01 | (180°) |
|  |  | 10 | (270°) | 11 | (90°) | 00 | (0°) | 01 | (180°) | 01 | (180°) |
|  |  | 11 | (90°) | 10 | (270°) | 01 | (180°) | 00 | (0°) | 01 | (180°) |
| 10 | (270°) | 00 | (0°) | 10 | (270°) | 01 | (180°) | 10 | (270°) | 10 | (270°) |
|  |  | 01 | (180°) | 11 | (90°) | 00 | (0°) | 11 | (90°) | 10 | (270°) |
|  |  | 10 | (270°) | 11 | (90°) | 00 | (0°) | 11 | (90°) | 10 | (270°) |
|  |  | 11 | (90°) | 00 | (0°) | 10 | (270°) | 00 | (0°) | 10 | (270°) |
| 11 | (90°) | 00 | (0°) | 11 | (90°) | 00 | (0°) | 10 | (270°) | 11 | (90°) |

TABLE 2-4-continued

Inputs and Outputs of Cumulative Encoder and Differential Decoder
When Phase Rotation During Signal Transmission Is 270°

| Cumulative Encoder | | | | Differential Decoder | | | |
|---|---|---|---|---|---|---|---|
| Inputs $Q1_n, Q2_n$ (Phase) | Previous Outputs $Y1_{n-1}, Y2_{n-1}$ (Phase) | | Outputs $Y1_n, Y2_n$ (Phase) | | Inputs $Y1_n, Y2_n$ (Phase) | Previous Outputs $Y1_{n-1}, Y2_{n-1}$ (Phase) | Outputs $Q1_n, Q2_n$ (Phase) |
| 01 | (180°) | 10 | (270°) | 01 | (180°) | 11 | (90°) | 11 | (90°) |
| 10 | (270°) | 00 | (0°) | 10 | (270°) | 01 | (180°) | 11 | (90°) |
| 11 | (90°) | 01 | (180°) | 11 | (90°) | 00 | (0°) | 11 | (90°) |

TABLE 3

Definition of Subsets and Phases

| Phase | Subset | $Y0_n$ | $Y1_n$ | $Y2_n$ | Subset | $Y0_n$ | $Y1_n$ | $Y2_n$ |
|---|---|---|---|---|---|---|---|---|
| 0° | A | 0 | 1 | 0 | E | 0 | 0 | 0 |
| 90° | B | 1 | 0 | 0 | F | 1 | 1 | 1 |
| 180° | C | 0 | 1 | 1 | G | 0 | 0 | 1 |
| 270° | D | 1 | 0 | 1 | H | 1 | 1 | 0 |

TABLE 4

State Transition Due to Phase Change

| Phase Change 0° → 0° | Phase Change 0° → 90° | Phase Change 0° → 180° | Phase Change 0° → 270° |
|---|---|---|---|
| 0 → 0 | 0 → E | 0 → 9 | 0 → 7 |
| 4 → 4 | 4 → 2 | 4 → D | 4 → B |
| 8 → 8 | 8 → 6 | 8 → 1 | 8 → F |
| C → C | C → A | C → 5 | C → 3 |
| 1 → 1 | 1 → F | 1 → 8 | 1 → 6 |
| 5 → 5 | 5 → 3 | 5 → C | 5 → A |
| 9 → 9 | 9 → 7 | 9 → 0 | 9 → E |
| D → D | D → B | D → 4 | D → 2 |
| 2 → 2 | 2 → D | 2 → B | 2 → 4 |
| 6 → 6 | 6 → 1 | 6 → F | 6 → 8 |
| A → A | A → 5 | A → 3 | A → C |
| E → E | E → 9 | E → 7 | E → 0 |
| 3 → 3 | 3 → C | 3 → A | 3 → 5 |
| 7 → 7 | 7 → 0 | 7 → E | 7 → 9 |
| B → B | B → 4 | B → 2 | B → D |
| F → F | F → 8 | F → 6 | F → 1 |

TABLE 5-1

Inputs and Outputs of $ROM_{214}$

| Inputs | | Outputs | |
|---|---|---|---|
| $W_{3n,2n,1n,0n}$ | Subset | $Y0_n, Y1_{n,2n}$ | $W_{3n+1,2n+1, 1n+1,0n+1}$ |
| 0 0 0 0 | E | 0 0 0 | 0 0 0 0 |
| 0 0 0 0 | C | 0 1 1 | 0 1 0 0 |
| 0 0 0 0 | A | 0 1 0 | 1 0 0 0 |
| 0 0 0 0 | G | 0 0 1 | 1 1 0 0 |
| 0 0 0 1 | A | 0 1 0 | 0 0 0 0 |
| 0 0 0 1 | G | 0 0 1 | 0 1 0 0 |
| 0 0 0 1 | E | 0 0 0 | 1 0 0 0 |
| 0 0 0 1 | C | 0 1 1 | 1 1 0 0 |
| 0 0 1 0 | E | 0 0 0 | 0 0 0 1 |
| 0 0 1 0 | G | 0 0 1 | 0 1 0 1 |
| 0 0 1 0 | A | 0 1 0 | 1 0 0 1 |
| 0 0 1 0 | C | 0 1 1 | 1 1 0 1 |
| 0 0 1 1 | A | 0 1 0 | 0 0 0 1 |
| 0 0 1 1 | C | 0 1 1 | 0 1 0 1 |
| 0 0 1 1 | E | 0 0 0 | 1 0 0 1 |

TABLE 5-1-continued

Inputs and Outputs of $ROM_{214}$

| Inputs | | Outputs | |
|---|---|---|---|
| $W_{3n,2n,1n,0n}$ | Subset | $Y0_n, Y1_{n,2n}$ | $W_{3n+1,2n+1, 1n+1,0n+1}$ |
| 0 0 1 1 | G | 0 0 1 | 1 1 0 1 |
| 0 1 0 0 | B | 1 0 0 | 0 0 1 0 |
| 0 1 0 0 | H | 1 1 0 | 0 1 1 0 |
| 0 1 0 0 | F | 1 1 1 | 1 0 1 0 |
| 0 1 0 0 | D | 1 0 1 | 1 1 1 0 |
| 0 1 0 1 | F | 1 1 1 | 0 0 1 0 |
| 0 1 0 1 | D | 1 0 1 | 0 1 1 0 |
| 0 1 0 1 | B | 1 0 0 | 1 0 1 0 |
| 0 1 0 1 | H | 1 1 0 | 1 1 1 0 |
| 0 1 1 0 | B | 1 0 0 | 0 0 1 1 |
| 0 1 1 0 | D | 1 0 1 | 0 1 1 1 |
| 0 1 1 0 | F | 1 1 1 | 1 0 1 1 |
| 0 1 1 0 | H | 1 1 0 | 1 1 1 1 |
| 0 1 1 1 | F | 1 1 1 | 0 0 1 1 |
| 0 1 1 1 | H | 1 1 0 | 0 1 1 1 |
| 0 1 1 1 | B | 1 0 0 | 1 0 1 1 |
| 0 1 1 1 | D | 1 0 1 | 1 1 1 1 |

TABLE 5-2

Inputs and Outputs of $ROM_{214}$

| Inputs | | Outputs | |
|---|---|---|---|
| $W_{3n,2n,1n,0n}$ | Subset | $Y0_n, Y1_{n,2n}$ | $W_{3n+1,2n+1, 1n+1,0n+1}$ |
| 1 0 0 0 | G | 0 0 1 | 0 0 0 1 |
| 1 0 0 0 | A | 0 1 0 | 0 1 0 1 |
| 1 0 0 0 | C | 0 1 1 | 1 0 0 1 |
| 1 0 0 0 | E | 0 0 0 | 1 1 0 1 |
| 1 0 0 1 | C | 0 1 1 | 0 0 0 1 |
| 1 0 0 1 | E | 0 0 0 | 0 1 0 1 |
| 1 0 0 1 | G | 0 0 1 | 1 0 0 1 |
| 1 0 0 1 | A | 0 1 0 | 1 1 0 1 |
| 1 0 1 0 | G | 0 0 1 | 0 0 0 0 |
| 1 0 1 0 | E | 0 0 0 | 0 1 0 0 |
| 1 0 1 0 | C | 0 1 1 | 1 0 0 0 |
| 1 0 1 1 | C | 0 1 1 | 0 0 0 0 |
| 1 0 1 1 | A | 0 1 0 | 0 1 0 0 |
| 1 0 1 1 | G | 0 0 1 | 1 0 0 0 |
| 1 0 1 1 | E | 0 0 0 | 1 1 0 0 |
| 1 1 0 0 | D | 1 0 1 | 0 0 1 1 |
| 1 1 0 0 | F | 1 1 1 | 0 1 1 1 |
| 1 1 0 0 | H | 1 1 0 | 1 0 1 1 |
| 1 1 0 0 | B | 1 0 0 | 1 1 1 1 |
| 1 1 0 1 | H | 1 1 0 | 0 0 1 1 |
| 1 1 0 1 | B | 1 0 0 | 0 1 1 1 |
| 1 1 0 1 | D | 1 0 1 | 1 0 1 1 |
| 1 1 0 1 | F | 1 1 1 | 1 1 1 1 |
| 1 1 1 0 | D | 1 0 1 | 0 0 1 0 |
| 1 1 1 0 | B | 1 0 0 | 0 1 1 0 |
| 1 1 1 0 | H | 1 1 0 | 1 0 1 0 |

TABLE 5-2-continued

Inputs and Outputs of ROM$_{214}$

| Inputs | | Outputs | |
|---|---|---|---|
| $W_{3n,2n,1n,0n}$ | Subset | $Y_{0n}, Y_{1n,2n}$ | $W_{3n+1,2n+1, 1n+1,0n+1}$ |
| 1 1 1 0 | F | 1 1 1 | 1 1 1 0 |
| 1 1 1 1 | H | 1 1 0 | 0 0 1 0 |
| 1 1 1 1 | F | 1 1 1 | 0 1 1 0 |
| 1 1 1 1 | D | 1 0 1 | 1 0 1 0 |
| 1 1 1 1 | B | 1 0 0 | 1 1 1 0 |

TABLE 6-1

Inputs and Outputs of Modulo Precoder and Outputs of Partial-Response Filter
Previous Tap Outputs

| −16 | | | −15 | | | −14 | | | −13 | | | −12 | | |
|---|---|---|---|---|---|---|---|---|---|---|---|---|---|---|
| Input | Output | PRF | Input | Output | PRF | Input | Output | PRF | Input | Output | PRF | Input | Output | PRF |
| −7 | +9 | −7 | −7 | +8 | −7 | −7 | +7 | −7 | −7 | +6 | −7 | −7 | +5 | −7 |
| −5 | +11 | −5 | −5 | +10 | −5 | −5 | +9 | −5 | −5 | +8 | −5 | −5 | +7 | −5 |
| −3 | +13 | −3 | −3 | +12 | −3 | −3 | +11 | −3 | −3 | +10 | −3 | −3 | +9 | −3 |
| −1 | +15 | −1 | −1 | +14 | −1 | −1 | +13 | −1 | −1 | +12 | −1 | −1 | +11 | −1 |
| +1 | +1 | −15 | +1 | +16 | +1 | +1 | +15 | +1 | +1 | +14 | +1 | +1 | +13 | +1 |
| +3 | +3 | −13 | +3 | +2 | −13 | +3 | +1 | −13 | +3 | +16 | +3 | +3 | +15 | +3 |
| +5 | +5 | −11 | +5 | +4 | −11 | +5 | +3 | −11 | +5 | +2 | −11 | +5 | +1 | −11 |
| +7 | +7 | −9 | +7 | +6 | −9 | +7 | +5 | −9 | +7 | +4 | −9 | +7 | +3 | −9 |

TABLE 6-2

Inputs and Outputs of Modulo Precoder and Outputs of Partial-Response Filter
Previous Tap Outputs

| −11 | | | −10 | | | −9 | | | −8 | | | −7 | | |
|---|---|---|---|---|---|---|---|---|---|---|---|---|---|---|
| Input | Output | PRF | Input | Output | PRF | Input | Output | PRF | Input | Output | PRF | Input | Output | PRF |
| −7 | +4 | −7 | −7 | +3 | −7 | −7 | +2 | −7 | −7 | +1 | −7 | −7 | +0 | −7 |
| −5 | +6 | −5 | −5 | +5 | −5 | −5 | +4 | −5 | −5 | +3 | −5 | −5 | +2 | −5 |
| −3 | +8 | −3 | −3 | +7 | −3 | −3 | +6 | −3 | −3 | +5 | −3 | −3 | +4 | −3 |
| −1 | +10 | −1 | −1 | +9 | −1 | −1 | +8 | −1 | −1 | +7 | −1 | −1 | +6 | −1 |
| +1 | +12 | +1 | +1 | +11 | +1 | +1 | +10 | +1 | +1 | +9 | +1 | +1 | +8 | +1 |
| +3 | +14 | +3 | +3 | +13 | +3 | +3 | +12 | +3 | +3 | +11 | +3 | +3 | +10 | +3 |
| +5 | +16 | +5 | +5 | +15 | +5 | +5 | +14 | +5 | +5 | +13 | +5 | +5 | +12 | +5 |
| +7 | +2 | −9 | +7 | +1 | −9 | +7 | +16 | +7 | +7 | +15 | +7 | +7 | +14 | +7 |

TABLE 6-3

Inputs and Outputs of Modulo Precoder and Outputs of Partial-Response Filter
Previous Tap Outputs

| −6 | | | −5 | | | −4 | | | −3 | | | −2 | | |
|---|---|---|---|---|---|---|---|---|---|---|---|---|---|---|
| Input | Output | PRF | Input | Output | PRF | Input | Output | PRF | Input | Output | PRF | Input | Output | PRF |
| −7 | −1 | −7 | −7 | −2 | −7 | −7 | −3 | −7 | −7 | −4 | −7 | −7 | −5 | −7 |
| −5 | +1 | −5 | −5 | +0 | −5 | −5 | −1 | −5 | −5 | −2 | −5 | −5 | −3 | −5 |
| −3 | +3 | −3 | −3 | +2 | −3 | −3 | +1 | −3 | −3 | +0 | −3 | −3 | −1 | −3 |
| −1 | +5 | −1 | −1 | +4 | −1 | −1 | +3 | −1 | −1 | +2 | −1 | −1 | +1 | −1 |
| +1 | +7 | +1 | +1 | +6 | +1 | +1 | +5 | +1 | +1 | +4 | +1 | +1 | +3 | +1 |

TABLE 6-3-continued

Inputs and Outputs of Modulo Precoder and
Outputs of Partial-Response Filter
Previous Tap Outputs

| −6 | | | −5 | | | −4 | | | −3 | | | −2 | | |
|---|---|---|---|---|---|---|---|---|---|---|---|---|---|---|
| Input | Output | PRF | Input | Output | PRF | Input | Output | PRF | Input | Output | PRF | Input | Output | PRF |
| +3 | +9 | +3 | +3 | +8 | +3 | +3 | +7 | +3 | +3 | +6 | +3 | +3 | +5 | +3 |
| +5 | +11 | +5 | +5 | +10 | +5 | +5 | +9 | +5 | +5 | +8 | +5 | +5 | +7 | +5 |
| +7 | +13 | +7 | +7 | +12 | +7 | +7 | +11 | +7 | +7 | +10 | +7 | +7 | +9 | '7 |

TABLE 6-3

Inputs and Outputs of Modulo Precoder and
Outputs of Partial-Response Filter
Previous Tap Outputs

| −1 | | | −0 | | | +1 | | | +2 | | | +3 | | |
|---|---|---|---|---|---|---|---|---|---|---|---|---|---|---|
| Input | Output | PRF | Input | Output | PRF | Input | Output | PRF | Input | Output | PRF | Input | Output | PRF |
| −7 | −6 | −7 | −7 | −2 | −7 | −7 | −3 | −7 | −7 | −4 | −7 | −7 | −5 | −7 |
| −5 | −4 | −5 | −5 | −5 | −5 | −5 | −6 | −5 | −5 | −7 | −5 | −5 | −8 | −5 |
| −3 | −2 | −3 | −3 | −3 | −3 | −3 | −4 | −3 | −3 | −5 | −3 | −3 | −6 | −3 |
| −1 | +0 | −1 | −1 | −1 | −1 | −1 | −2 | −1 | −1 | −3 | −1 | −1 | −4 | −1 |
| +1 | +2 | +1 | +1 | +1 | +1 | +1 | +0 | +1 | +1 | −1 | +1 | +1 | −2 | +1 |
| +3 | +4 | +3 | +3 | +3 | +3 | +3 | +2 | +3 | +3 | +1 | +3 | +3 | −0 | +3 |
| +5 | +6 | +5 | +5 | +5 | +5 | +5 | +4 | +5 | +5 | +3 | +5 | +5 | +2 | +5 |
| +7 | +8 | +7 | +7 | +7 | +7 | +7 | +6 | +7 | +7 | +5 | +7 | +7 | +4 | +7 |

TABLE 6-5

Inputs and Outputs of Modulo Precoder and
Outputs of Partial-Response Filter
Previous Tap Outputs

| +4 | | | +5 | | | +6 | | | +7 | | | + | | |
|---|---|---|---|---|---|---|---|---|---|---|---|---|---|---|
| Input | Output | PRF | Input | Output | PRF | Input | Output | PRF | Input | Output | PRF | Input | Output | PRF |
| −7 | −11 | −7 | −7 | −12 | −7 | −7 | −13 | −7 | −7 | −14 | −7 | −7 | −15 | −7 |
| −5 | −9 | −5 | −5 | −10 | −5 | −5 | −11 | −5 | −5 | −12 | −5 | −5 | −13 | −5 |
| −3 | −7 | −3 | −3 | −8 | −3 | −3 | −9 | −3 | −3 | −10 | −3 | −3 | −11 | −3 |
| −1 | −5 | −1 | −1 | −6 | −1 | −1 | −7 | −1 | −1 | −8 | −1 | −1 | −9 | −1 |
| +1 | −3 | +1 | +1 | −4 | +1 | +1 | −5 | +1 | +1 | −6 | +1 | +1 | −7 | +1 |
| +3 | −1 | +3 | +3 | −2 | +3 | +3 | −3 | +3 | +3 | −4 | +3 | +3 | −5 | +3 |
| +5 | +1 | +5 | +5 | −0 | +5 | +5 | −1 | +5 | +5 | −2 | +5 | +5 | −3 | +5 |
| +7 | +3 | +7 | +7 | +2 | +7 | +7 | +1 | +7 | +7 | −0 | +7 | +7 | −1 | +7 |

TABLE 6-6

Inputs and Outputs of Modulo Precoder and
Outputs of Partial-Response Filter
Previous Tap Outputs

| +9 | | | +10 | | | +11 | | | +12 | | | +13 | | |
|---|---|---|---|---|---|---|---|---|---|---|---|---|---|---|
| Input | Output | PRF | Input | Output | PRF | Input | Output | PRF | Input | Output | PRF | Input | Output | PRF |
| −7 | −16 | −7 | −7 | −1 | +9 | −7 | −2 | +9 | −7 | −3 | +9 | −7 | −4 | +9 |
| −5 | −14 | −5 | −5 | −15 | −5 | −5 | −16 | −5 | −5 | −1 | +11 | −5 | −2 | +11 |
| −3 | −12 | −3 | −3 | −13 | −3 | −3 | −14 | −3 | −3 | −15 | −3 | −3 | −16 | −3 |
| −1 | −10 | −1 | −1 | −11 | −1 | −1 | −12 | −1 | −1 | −13 | −1 | −1 | −14 | −1 |
| +1 | −8 | +1 | +1 | −9 | +1 | +1 | −10 | +1 | +1 | −11 | +1 | +1 | −12 | +1 |
| +3 | −6 | +3 | +3 | −7 | +3 | +3 | −8 | +3 | +3 | −9 | +3 | +3 | −10 | +3 |
| +5 | −4 | +5 | +5 | −5 | +5 | +5 | −6 | +5 | +5 | −7 | +5 | +5 | −8 | +5 |
| +7 | −2 | +7 | +7 | −3 | +7 | +7 | −4 | +7 | +7 | −5 | +7 | +7 | −6 | +7 |

TABLE 6-7

Inputs and Outputs of Modula Precoder and
Outputs of Partial-Response Filter
Previous Tap Outputs

| +14 | | | +15 | | | +16 | | |
| --- | --- | --- | --- | --- | --- | --- | --- | --- |
| Input | Output | PRF | Input | Output | PRF | Input | Output | PRF |
| −7 | −5 | +9 | −7 | −6 | +9 | −7 | −7 | +9 |
| −5 | −3 | +11 | −5 | −4 | +11 | −5 | −5 | +11 |
| −3 | −1 | +13 | −3 | −2 | +13 | −3 | −3 | +13 |
| −1 | −15 | −1 | −1 | −16 | −1 | −1 | −1 | +15 |
| +1 | −13 | +1 | +1 | −14 | +1 | +1 | −15 | +1 |
| +3 | −11 | +3 | +3 | −12 | +3 | +3 | −13 | +3 |
| +5 | −9 | +5 | +5 | −10 | +5 | +5 | −11 | +5 |
| +7 | −7 | +7 | +7 | −8 | +7 | +7 | −9 | +7 |

We claim:

1. A transfer process comprising:
   an extended modulo precoding step for precoding each of the non-precoded vector components of an original vector signal to generate intermediately-precoded vector signal having the intermediately-precoded components corresponding to the vector signal, and performing an extended modulo operation on each of said intermediately-precoded vector signal, to generate modulo-precoded vector signal corresponding to the original vector signal and having modulo-precoded components, where in the extended modulo operation, when said each of said intermediately-precoded vector signal is located outside a predetermined extended-modulo limit area in a vector space, said each of the intermediately-precoded vector signal is transposed to another vector signal located in said predetermined extended-modulo limit area;
   a signal transferring step for transferring the said modulo-precoded vector signal through a signal transfer system having a predetermined filtering characteristic which transforms said modulo-precoded vector signal into a transferred vector signal; and
   a transferred vector signal determining step for receiving said transferred vector signal, and detecting said non-precoded vector components of said original vector signal from vector components of said transferred vector signal, based on a relationship between said non-precoded vector components of said original vector signal and said vector components of said transferred vector signal.

2. A transfer process according to claim 1, wherein said signal transferring step comprises a filtering step for filtering said modulo-precoded vector signal before transferring the modulo-precoded vector signal based on said predetermined filtering characteristic to transform said modulo-precoded vector signal into a filtered vector signal having substantially the same vector components of said transferred vector signal.

3. A transfer process according to claim 1, wherein in the extended modulo operation, said predetermined extended-modulo limit area is predetermined so that said predetermined extended-modulo limit area contains and is greater than a square area having a side length of twice a predetermined extended-modulo shift value and having the center thereof at an origin of the vector space.

4. A transfer process according to claim 3, wherein said predetermined extended-modulo limit area is a rectangular area containing said square area, and
   in the extended modulo operation, said each of the intermediately-precoded vector components of said intermediately-precoded vector signal is changed by the predetermined extended-modulo shift value so that a power of the signal represented by the intermediately-precoded vector signal having said each of the intermediately-precoded vector components is decreased, when said each of the intermediately-precoded vector components is greater than an upper limit the rectangular area in the same direction as said each of the intermediately-precoded vector components, or smaller than a lower limit of the rectangular area in the direction, and therefore said each of the intermediately-precoded vector signal is transposed to said other vector signal.

5. A transfer process according to claim 3, wherein in the extended modulo operation, when said each of said intermediately-precoded vector signal is located outside said predetermined extended-modulo limit area, and therefore said each of the intermediately-precoded vector signal is transposed to said other vector signal, power of said other vector signal is obtained for first, second, and third cases, and said other vector signal is determined as that is obtained for one of said first, second, and third cases which provides the minimum power among the powers obtained for one of said first, second, and third cases, where in the first case one of the intermediately-precoded vector components of each of said intermediately-precoded vector signal is changed by the predetermined extended-modulo shift value, in the second case the other of the intermediately-precoded vector components of said each of said intermediately-precoded vector signal is changed by the predetermined extended-modulo shift value, and in the third case both of the intermediately-precoded vector components of said each of said intermediately-precoded vector signal is changed by the predetermined extended-modulo shift value.

6. A transfer process according to claim 5, wherein said predetermined extended-modulo limit area is a circle area containing said square area.

7. A transfer system according to claim 1, wherein said signal transferring step contains a recording step for recording information represented by the modulo-precoded vector signal in a recording medium, and a reading step for reading the information recorded in the recording medium.

8. A transfer system comprising:
   an extended modulo precoding unit for precoding each of the non-precoded vector components of an original vector signal to generate intermediately-precoded vector signal having the intermediately-precoded components corresponding to the vector signal, and performing an extended modulo operation on each of said intermediately-precoded vector signal, to generate modulo-precoded vector signal corresponding to the original vector signal and having modulo-precoded components, where in the extended modulo operation, when said each of said intermediately-precoded vector signal is located outside a predetermined extended-modulo limit area in a vector space, said each of the intermediately-precoded vector signal is transposed to another vector signal located in said predetermined extended-modulo limit area;
   a signal transferring system for transferring said modulo-precoded vector signal therethrough with a predetermined filtering characteristic which transforms said modulo-precoded vector signal into a transferred vector signal; and
   a transferred vector signal determining unit for receiving said transferred vector signal, and detecting said non-precoded vector components of said original vector signal from vector components of said transferred vector signal, based on a relationship between said non-precoded vector components of said original vector signal and said vector components of said transferred vector signal.

9. A transfer system according to claim 8, wherein said signal transferring system comprises a filtering unit for filtering said modulo-precoded vector signal before transferring the modulo-precoded vector signal based on said predetermined filtering characteristic to transform said modulo-precoded vector signal into a filtered vector signal having substantially the same vector components of said transferred vector signal.

10. A transfer system according to claim 8, wherein in the extended modulo operation, said predetermined extended-modulo limit area is predetermined so that said predetermined extended-modulo limit area contains and is greater than a square area having a side length of twice a predetermined extended-modulo shift value and having the center thereof at an origin of the vector space.

11. A transfer system according to claim 10, wherein said predetermined extended-modulo limit area is a rectangular area containing said square area, and in the extended modulo operation, said each of the intermediately-precoded vector components of said intermediately-precoded vector signal is changed by the predetermined extended-modulo shift value so that a power of the signal represented by the intermediately-precoded vector signal having said each of the intermediately-precoded vector components is decreased, when said each of the intermediately-precoded vector components is greater than an upper limit the rectangular area in the same direction as said each of the intermediately-precoded vector components, or smaller than a lower limit of the rectangular area in the direction, and therefore said each of the intermediately-precoded vector signal is transposed to said other vector signal.

12. A transfer system according to claim 10, wherein in the extended modulo operation, when said each of said intermediately-precoded vector signal is located outside said predetermined extended-modulo limit area, and therefore said each of the intermediately-precoded vector signal is transposed to said other vector signal, the power of said other vector signal is obtained for first, second, and third cases, and said other vector signal is determined as that is obtained for one of said first, second, and third cases which provides the minimum power among the powers obtained for one of said first, second, and third cases, where in the first case one of the intermediately-precoded vector components of each of said intermediately-precoded vector signal is changed by the predetermined extended-modulo shift value, in the second case the other of the intermediately-precoded vector components of said each of said intermediately-precoded vector signal is changed by the predetermined extended-modulo shift value, and in the third case both of the intermediately-precoded vector components of said each of said intermediately-precoded vector signal is changed by the predetermined extended-modulo shift value.

13. A transfer system according to claim 12, wherein said predetermined extended-modulo limit area is a circle area containing said square area.

14. A transfer system according to claim 8, wherein said signal transferring system contains a signal recording medium, a vector signal recording mechanism for recording information represented by the modulo-precoded vector signal in the recording medium, and a signal reading mechanism for reading the information recorded in the recording medium.

15. A circuit comprising:
an intermediate precoding unit for precoding each of the non-precoded vector components of an original vector signal to generate intermediately-precoded vector signal having the intermediately-precoded components corresponding to the vector signal; and an extended modulo unit for performing an extended modulo operation on each of said intermediately-precoded vector signal, to generate modulo-precoded vector signal corresponding to the original vector signal and having modulo-precoded components, where in the extended modulo operation, when said each of said intermediately-precoded vector signal is located outside a predetermined extended-modulo limit area in a vector space, said each of the intermediately-precoded vector signal is transposed to another vector signal located in said predetermined extended-modulo limit area.

16. A circuit according to claim 15, further comprising a filtering unit for filtering said modulo-precoded vector signal before transferring the modulo-precoded vector signal based on a predetermined filtering characteristic to transform said modulo-precoded vector signal into a filtered vector signal having substantially the same vector components of said transferred vector signal.

17. A circuit according to claim 15, wherein in the extended modulo operation, said predetermined extended-modulo limit area is predetermined so that said predetermined extended-modulo limit area contains and is greater than a square area having a side length of twice a predetermined extended-modulo shift value and having the center thereof at an origin of the vector space.

18. A circuit according to claim 17, wherein said predetermined extended-modulo limit area is a rectangular area containing said square area, and in the extended modulo operation, said each of the intermediately-precoded vector components of said intermediately-precoded vector signal is changed by the predetermined extended-modulo shift value so that a power of the signal represented by the intermediately-precoded vector signal having said each of the intermediately-precoded vector components is decreased, when said each of the intermediately-precoded vector components is greater than an upper limit the rectangular area in the same direction as said each of the intermediately-precoded vector components, or smaller than a lower limit of the rectangular area in the direction, and therefore said each of the intermediately-precoded vector signal is transposed to said other vector signal.

19. A circuit according to claim 17, wherein in the extended modulo operation, when said each of said intermediately-precoded vector signal is located outside said predetermined extended-modulo limit area, and therefore said each of the intermediately-precoded vector signal is transposed to said other vector signal, power of said other vector signal is obtained for first, second, and third cases, and said other vector signal is determined as that is obtained for one of said first, second, and third cases which provides the minimum power among the powers obtained for one of said first, second, and third cases, where in the first case one of the intermediately-precoded vector components of each of said intermediately-precoded vector signal is changed by the predetermined extended-modulo shift value, in the second case the other of the intermediately-precoded vector components of said each of said intermediately-precoded vector signal is changed by the predetermined extended-modulo shift value, and in the third case both of the intermediately-precoded vector components of said each of said intermediately-precoded vector signal is changed by the predetermined extended-modulo shift value.

20. A circuit according to claim 19, wherein said predetermined extended-modulo limit area is a circle area containing said square area.

21. A data recording apparatus comprising:

an intermediate precoding unit for precoding each of the non-precoded vector components of an original vector signal to generate intermediately-precoded vector signal having the intermediately-precoded components corresponding to the vector signal;

an extended modulo unit for performing an extended modulo operation on each of said intermediately-precoded vector signal, to generate modulo-precoded vector signal corresponding to the original vector signal and having modulo-precoded components, where in the extended modulo operation, when said each of said intermediately-precoded vector signal is located outside a predetermined extended-modulo limit area in a vector space, said each of the intermediately-precoded vector signal is transposed to another vector signal located in said predetermined extended-modulo limit area; and a vector signal recording mechanism for recording information represented by the modulo-precoded vector signal in a recording medium.

22. A circuit comprising:

A transferred vector signal receiving unit for receiving a first vector signal having first vector components; and an original vector signal determining unit for determining second vector components of a second vector signal from first vector components of said first vector signal based on a relationship between said first vector components of said first vector signal and said second vector components of said second vector signal, wherein said relationship between the first vector components and the second vector components are predetermined to be equivalent to the relationship between the first vector components and the second vector components when the first vector components are generated from the second vector components through the following steps of, (a) precoding each of the second vector components of the second vector signal to generate intermediately-precoded vector signal having the intermediately-precoded components corresponding to the second vector signal, (b) performing an extended modulo operation on said intermediately-precoded vector signal, to generate modulo-precoded vector signal corresponding to the original vector signal and having modulo-precoded components, where in the extended modulo operation, when said each of said intermediately-precoded vector signal is located outside a predetermined extended-modulo limit area in the vector space, said each of the intermediately-precoded vector signal is transposed to another vector signal located in said predetermined extended-modulo limit area, and (c) filtering said modulo-precoded vector signal based on a predetermined filtering characteristic to transform said modulo-precoded vector signal into said first vector signal.

23. A circuit according to claim 22, wherein said transferred vector signal receiving unit contains a vector signal reading mechanism for reading the information representing the first vector signal and being recorded in the recording medium.

* * * * *